United States Patent
Nishikawa et al.

(10) Patent No.: US 7,153,548 B2
(45) Date of Patent: Dec. 26, 2006

(54) COMPOUND, RETARDATION PLATE AND METHOD FOR FORMING OPTICALLY ANISOTROPIC LAYER

(75) Inventors: Hideyuki Nishikawa, Kanagawa (JP); Atsuhiro Ohkawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 189 days.

(21) Appl. No.: 10/753,411

(22) Filed: Jan. 9, 2004

(65) Prior Publication Data

US 2004/0142116 A1    Jul. 22, 2004

(30) Foreign Application Priority Data

Jan. 10, 2003    (JP)    ............ P. 2003-004981

(51) Int. Cl.
- *C09K 19/38* (2006.01)
- *C09K 19/52* (2006.01)
- *C09K 19/62* (2006.01)
- *C09K 19/20* (2006.01)
- *C07C 69/76* (2006.01)

(52) U.S. Cl. ............. 428/1.1; 252/299.01; 252/299.62; 252/299.66; 252/299.67; 560/55; 560/56; 560/61; 560/76; 560/85; 560/95

(58) Field of Classification Search ................. 428/1.2, 428/1.1; 252/299.61, 299.62, 299.67, 299.5, 252/299.01, 299.66; 560/55, 56, 61, 76, 560/85, 95
See application file for complete search history.

(56) References Cited

U.S. PATENT DOCUMENTS

| 6,685,998 B1 * | 2/2004 | Nishikawa et al. ........... 428/1.3 |
| 2002/0041352 A1 * | 4/2002 | Kuzuhara et al. ........... 349/117 |

FOREIGN PATENT DOCUMENTS

| JP | 2-264905 A | 10/1990 |
| JP | 11-60972 A | 3/1999 |
| JP | 2002-6138 A | 1/2002 |
| JP | 2002-174730 A | 6/2002 |

OTHER PUBLICATIONS

P. Berdagué et al., "Nematogens with more flexible chains than aromatic rings in the core", Liquid Crystals, vol. 26, No. 2, pp. 211-218 (1999).

* cited by examiner

*Primary Examiner*—Shean C. Wu
(74) *Attorney, Agent, or Firm*—Buchanan Ingersoll & Rooney PC

(57) ABSTRACT

A retardation plate having a high film strength and having an optical property is provided by using a biaxial liquid crystal compound, in which the direction having a minimum refractive index of the optically anisotropic thin layer almost coincides with the normal direction in the film plane of the retardation plate, and the retardation plate comprises a transparent support and at least one optically anisotropic layer containing a liquid crystal compound capable of expressing a biaxial liquid crystal phase, wherein the liquid crystal compound is a polymerizable compound and/or a polymer compound.

6 Claims, No Drawings

COMPOUND, RETARDATION PLATE AND METHOD FOR FORMING OPTICALLY ANISOTROPIC LAYER

FIELD OF THE INVENTION

The present invention relates to a retardation plate, a method for forming an optically anisotropic layer constituting the retardation plate, and a liquid crystal compound suitable for the constitution of the optically anisotropic layer.

More specifically, the present invention relates to a retardation plate having an optically anisotropic layer containing a biaxial liquid crystal compound, where the direction having a minimum refractive index of the optically anisotropic layer almost coincides with the normal direction in the film plane of the retardation plate.

BACKGROUND OF THE INVENTION

In general, an optically biaxial film is produced by biaxially stretching a film obtained from a polymer (see, for example, JP-A-2-264905 (the term "JP-A" as used herein means an "unexamined published Japanese patent application")). However, in recent years, a method of obtaining a biaxial film by using a biaxial liquid crystal has been proposed. The biaxial film using a biaxial liquid crystal is advantageous in that the film thickness can be made very small as compared with biaxial films conventionally used in many cases. Therefore, use of a biaxial liquid crystal for the biaxial film is a very useful technique for realizing thinning, lightweighting or the like of a device. As for such a technique, for example, a method of obtaining a biaxial film by monoaxially stretching a polymer liquid crystal compound of expressing $S_{CA}$ phase which is one of biaxial liquid crystal phases, has been reported (see, for example, JP-A-11-60972). However, the film obtained by utilizing the stretching is very bad in the dimensional stability and often suffers from a problem that the optical performance is readily changed by humidity, heat or the like.

On the other hand, a technique where a biaxial film using a biaxial liquid crystal compound is produced by not using stretching at all has been also reported (see, for example, JP-A-2002-6138). However, in this report, a functional group for fixing the orientation is not positively introduced into the biaxial liquid crystal compound and therefore, this technique has a problem that the film is readily scratched due to low hardness or the orientation is disordered in aging to lose the biaxial alignment. In order to eliminate such a problem of hardness or orientation disorder, a method of fixing the orientation is considered and examples thereof include a method of introducing a polymerizable group. An optical film using a biaxial liquid crystal compound having introduced thereinto such a polymerizable group has been reported (see, for example, JP-A-2002-174730). However, as stated in this report, when a polymerizable functional group is introduced into the biaxial liquid crystal compound, hybrid (not biaxial) alignment results. Furthermore, the liquid crystal compound molecule forms a high pre-tilt angle at the air interface and this causes orientation disorder. Therefore, it is usually very difficult to obtain a biaxial film having a high strength by using a biaxial liquid crystal. In addition, even if a polymerizable group is introduced into the liquid crystal compound, a film having a high strength cannot be always obtained.

SUMMARY OF THE INVENTION

Accordingly, an object of the present invention is to provide a retardation plate comprising an optical anisotropic layer containing a liquid crystal compound, particularly to provide a retardation plate by using a biaxial liquid crystal compound, where the film strength is high, the biaxial alignment is stably exhibited even in aging and the direction having a minimum refractive index of the optically anisotropic layer almost coincides with the normal direction of the film plane.

A further object of the present invention is to provide a method for forming an optical anisotropic layer, and to provide a liquid crystal compound suitablly used for an optical anisotropic layer.

In conventional biaxial liquid crystal compounds used for the biaxial film, when a polymerizable group is introduced, the orientation of liquid crystal compound molecules is changed at interfaces with the orientation film and with air to take a hybrid alignment and the optically biaxial alignment is lost. As a result of extensive studies, the present inventors have found a liquid crystal compound which is a liquid crystal compound having a polymerizable group, nevertheless, exhibits optical biaxiality without taking a hybrid alignment. It has been also found that even a polymer biaxial liquid crystal compound does not take a hybrid alignment but exhibits optical biaxiality. The present invention has been accomplished based on these findings. In particular, a novel liquid crystal compound having a polymerizable group and expressing a biaxial liquid crystal phase has been found. Furthermore, it has been found that a specific additive can control the orientation of the liquid crystal compound having a polymerizable group at the air interface and this additive can be suitably used for achieving the expression of a biaxial liquid crystal phase without causing a hybrid alignment.

That is, the above-described objects of the present invention can be attained by the following retardation plate, method for forming an optically anisotropic layer, and liquid crystal compound.

1. A compound represented by the following formula (B-1):

Formula (B-1):

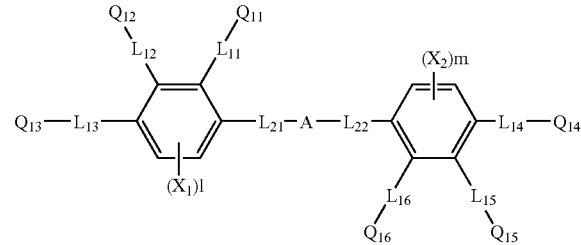

wherein A represents a divalent linking group selected from the group consisting of a divalent cyclic group, —O—, —CO—, —NH—, —N=CH—, —S—, an alkylene group, an alkenylene group, an alkynylene group and a combination thereof, $L_{21}$ and $L_{22}$ each independently represents a divalent linking group containing at least one of —CH=CH—, —N=CH— and —C≡C—, $X_1$ and $X_2$ each independently represents an atom or a group selected from the group consisting of a halogen atom, an alkyl group having from 1 to 12 carbon atoms, an alkoxy group having from 1 to 12 carbon atoms, an acyl group having from 2 to 13 carbon atoms, an alkylamino group having from 2 to 12 carbon atoms and an acyloxy group having from 2 to 13 carbon atoms, l and m each independently represents an integer of 0 to 2, $L_{11}$, $L_{12}$, $L_{13}$, $L_{14}$, $L_{15}$ and $L_{16}$ each independently represents a divalent linking group selected from the group consisting of —O—, —CO—, —NH—, —N=CH—, —S—, an alkylene group, an alkenylene group, an alkynylene group, an arylene group and a combination thereof, and $Q_{11}$, $Q_{12}$, $Q_{13}$, $Q_{14}$, $Q_{15}$ and $Q_{16}$ each independently represents a polymerizable group or a hydrogen atom and at least one of $Q_{11}$, $Q_{12}$, $Q_{13}$, $Q_{14}$, $Q_{15}$ and $Q_{16}$ represents a polymerizable group.

2. The compound as described in the item 1, wherein at least one of $Q_{11}$, $Q_{12}$, $Q_{13}$, $Q_{14}$, $Q_{15}$ and $Q_{16}$ represents an unsaturated polymerizable group.

3. A retardation plate comprising a transparent support and at least one optically anisotropic layer containing a liquid crystal compound, wherein the liquid crystal compound is the compound represented by the above formula (B-1).

4. The retardation plate as described in the item 3, wherein at least one of $Q_{11}$, $Q_{12}$, $Q_{13}$, $Q_{14}$, $Q_{15}$ and $Q_{16}$ represents an unsaturated polymerizable group.

5. The retardation plate as described in the item 3 or 4, wherein the optically anisotropic layer contains a compound represented by the following formula (V): Formula (V):

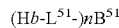

wherein Hb represents an aliphatic group having from 6 to 40 carbon atoms or an aliphatic substituted oligosiloxanoxy group having from 6 to 40 carbon atoms, $L^{51}$ represents a single bond or a divalent linking group, n represents any one integer of 2 to 12, and $B^{51}$ represents a n-valent linking group containing at least one cyclic structure.

6. A retardation plate comprising a transparent support having thereon at least one optically anisotropic layer formed of a liquid crystal compound capable of expressing a biaxial liquid crystal phase above, wherein the liquid crystal compound is at least one of a polymerizable compound and a polymer compound, and the direction having a minimum refractive index of the biaxial liquid crystal phase almost coincides with the normal direction of the transparent support.

7. The retardation plate as described in the item 6, wherein the polymerizable compound is the compound represented by the above formula (B-1).

8. The retardation plate as described in the item 6, wherein the polymer compound is a polymer compound containing a compound represented by the above formula (B-1) as the partial structure thereof.

9. The retardation plate as described in the item 6 or 7, wherein the angle made by the direction having a minimum refractive index of the biaxial liquid crystal phase and the normal direction of the transparent support is from 0 to 10° at both interfaces with the the transparent support and with air.

10. The retardation plate as described in any one of the items 6 to 9, wherein the scratch strength on the surface of the optically anisotropic layer is 10 g or more.

11. The retardation plate as described in any one of the items 6 to 10, wherein the surface energy on the surface of the optically anisotropic layer is 45 mN/m or less.

12. The retardation plate as described in any one of the items 6 to 11, wherein the biaxial liquid crystal phase is a biaxial nematic liquid crystal phase.

13. A method for forming an optically anisotropic layer, which comprises:

coating a liquid crystal composition containing a polymerizable compound capable of expressing a biaxial liquid crystal phase and a photopolymerization initiator on an orientation film;

orienting the polymerizable compound in monodomain alignment; and irradiating an ultraviolet ray in an atmosphere having an oxygen concentration of 7% or less to polymerize the polymerizable compound and thereby fix the orientation thereof.

14. The method as described in the item 13, wherein the polymerizable compound is the compound represented by the above formula (B-1).

DETAILED DESCRIPTION OF THE INVENTION

The present invention is described in detail below.

[Biaxial Liquid Crystal Compound]

The liquid crystal compound used for forming the optically anisotropic layer of the present invention is a liquid crystalline compound which exhibits optical biaxiality. In other words, this is a liquid crystalline compound where refractive indexes nx, ny and nz in the three axial direction of the liquid crystal phase differ from each other and satisfy, for example, the relationship of nx>ny>nz.

The liquid crystalline compound for use in the present invention preferably has the above-described property and at the same time, preferably exhibits good monodomain property so as to obtain uniform and defectless orientation. If the monodomain property is bad, a polydomain structure results to cause orientation defects at the boundary between domains to scatter light at the defect portion. This disadvantageously gives rise to reduction in the transmittance of the retardation plate.

Examples of the biaxial liquid crystal phase exhibited by the liquid crystalline compound for use in the present invention include biaxial nematic phase, biaxial smectic A phase and biaxial smectic C phase. Among these liquid crystal phases, a biaxial nematic phase (Nb phase) exhibiting good monodomain property is preferred. The biaxial nematic phase is one of liquid crystal phases which can be taken by the nematic liquid crystalline compound, and this indicates a state where when the space of a liquid crystal phase is defined by x axis, y axis and z axis, the liquid crystalline compound is inhibited from free rotation of xz plane around y axis as the center and also from free rotation of xy plane around z axis as the center.

The liquid crystalline compound for use in the present invention is a polymerizable compound and/or a polymer compound. The polymerizable compound may be a low molecular weight compound or a high molecular weight compound. The polymer compound is preferably a compound having polymerizability so as to perform the fixing of orientation, however, when the glass transition point is 30° C. or more, the polymer compound may not have polymerizability.

Specific examples of the polymerizable compound that is the biaxial liquid crystal compound include the compounds described in *Yuki Gosei Kagaku*, pp. 124–143, Vol. 49, No. 5 (1991), and those obtained by introducing a polymerizable group into compounds described in D. W. Bruce et al., *AN EU-SPONSORED "OXFORD WORKSHOP ON BIAXIAL NEMATICS"*, pp. 157–293, St Benet's Hall, University of Oxford, 20–22 (1996), S. CHANDRASEKHAR et al., *A Thermotropic Biaxial Nematic Liquid Crystal; Mol. Cryst. Liq. Cryst.*, Vol. 165, pp. 123–130 (1988), and D. Demus, J. Goodby et al., *Handbook of Liquid Crystals Vol. 28: Low Molecular Weight Liquid Crystals II*, pp. 933–943, WILEY-VCH.

As the low molecular weight liquid crystalline compound having a polymerizable group, the compounds described, for example, in JP-A-2002-174730 can also be used. However, in the case where the compound described in this patent publication, that is, a compound liable to cause hybrid alignment or orientation disorder due to a high pre-tilt angle of molecules at the air interface, is used as the low molecular weight compound, an air interface orientation controlling agent described later is preferably added.

The polymerizable low molecular weight liquid crystalline compound which expresses a biaxial liquid crystal phase without causing hybrid alignment or orientation disorder is preferably a compound represented by the following formula (B-1):

Formula (B-1):

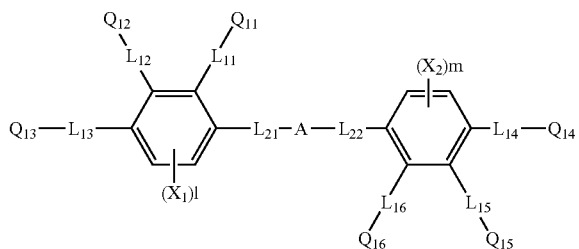

In formula (B-1), A represents a divalent linking group selected from the group consisting of a divalent cyclic group, —O—, —CO—, —NH—, —N=CH—, —S—, an alkylene group, an alkenylene group, an alkynylene group and a combination thereof.

The divalent cyclic group, the alkylene group, the alkenylene group and the alkynylene group each may have a substituent (for example, an alkyl group, a halogen atom, a cyano group, an alkoxy group or an acyloxy group).

A preferably contains at least one divalent cyclic group. The divalent cyclic group is preferably a divalent aromatic hydrocarbon group, a divalent heterocyclic group or a divalent aliphatic ring group, and more preferably a divalent aromatic hydrocarbon group.

The divalent aromatic hydrocarbon group means an arylene group or a substituted arylene group.

Examples of the arylene group include phenylene, indenylene, naphthylene, fluorenylene, phenanthrenylene, anthrylene and pyrenylene. Among these, phenylene and naphthylene are preferred, and more preferably 1,4-phenylene, 1,5-naphthylene and 2,6-naphthylene.

Examples of the substituent of the substituted arylene group include an aliphatic group, an aromatic hydrocarbon group, a heterocyclic group, a halogen atom, an alkoxy group (e.g., methoxy, ethoxy, methoxyethoxy), an aryloxy group (e.g., phenoxy), an arylazo group (e.g., phenylazo), an alkylthio group (e.g., methylthio, ethylthio, propylthio), an alkylamino group (e.g., methylamino, propylamino), an acyl group (e.g., acetyl, propanoyl, octanoyl, benzoyl), an acyloxy group (e.g., acetoxy, pivaloyloxy, benzoyloxy), a hydroxyl group, a mercapto group, an amino group, a carboxyl group, a sulfo group, a carbamoyl group, a sulfamoyl group and a ureido group.

The divalent heterocyclic group preferably contains a 5-, 6- or 7-membered heterocyclic ring, more preferably a 5- or 6-membered heterocyclic ring, and most preferably a 6-membered heterocyclic ring. The heteroatom constituting the heterocyclic ring is preferably a nitrogen atom, an oxygen atom or a sulfur atom. The heterocyclic ring is preferably an aromatic heterocyclic ring. The aromatic heterocyclic ring is generally an unsaturated heterocyclic ring. An unsaturated heterocyclic ring having a largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyrane ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring, and preferably a pyridine ring and a pyrimidine ring, and more preferably a pyridine-2,5-diyl and a pyrimidine-2,5-diyl.

The heterocyclic ring may be condensed with another heterocyclic ring, an aliphatic ring or an aromatic hydrocarbon ring. Examples of the condensed heterocyclic ring include a benzofuran ring, an isobenzofuran ring, a benzothiophene ring, an indole ring, an indoline ring, an isoindole ring, a benzoxazole ring, a benzothiazole ring, an indazole ring, a benzimidazole ring, a chromene ring, a chroman ring, an isochroman ring, a quinoline ring, an isoquinoline ring, a cinnoline ring, a phthalazine ring, a quinazoline ring, a quinoxaline ring, a dibenzofuran ring, a carbazole ring, a xanthene ring, an acridine ring, a phenanthridine ring, a phenanthroline ring, a phenazine ring, a phenoxazine ring, a thianthrene ring, an indolizine ring, a quinolidine ring, a quinuclidine ring, a naphthylidine ring, a purine ring and a pteridine ring.

The divalent heterocyclic group may have a substituent. Examples of the substituent are the same as examples of the substituent of the substituted arylene group and additionally include an alkylidene group, an oxo group and an imino group.

The divalent aliphatic ring group preferably contains a 5-, 6- or 7-membered aliphatic ring, more preferably a 5- or 6-membered aliphatic ring, and most preferably a 6-membered aliphatic ring.

The divalent aliphatic ring group may be condensed with another aliphatic ring, a heterocyclic ring or an aromatic hydrocarbon ring. Examples of the condensed heterocyclic ring include a tetrahydronaphthalene ring an a pteridine ring. The divalent aliphatic ring group may have a substituent. Examples of the substituent are the same as examples of the substituent of the substituted aryl group and additionally include an alkylidene group, an oxo group and an imino group.

$L_{21}$ and $L_{22}$ each independently represents a divalent linking group containing at least —CH=CH—, —N=CH— or —C≡C—. Examples of the divalent linking group other than —CH=CH—, —N=CH— or —C≡C— include —O—, —CO—, —NH—, —S—, an alkylene group, an alkenylene group, an alkynylene group, an arylene group and a combination thereof. $L_{21}$ and $L_{22}$ may be the same or different.

Preferred examples of $L_{21}$ and $L_{22}$ include —CH=CH—, —N=CH—, —C≡C—, —CH=CH—CO—O—, —C≡C—CO—O—, —CH=CH—CO—NH—, —C≡C—CO—NH—, —CH=CH—CO—S— and —C≡C—CO—S. The —CH=CH—, the alkylene group, the alkenylene group, the alkynylene group and the arylene group each may have a substituent (for example, an alkyl group, a halogen atom, a cyano group, an alkoxy group or an acyloxy group). Particularly preferred examples of $L_{21}$ and $L_{22}$ is —CH=CH—CO—O-# (# represents a linking moiety to A).

$X_1$ and $X_2$ each independently represents an atom or a group selected from the group consisting of a halogen atom, an alkyl group having from 1 to 12 carbon atoms, an alkoxy group having from 1 to 12 carbon atoms, an acyl group having from 2 to 13 carbon atoms, an alkylamino group having from 2 to 12 carbon atoms and an acyloxy group having from 2 to 13 carbon atoms.

The alkyl group having from 1 to 12 carbon atoms is preferably an alkyl group having from 1 to 8 carbon atoms, more preferably a methyl group, an ethyl group, an n-propyl group, an n-pentyl group or an n-heptyl group. The alkoxy group having from 1 to 12 carbon atoms is preferably a methyl group, a 2-methoxyethoxy group or a vinyloxy group. The acyl group having from 2 to 13 carbon atoms is preferably an acetyl group. The alkylamino group having from 2 to 12 carbon atoms is preferably a methylamino group, an ethylamino group or a dimethylamino group, more preferably a dimethylamino group. The acyloxy group having from 2 to 13 carbon atoms is preferably an acetyloxy group or an acryloyl group.

l and m each independently represents an integer of 0 to 2, preferably 0.

$L_{11}$, $L_{12}$, $L_{13}$, $L_{14}$, $L_{15}$ and $L_{16}$ each independently represents a divalent linking group selected from the group consisting of —O—, —CO—, —NH—, —N=CH—, —S—, an alkylene group, an alkenylene group, an alkynylene group, an arylene group and a combination thereof. $L_{11}$, $L_{12}$, $L_{13}$, $L_{14}$, $L_{15}$ and $L_{16}$ each is preferably a group comprising a combination of at least two divalent groups selected from the group consisting of an alkylene group, an alkenylene group, an alkynylene group, an arylene group, —CO—, —NH—, —O— and —S—, more preferably a group comprising a combination of at least two divalent groups selected from the group consisting of an alkylene group, an alkenylene group, an alkynylene group, an arylene group, —CO— and —O—.

The number of carbon atoms in the alkylene group is preferably from 1 to 12. The number of carbon atoms in the alkenylene group is preferably from 2 to 12. The number of carbon atoms in the alkynylene group is preferably from 2 to 12. The number of carbon atoms in the arylene group is preferably from 6 to 10. The alkylene group, the alkenylene group, the alkynylene group and the arylene group each may have a substituent (for example, an alkyl group, a halogen atom, a cyano group, an alkoxy group or an acyloxy group). $L_{11}$, $L_{12}$, $L_{13}$, $L_{14}$, $L_{15}$ and $L_{16}$ each is more preferably a group comprising a combination of at least two of —O—, —CO— and an alkylene group, and particularly preferably a #-O-alkenylene group or #-O-alkenylene group-O—CO— (# represents a linking moiety to the benzne ring).

$Q_{11}$, $Q_{12}$, $Q_{13}$, $Q_{14}$, $Q_{15}$ and $Q_{16}$ each represents a polymerizable group or a hydrogen atom and at least one of $Q_{11}$, $Q_{12}$, $Q_{13}$, $Q_{14}$, $Q_{15}$ and $Q_{16}$ represents a polymerizable group. It is preferable that at least two of $Q_{11}$, $Q_{12}$, $Q_{13}$, $Q_{14}$, $Q_{15}$ and $Q_{16}$ represent a polymerizable group. Specific examples of the polymerizable group represented by $Q_{11}$, $Q_{12}$, $Q_{13}$, $Q_{14}$, $Q_{15}$ and $Q_{16}$ are set forth below.

Q1: —CH=$CH_2$

Q2: —CH=CH—$CH_3$

Q3: —CH=CH—$C_2H_5$

Q4: —CH=CH—$C_3H_7$-n

Q5:

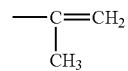

Q6:

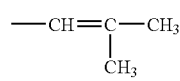

Q7: —C≡CH

Q8:

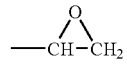

Q9:

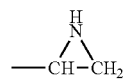

Q10: —SH

Q11: —CHO

Q12: —OH

Q13: —COOH

Q14: —N=C=N

Q15: —$NH_2$

Q16: —$SO_3H$

Q17: —N=C=S $Q_{11}$, $Q_{12}$, $Q_{13}$, $Q_{14}$, $Q_{15}$ and $Q_{16}$ each is preferably an unsaturated polymerizable group (Q1 to Q7), an epoxy group (Q8) or an aziridinyl group (Q9), more preferably an unsaturated polymerizable group, and most preferably an ethylenic unsaturated polymerizable group (Q1 to Q6).

$Q_{11}$, $Q_{12}$, $Q_{13}$, $Q_{14}$, $Q_{15}$ and $Q_{16}$ may be the same or different.

Specific examples of the low molecular weight liquid crystal compound represented by formula (B-1) are set forth below, however, the present invention is not limited thereto.

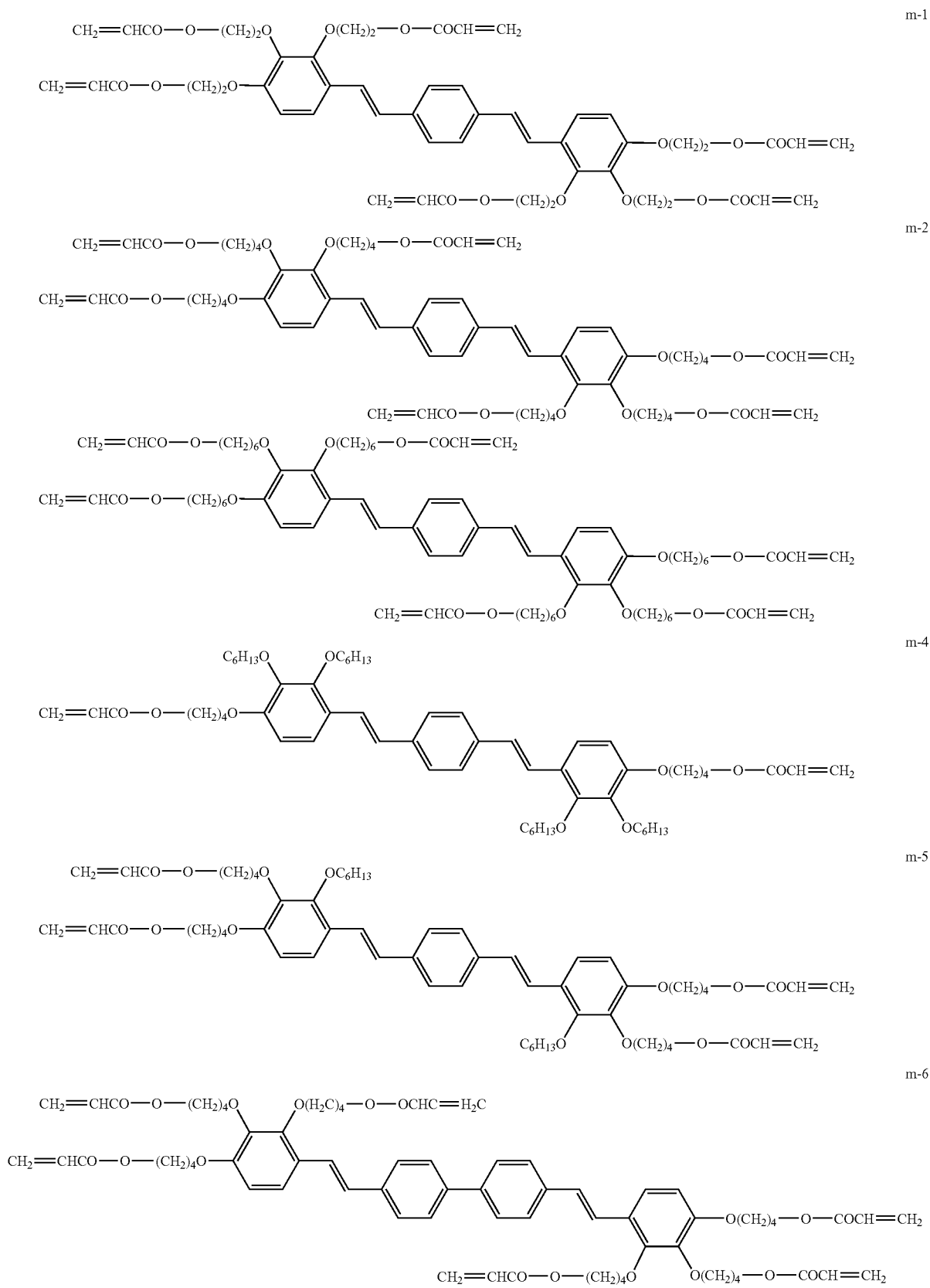

-continued
m-7
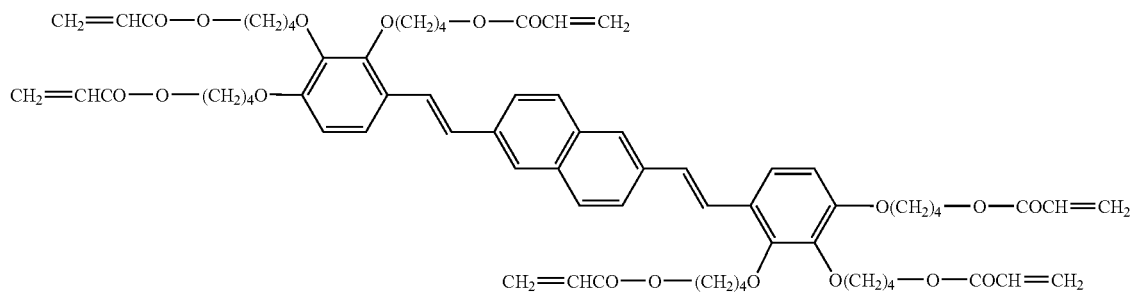
m-8
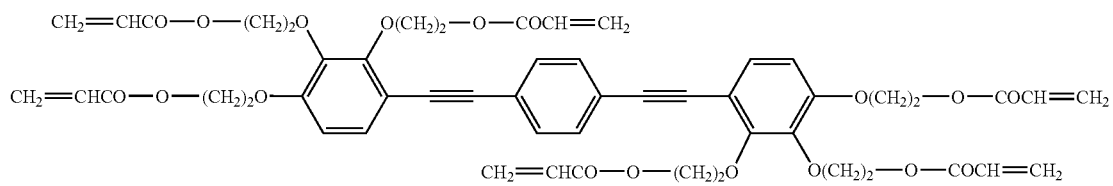
m-9
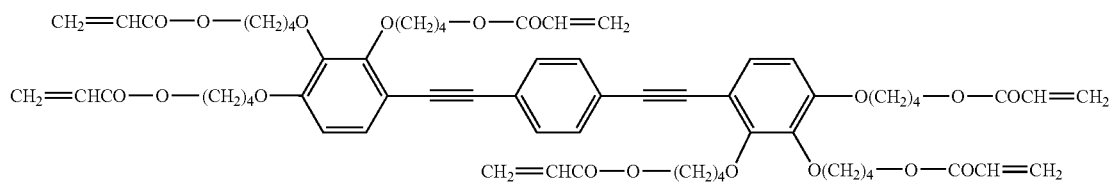
m-10
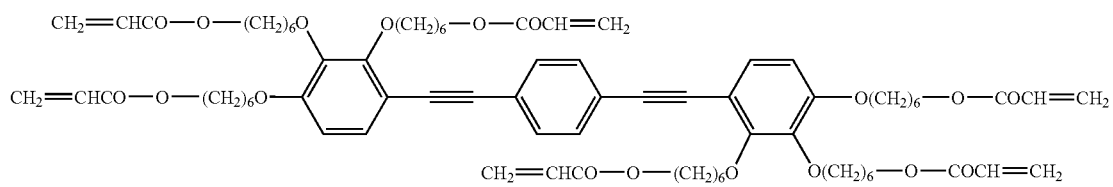
m-11
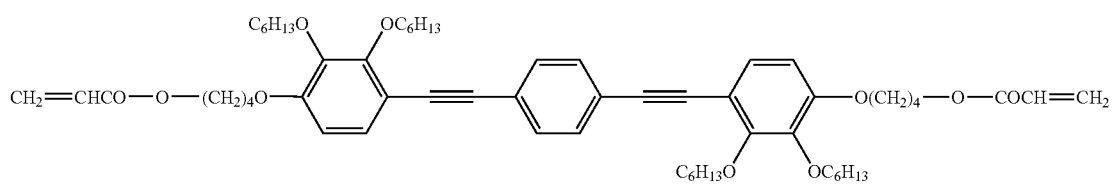
m-12
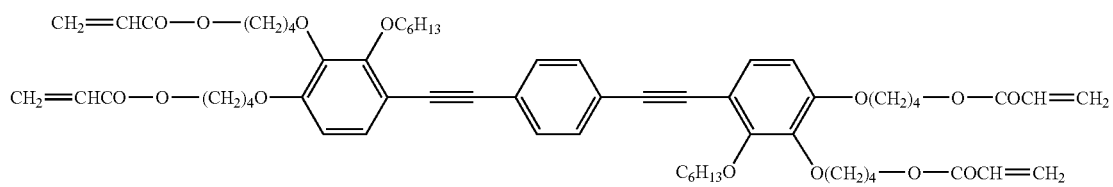
m-13
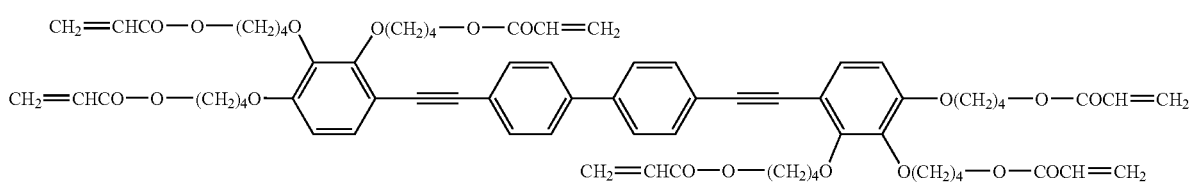

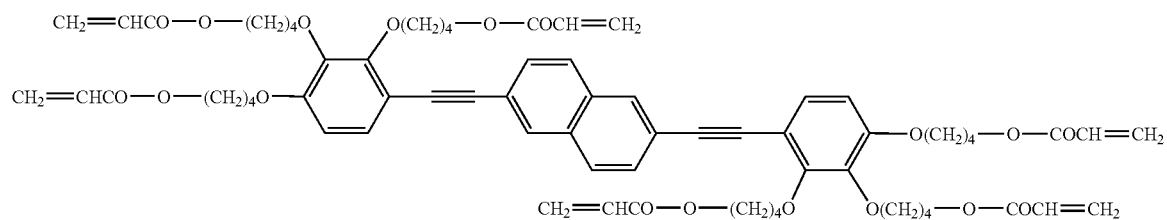
m-14
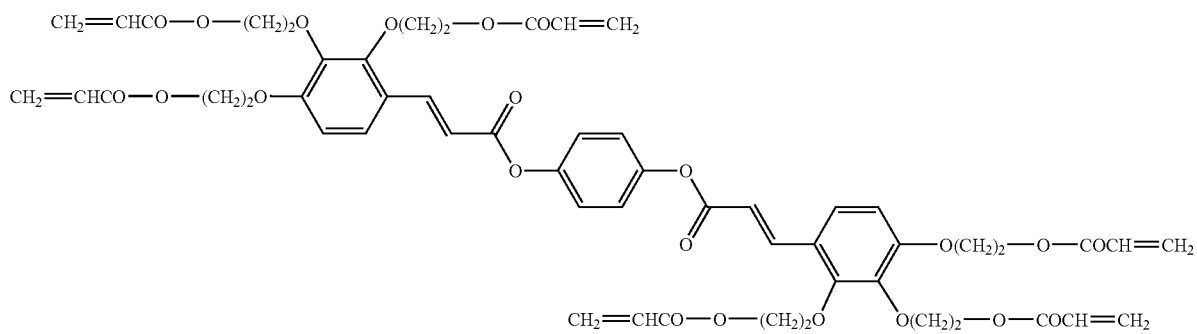
m-15
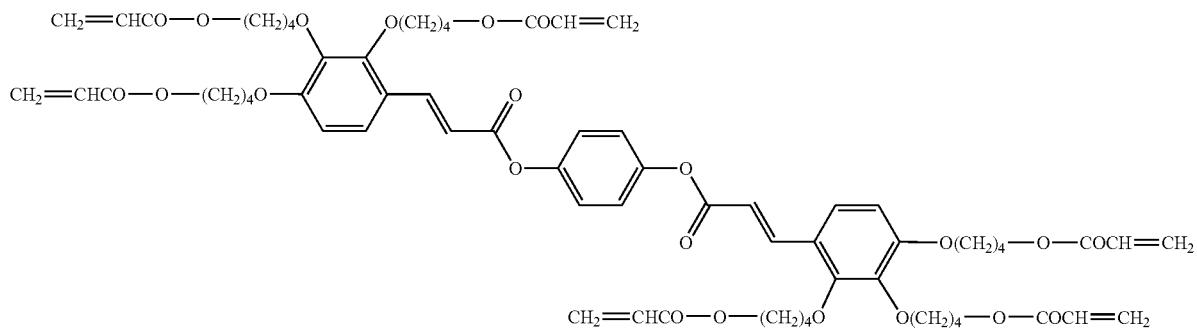
m-16
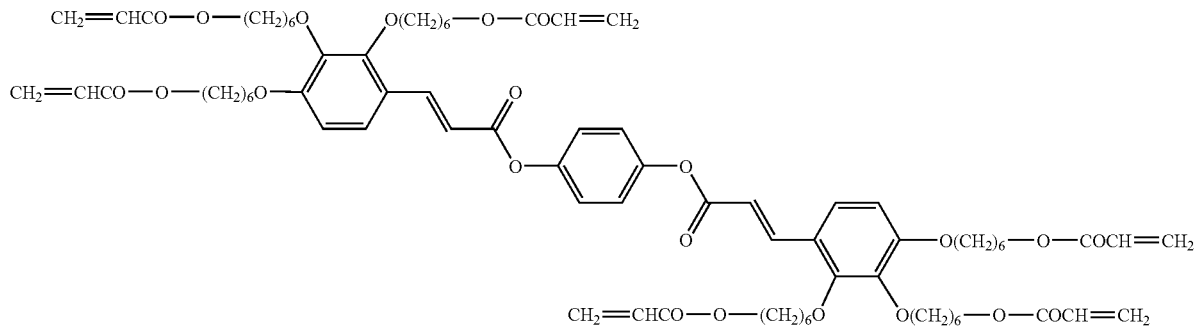
m-17

-continued
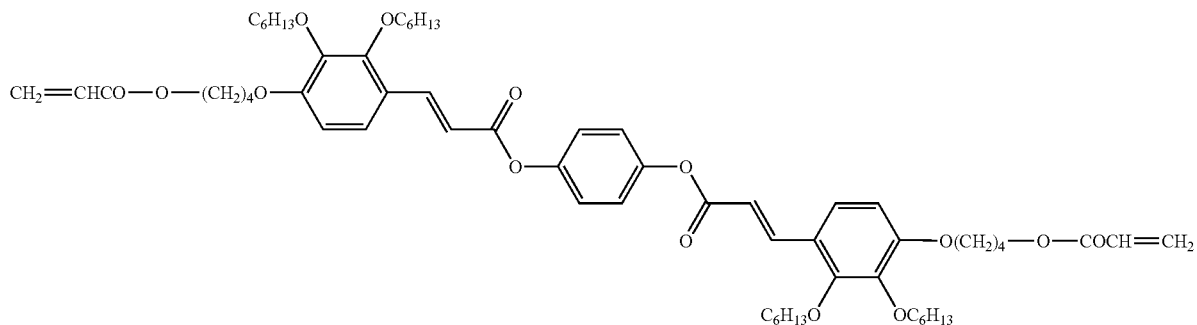
m-18
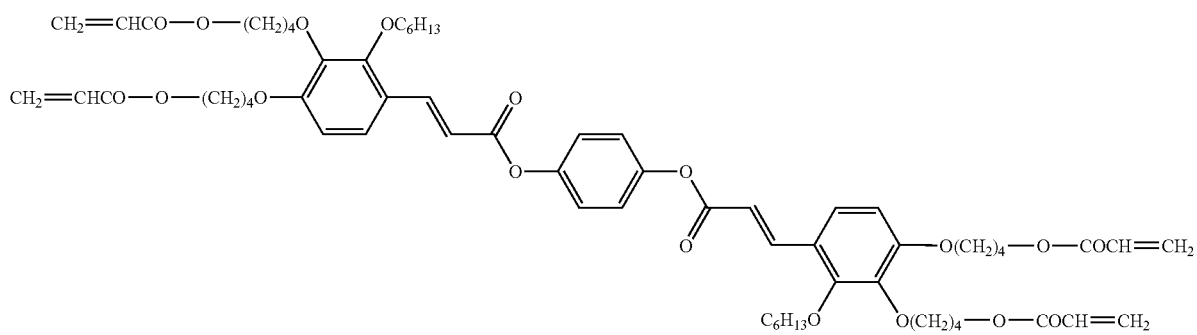
m-19
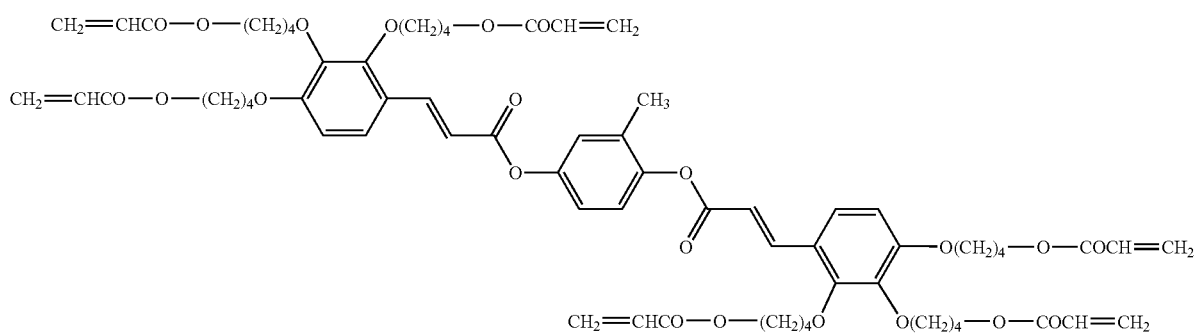
m-20
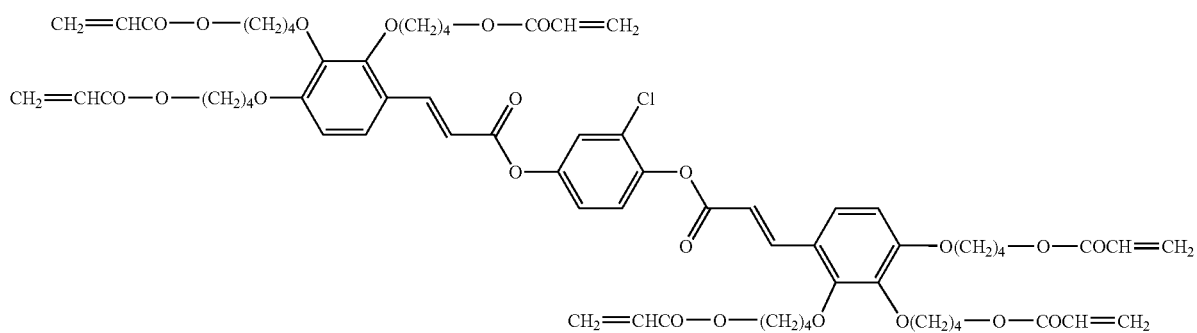
m-21

-continued
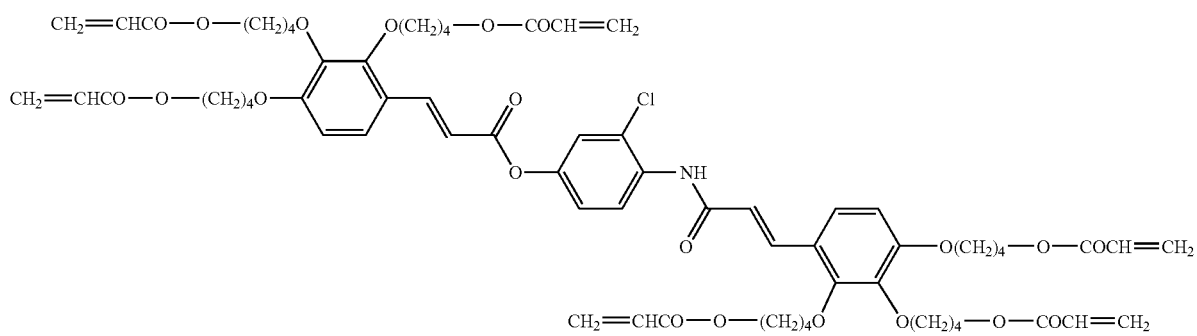
m-22
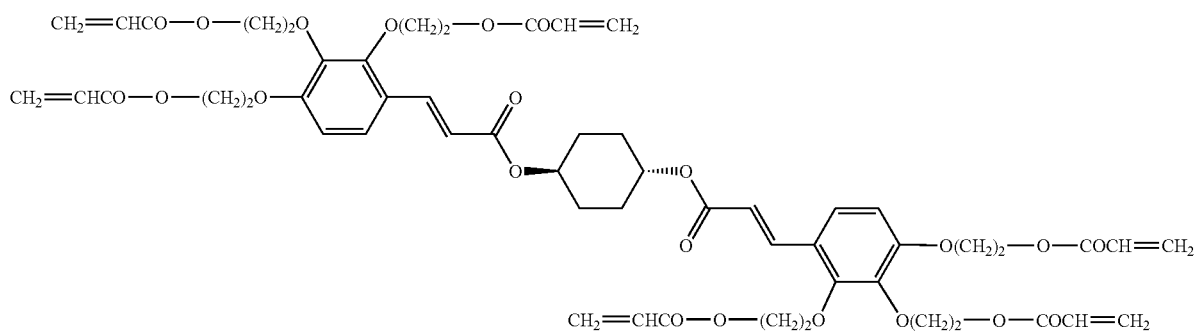
m-23
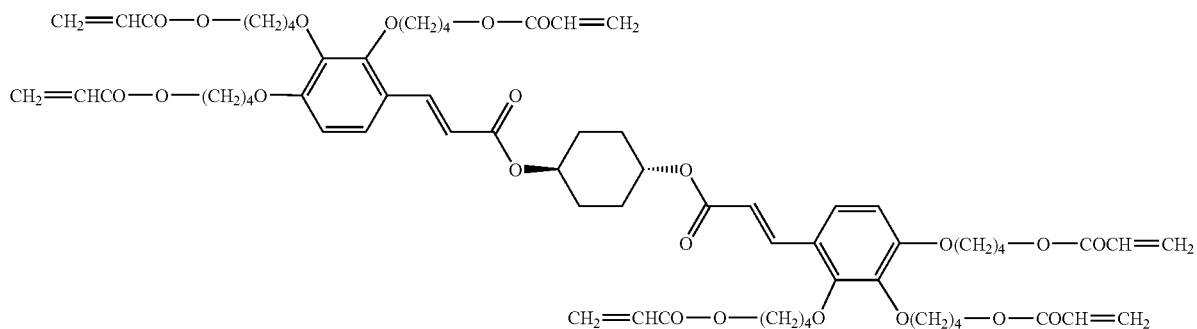
m-24
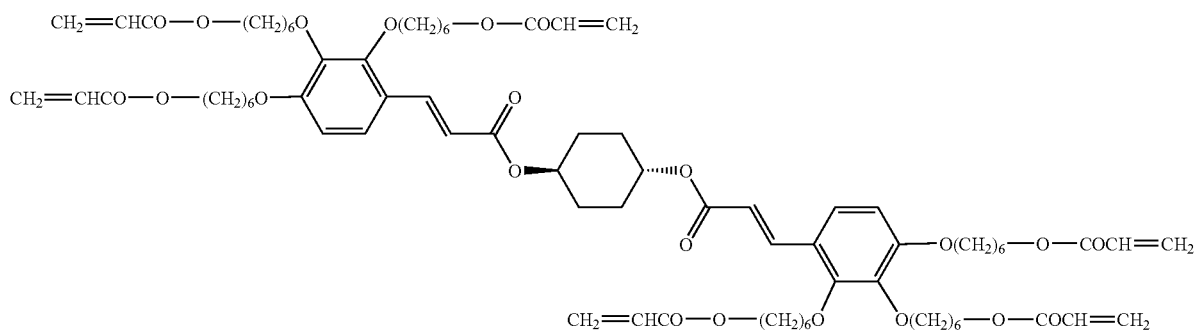
m-25

-continued
m-26
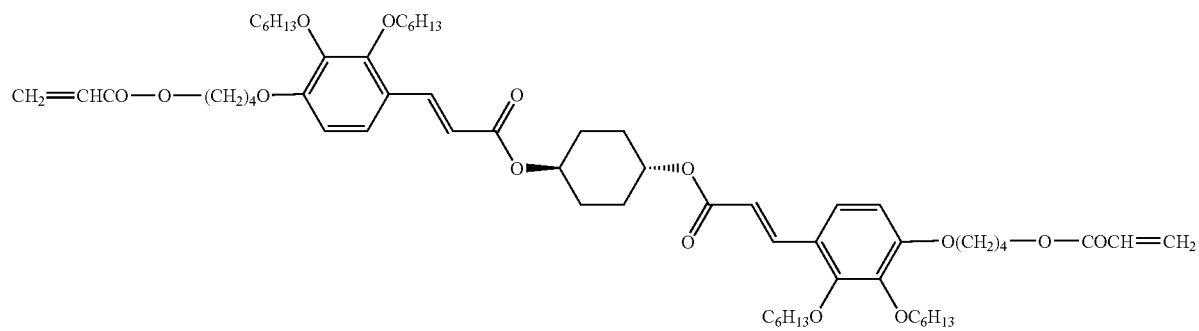
m-27
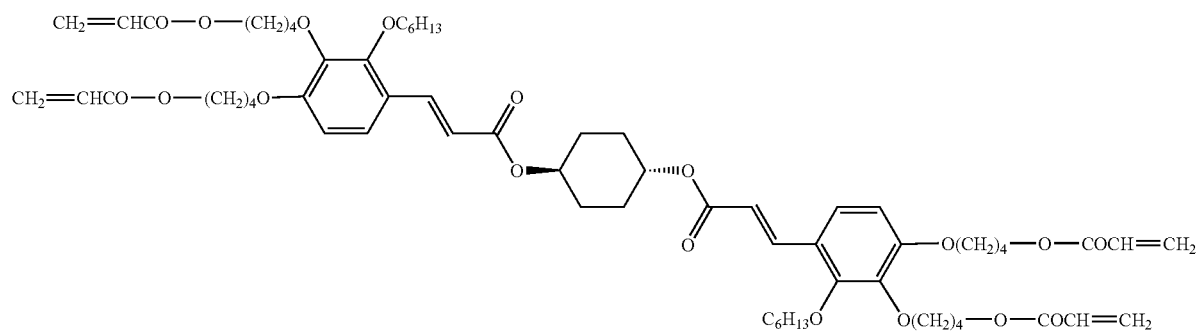
m-28
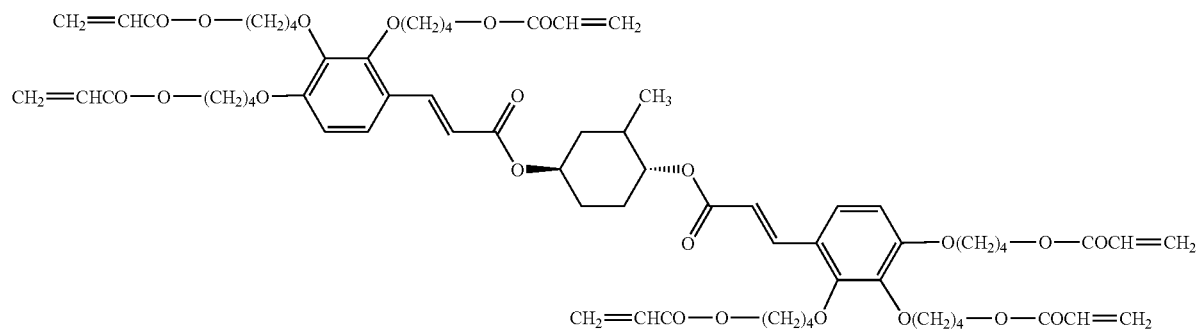
m-29
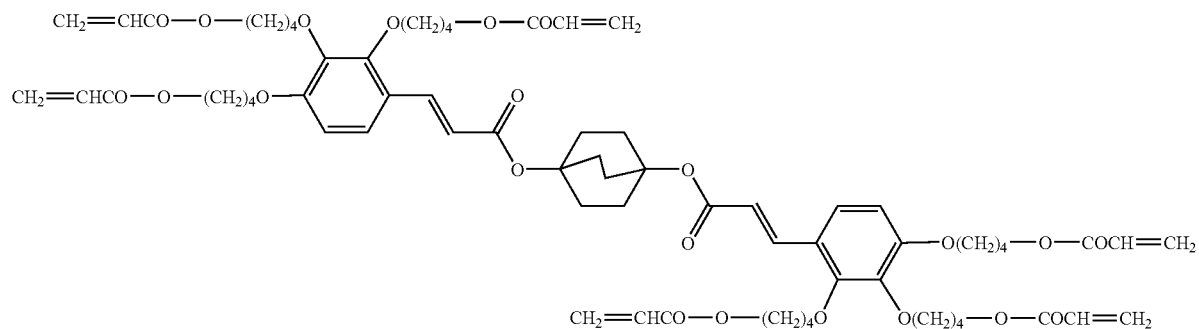

-continued
m-30
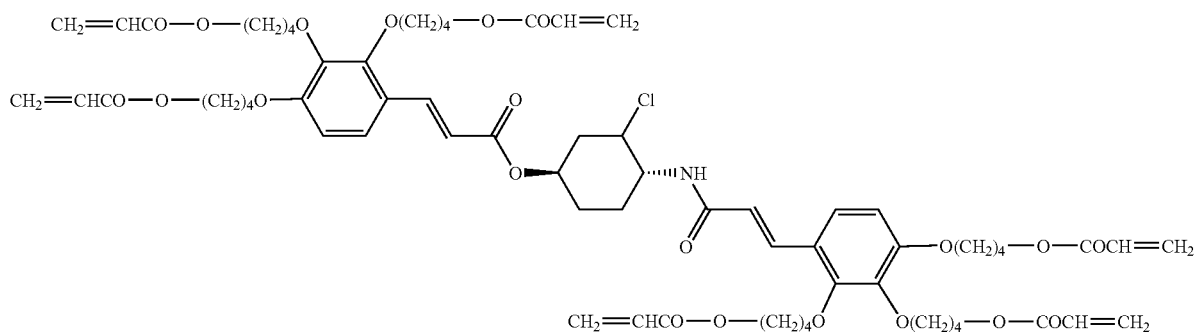
m-31
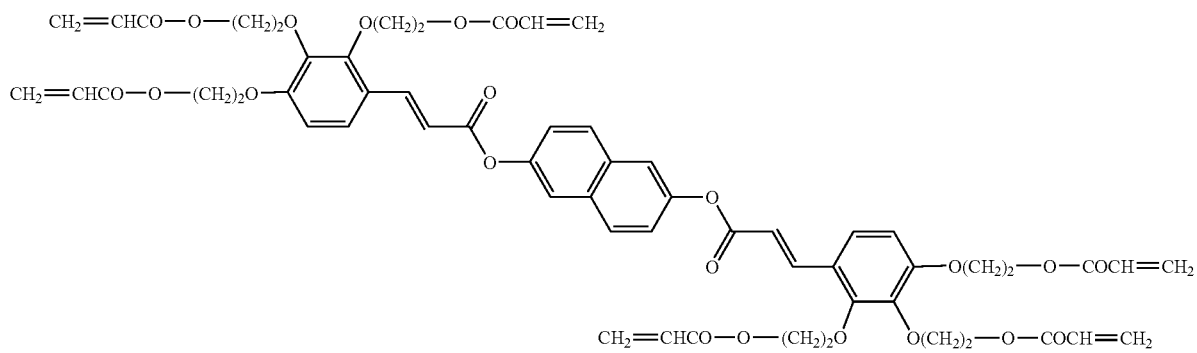
m-32
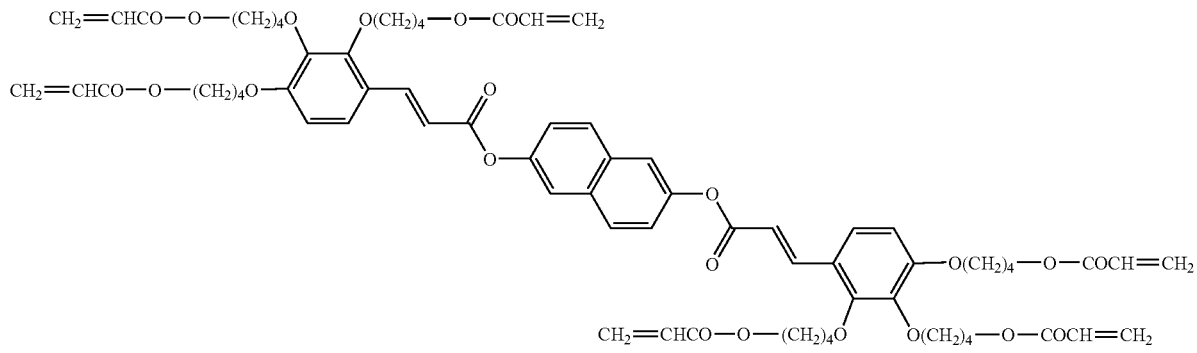
m-33
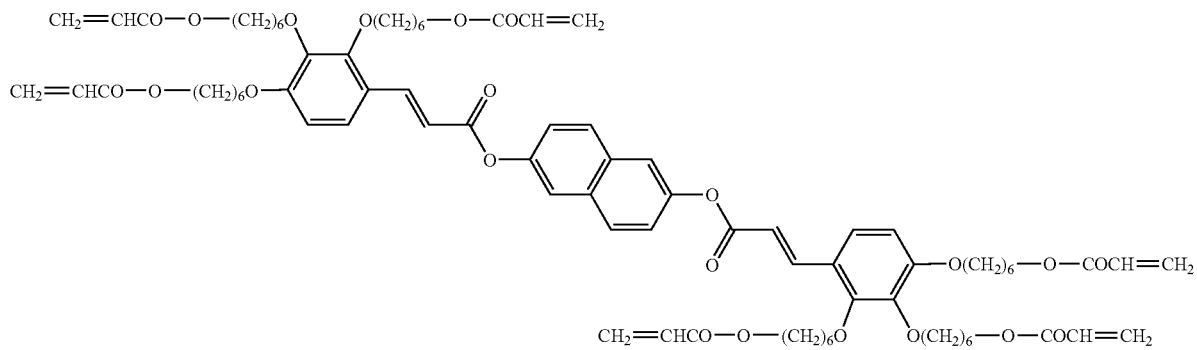

-continued
m-34
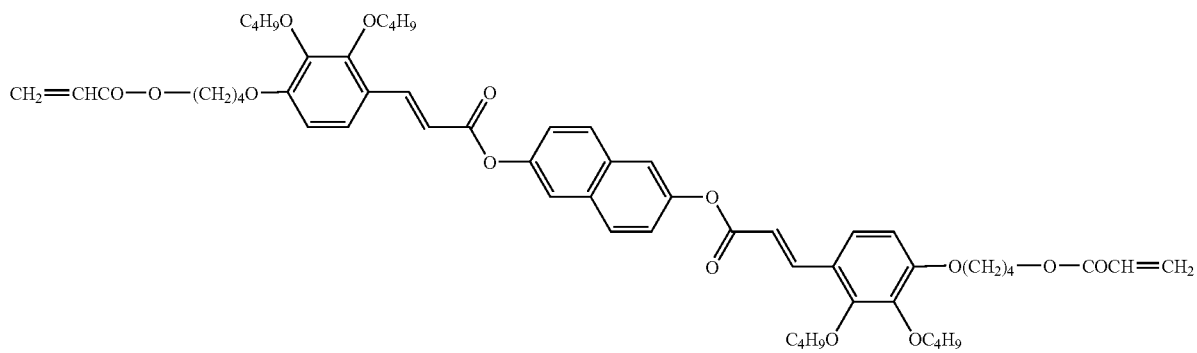
m-35
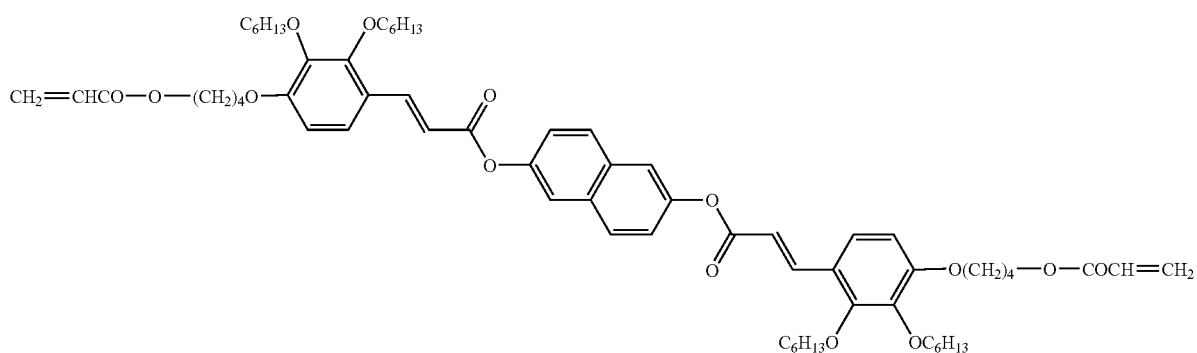
m-36
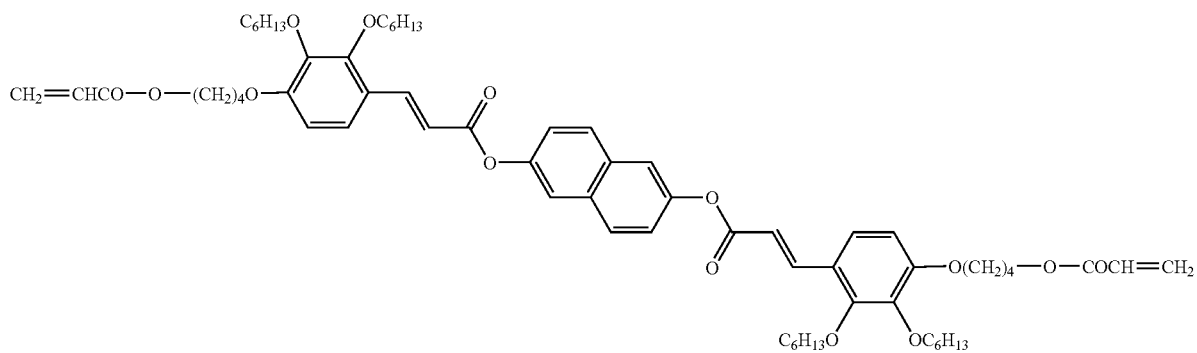
m-37
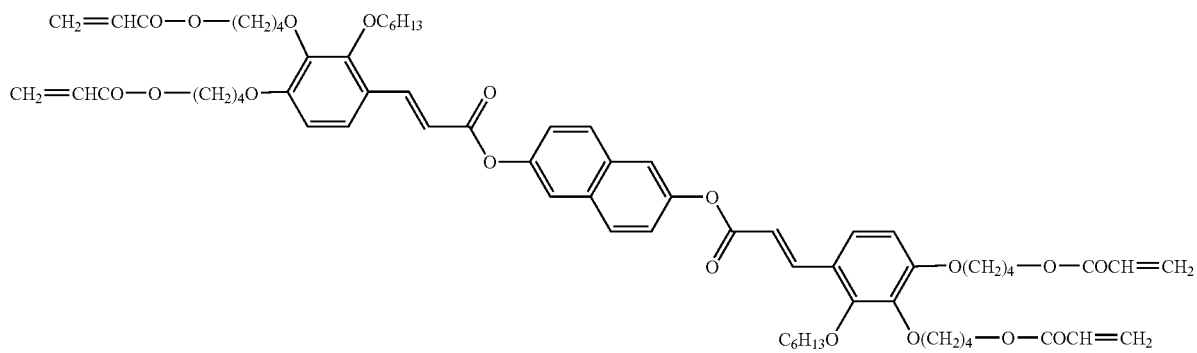

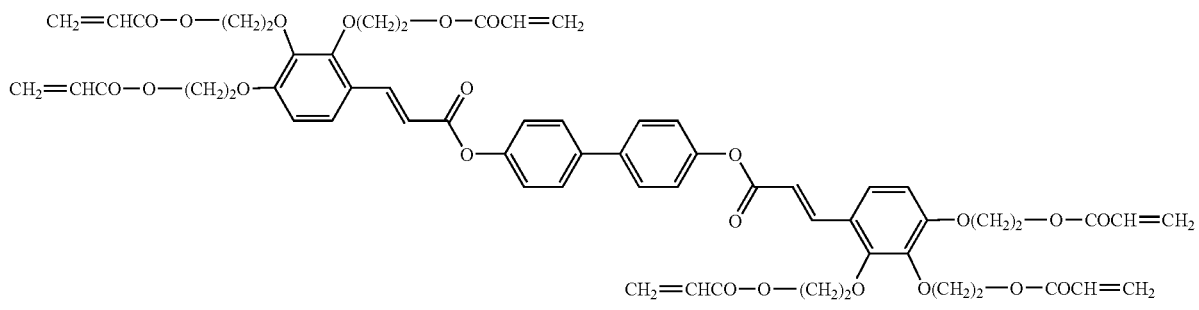
m-38
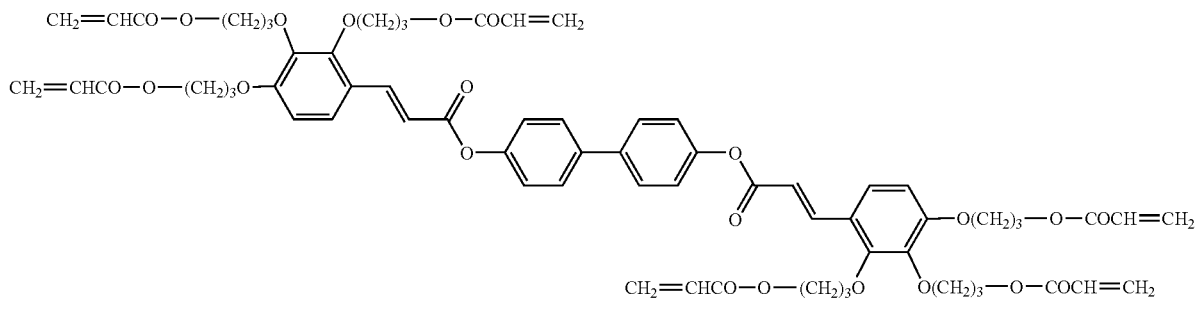
m-39
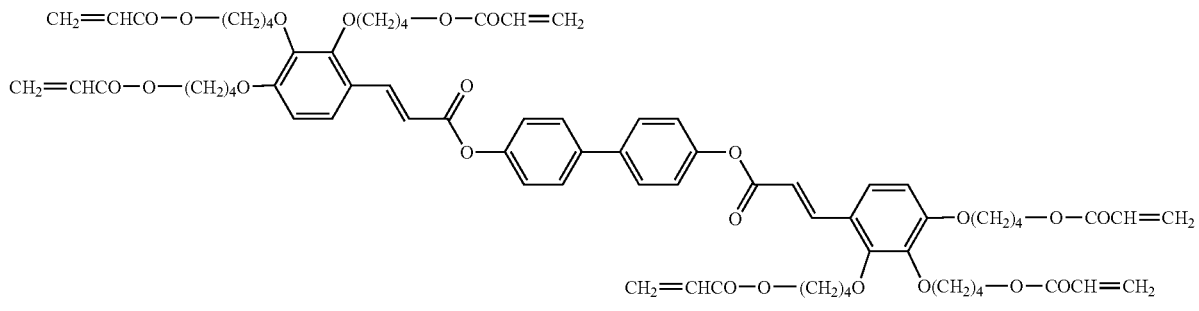
m-40
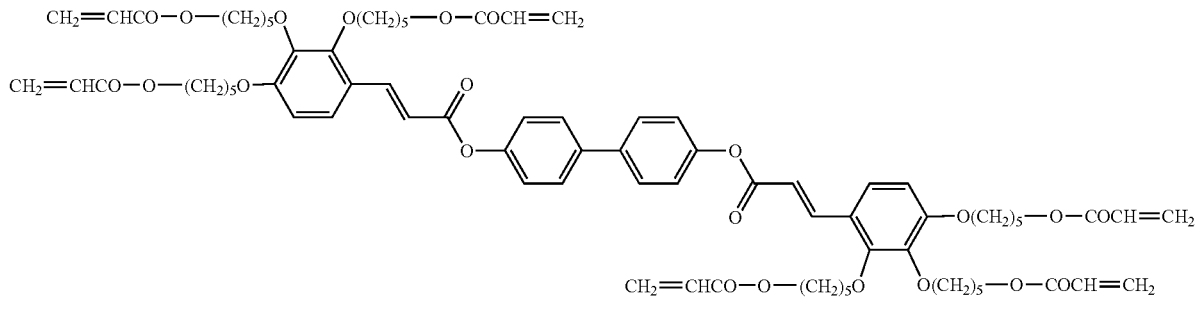
m-41
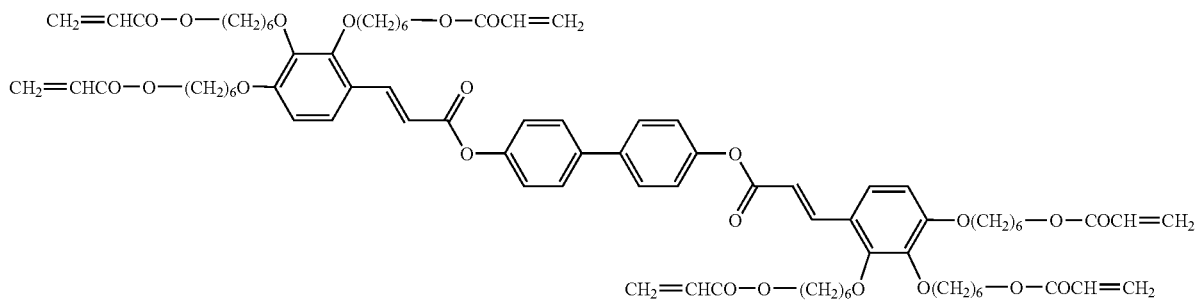
m-42 m-43
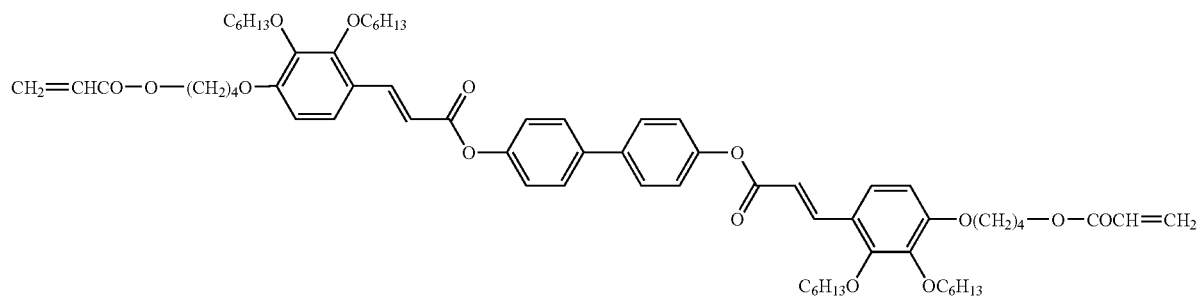
m-44
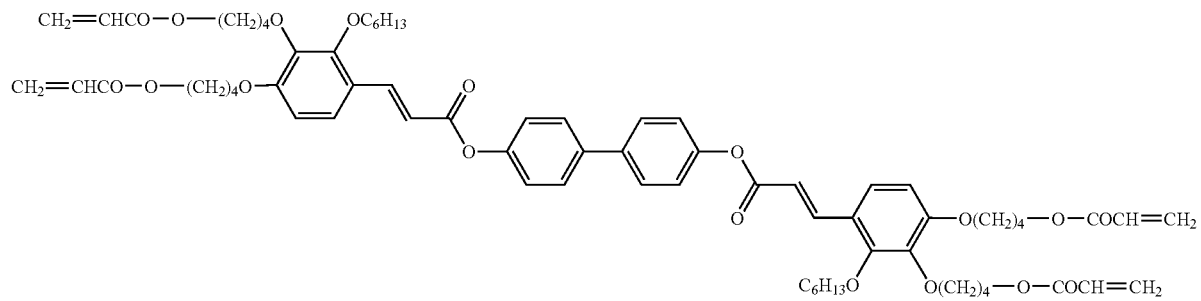
m-45
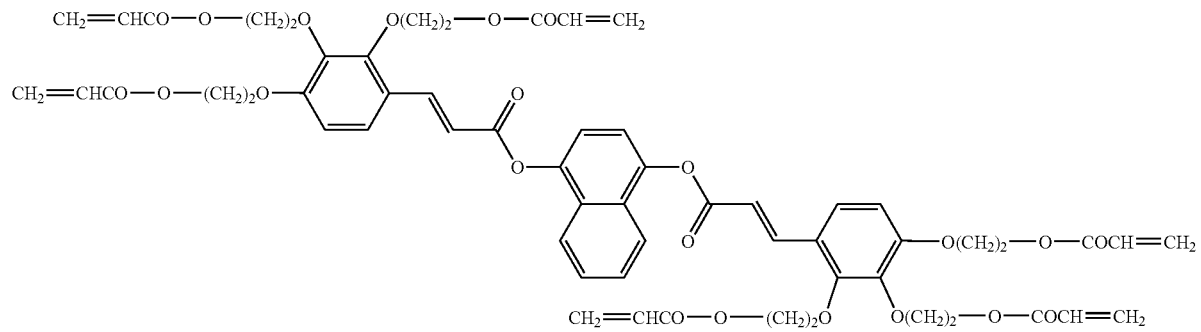
m-46
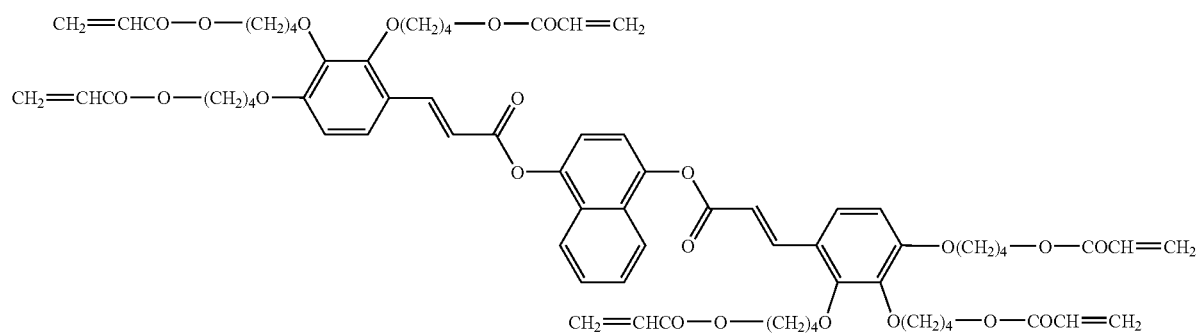

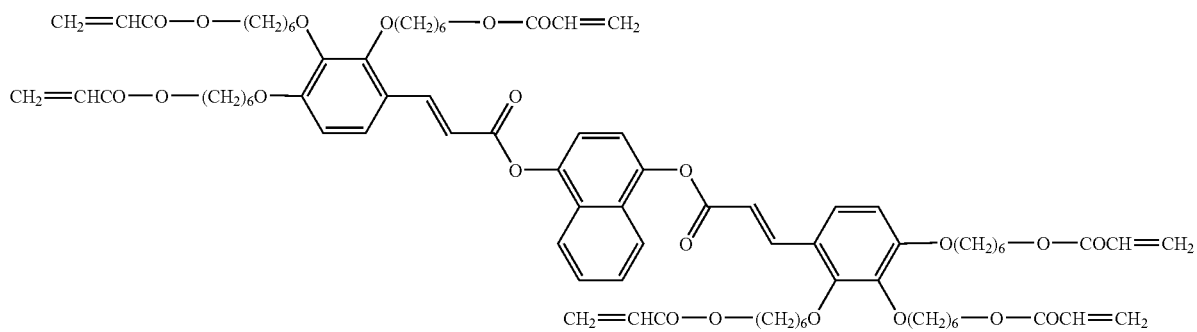
m-47
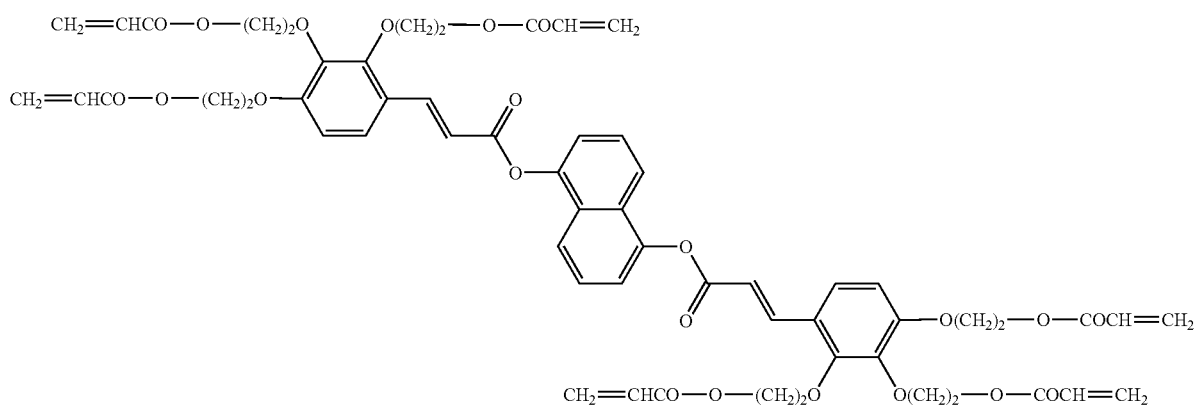
m-48
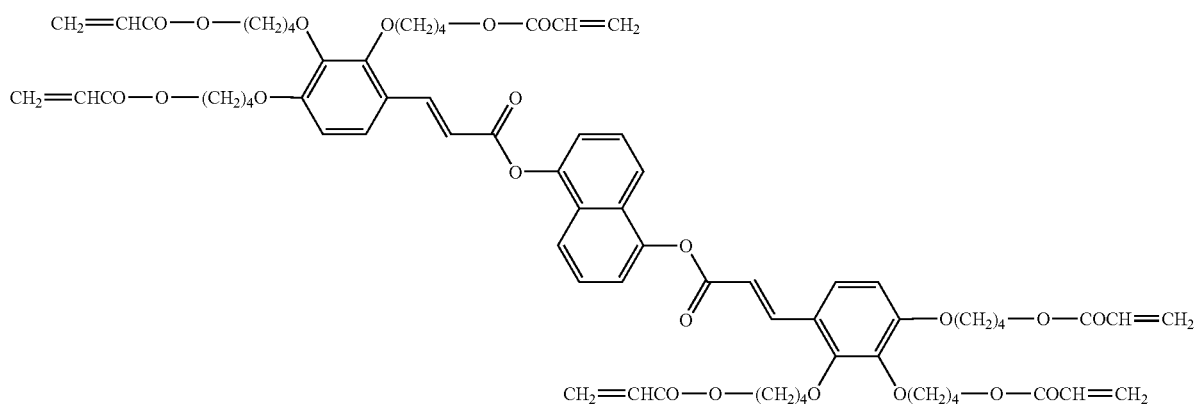
m-49
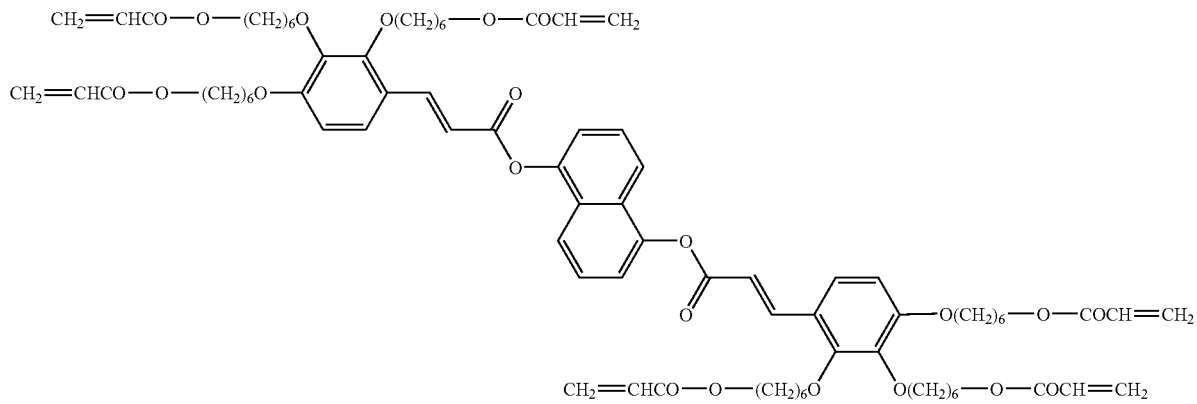
m-50

-continued
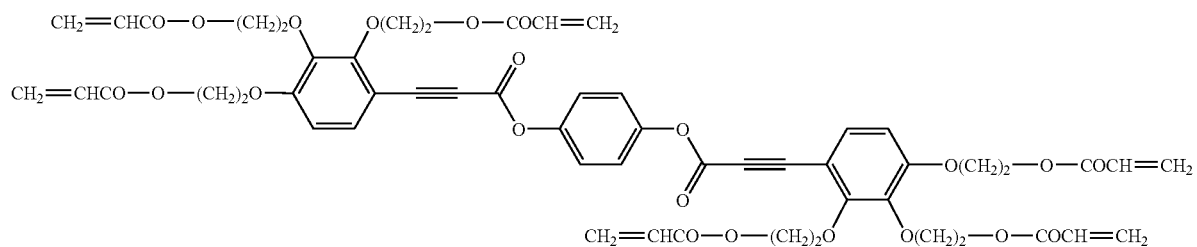
m-51
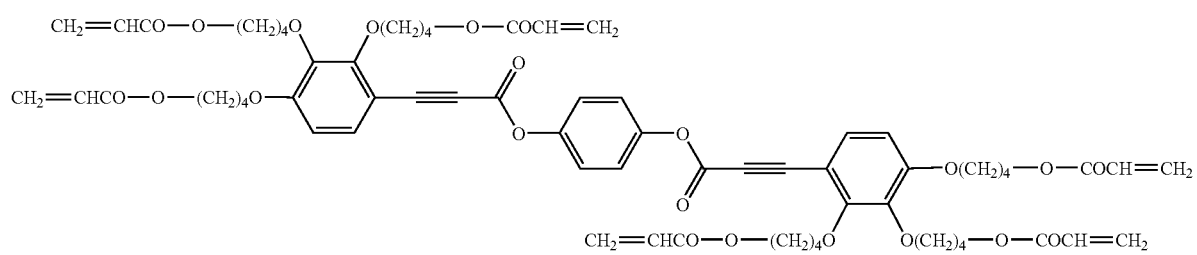
m-52
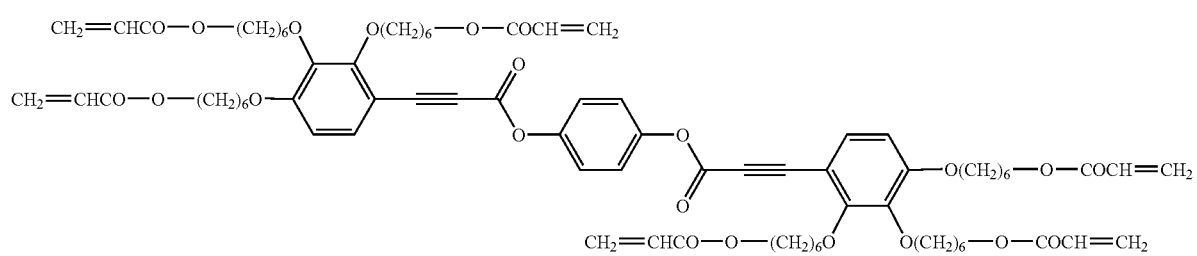
m-53
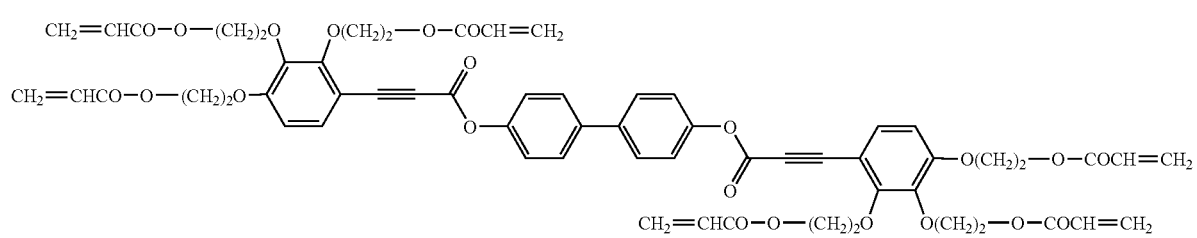
m-54
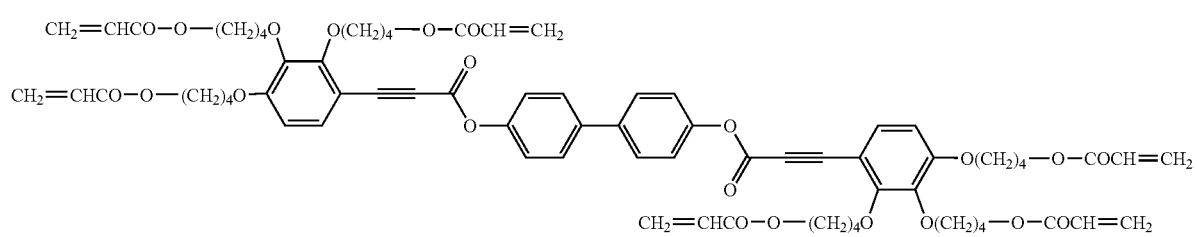
m-55
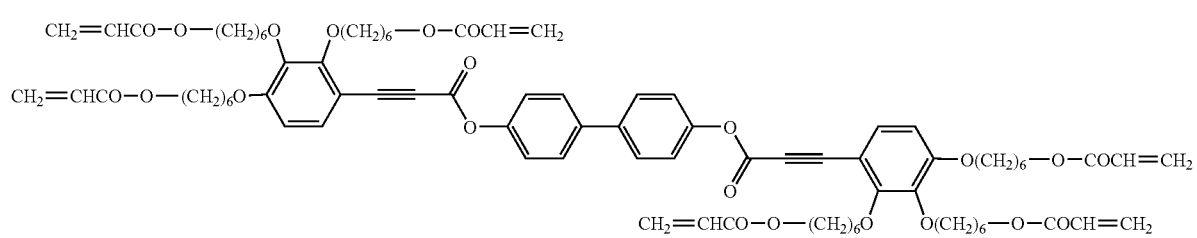
m-56

-continued
m-57
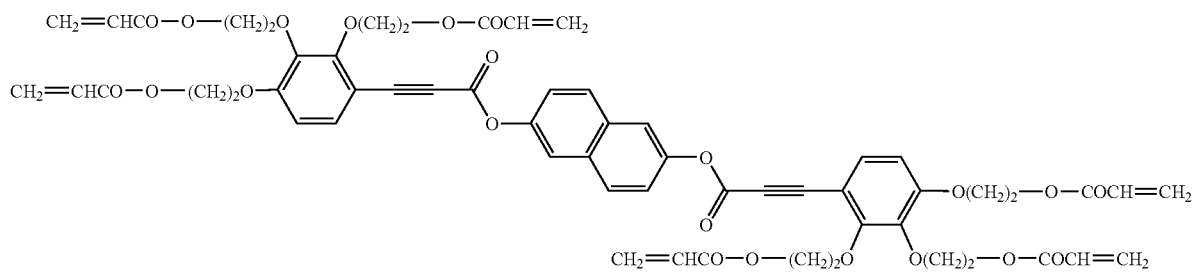
m-58
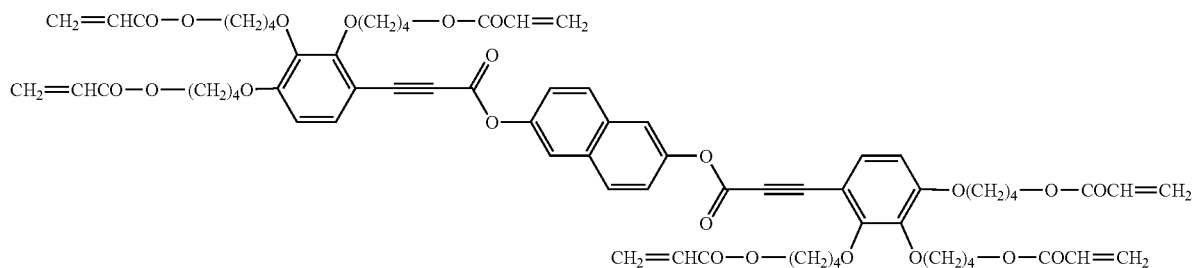
m-59
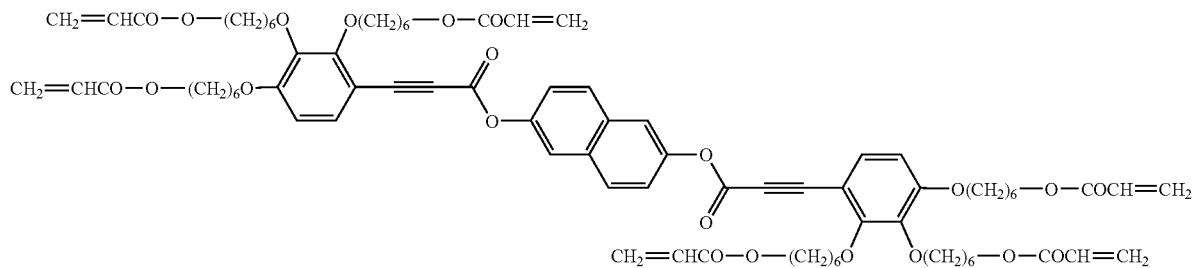
m-60
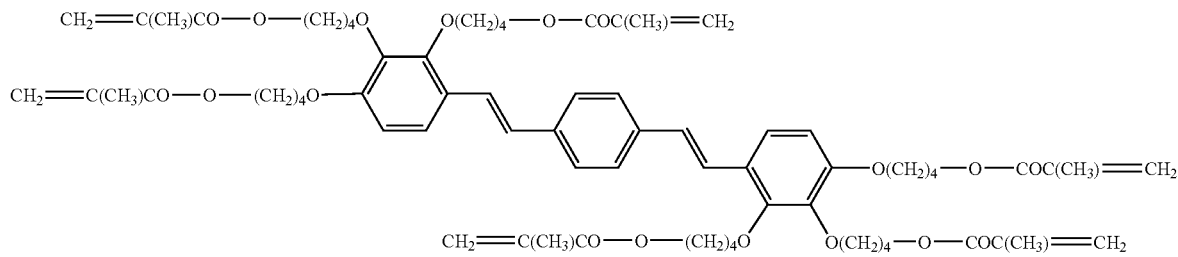
m-61
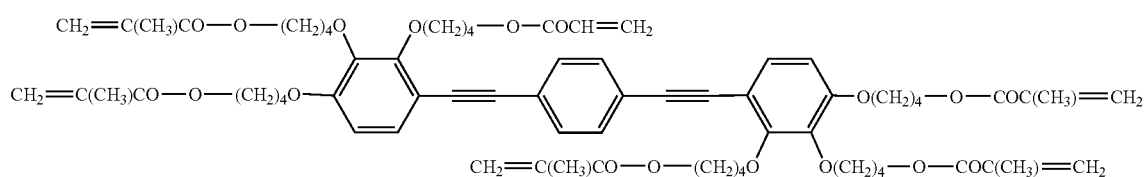

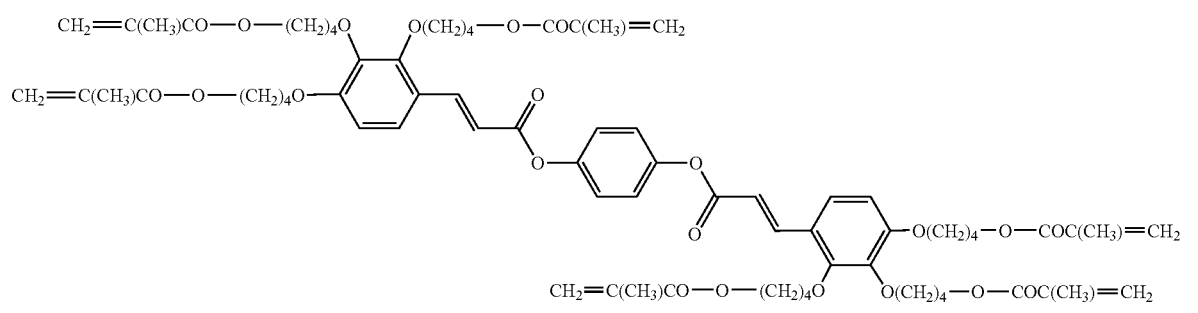
m-62
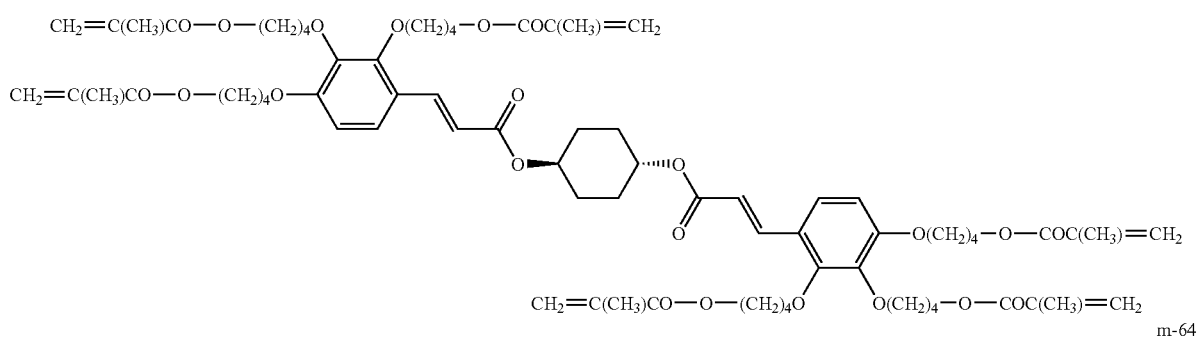
m-63
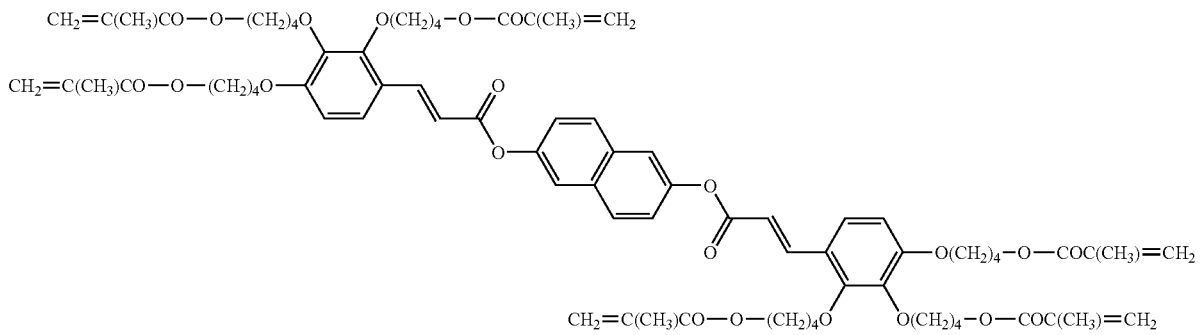
m-64
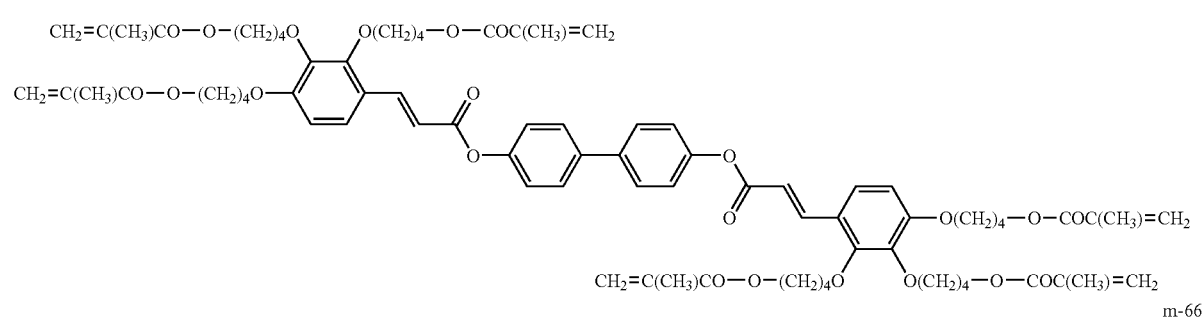
m-65
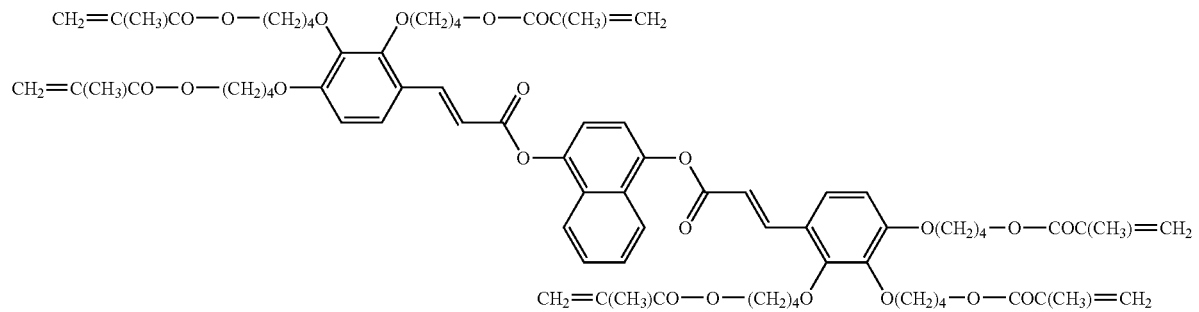
m-66

-continued
m-67
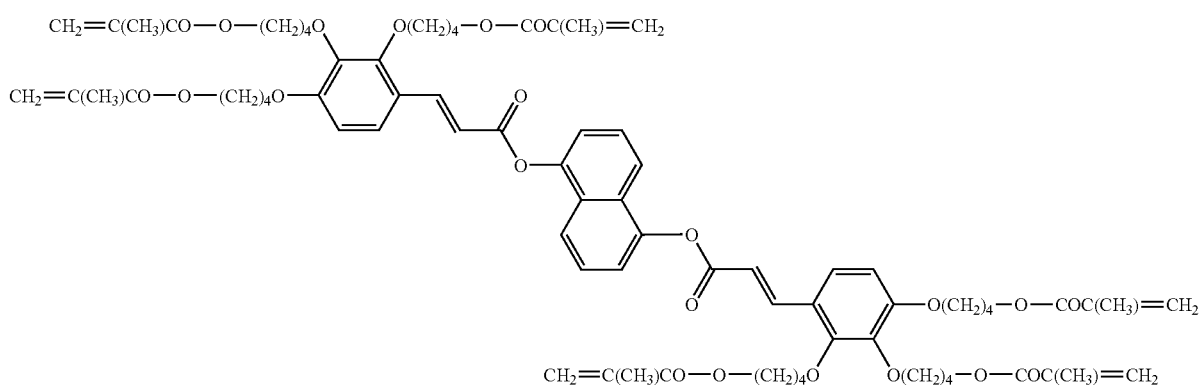
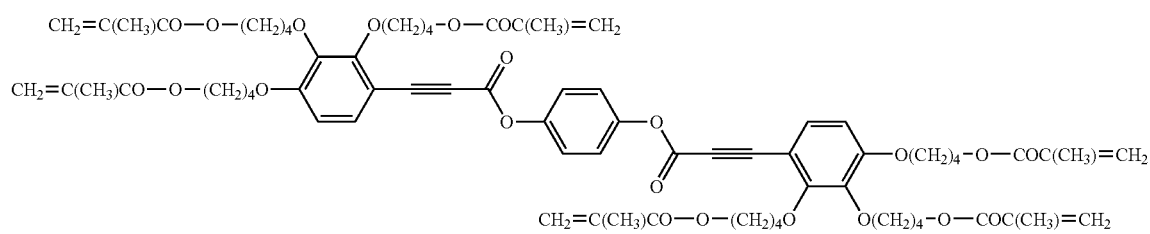
m-69
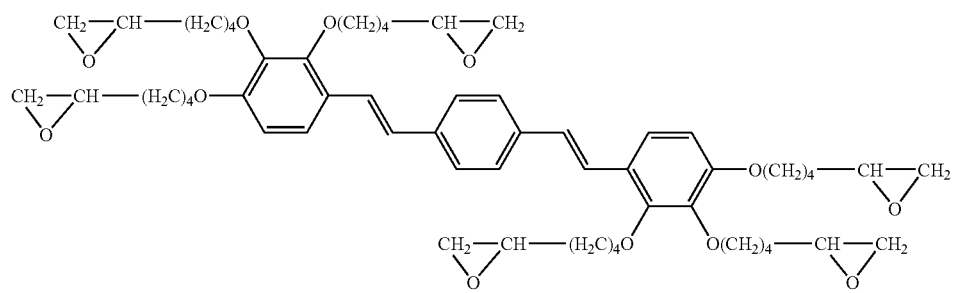
m-70
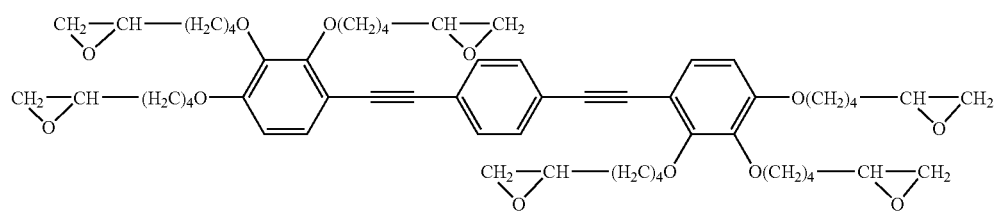
m-71
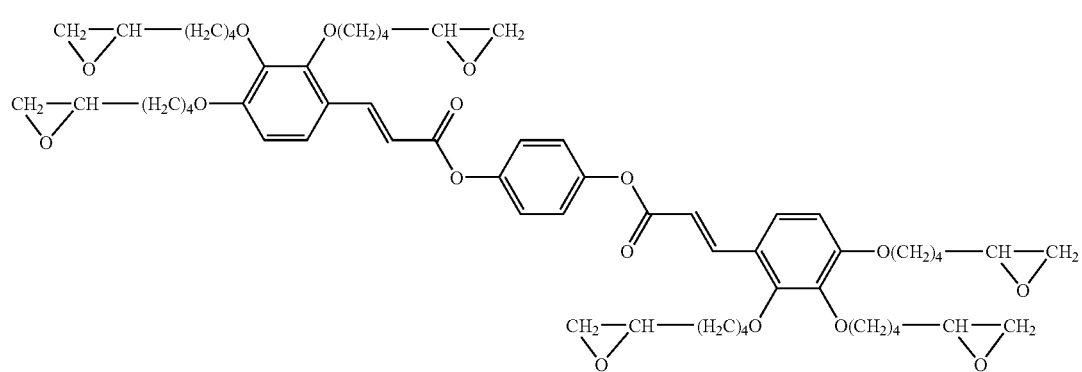

-continued
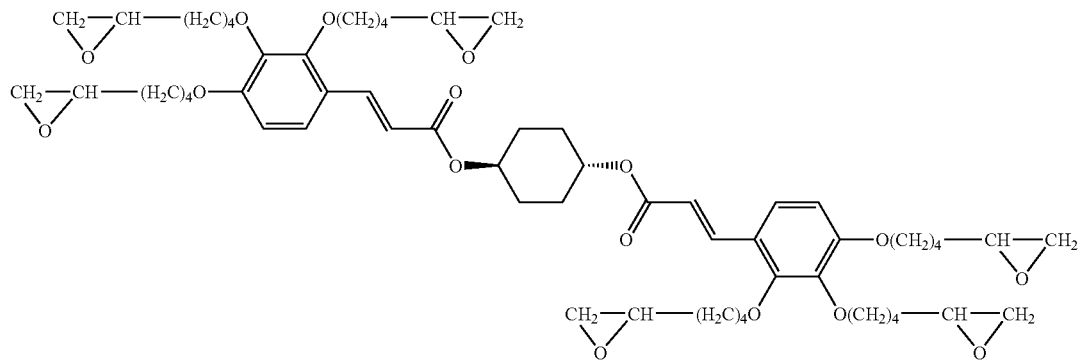
m-72
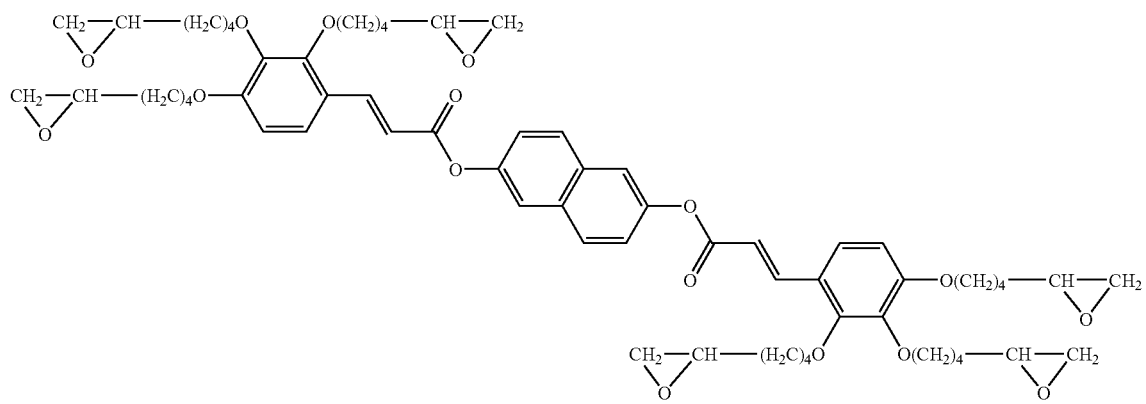
m-73
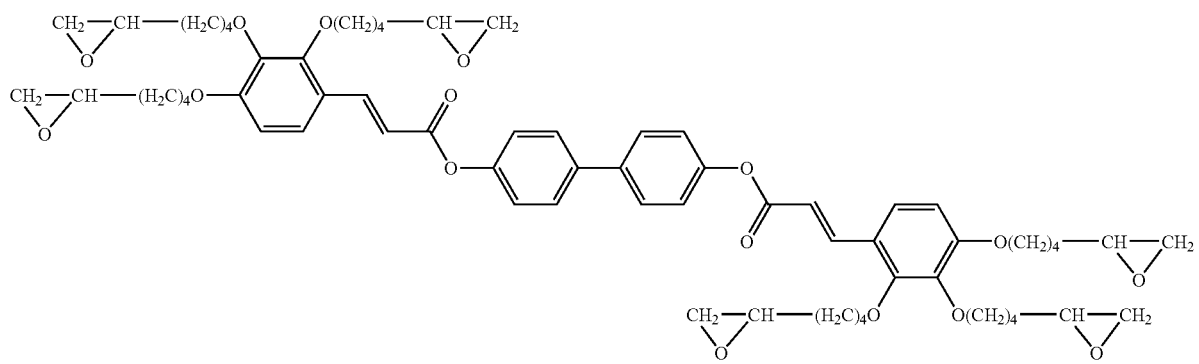
m-74
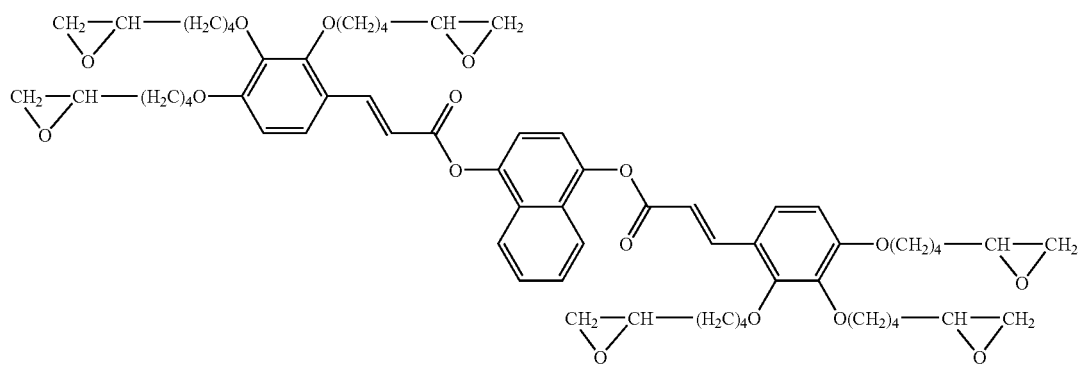
m-75

-continued
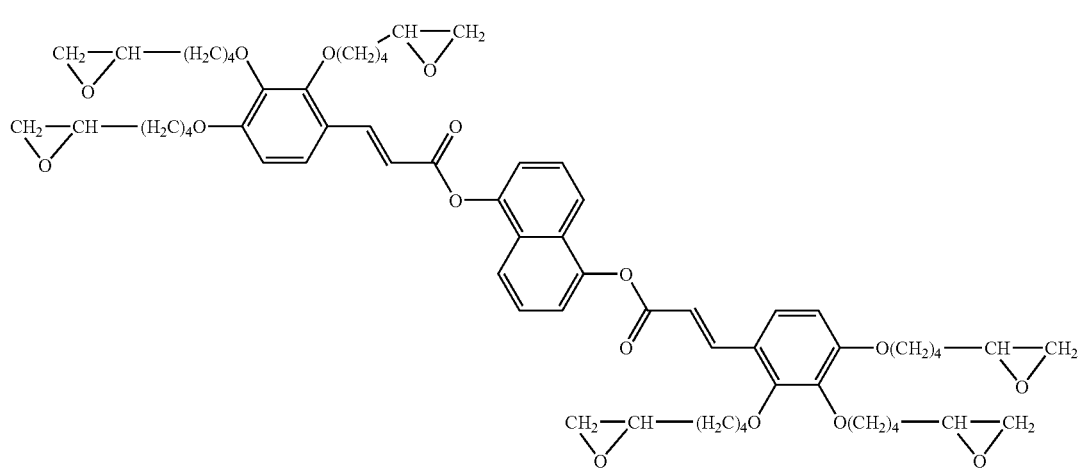
m-76
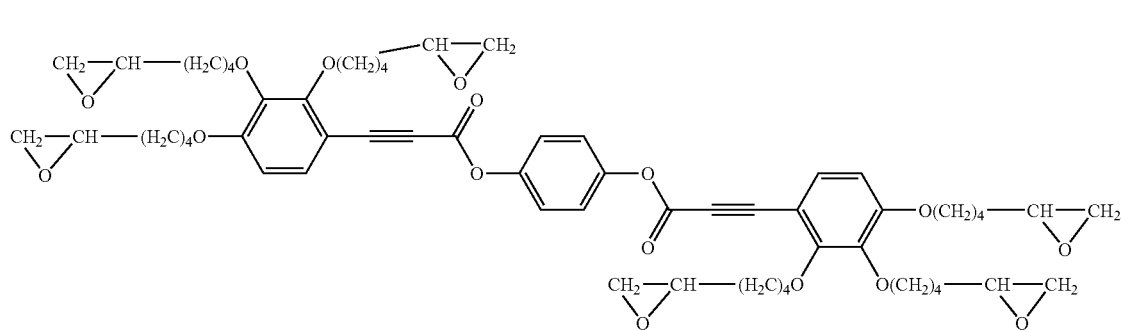
m-77
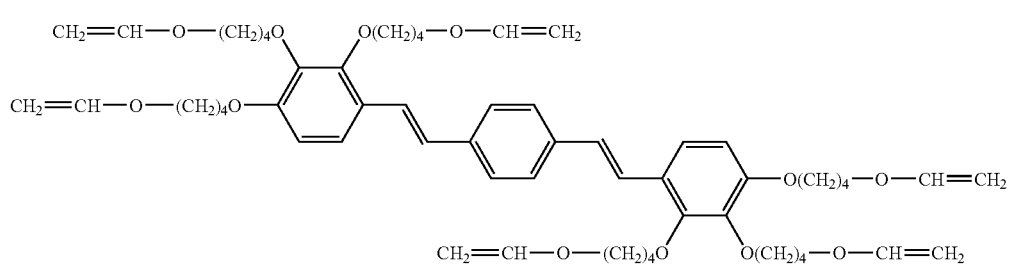
m-78
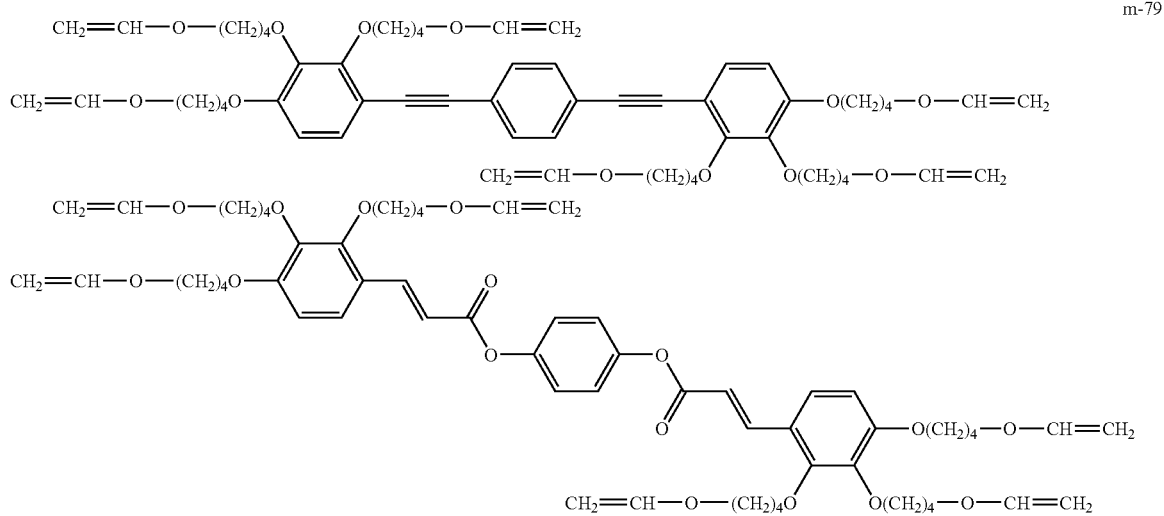
m-79

-continued
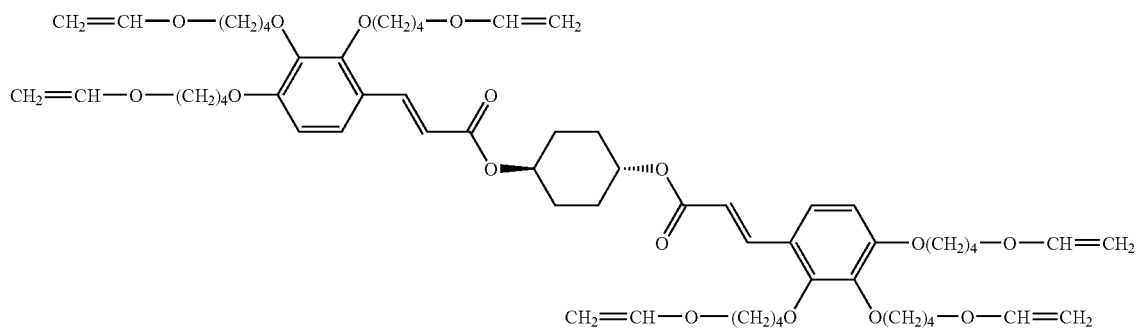
m-80
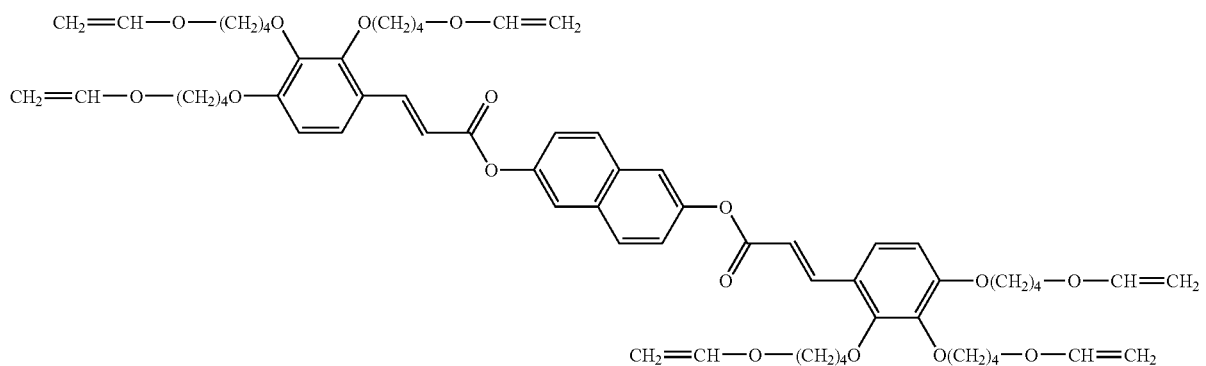
m-81
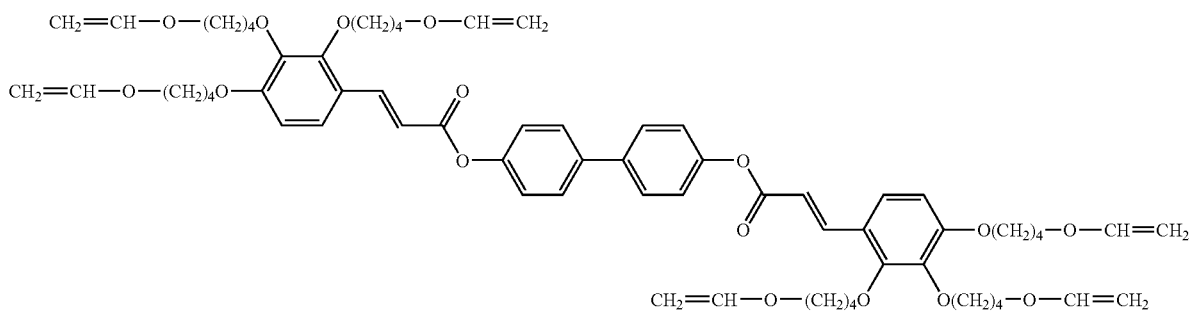
m-82
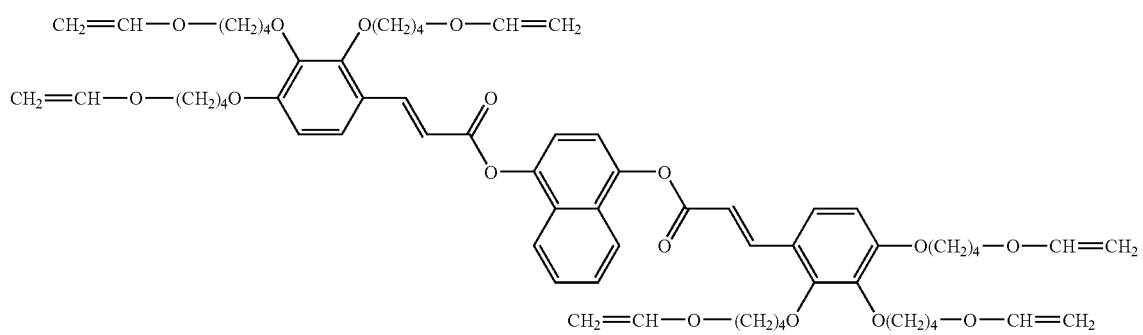
m-83

-continued
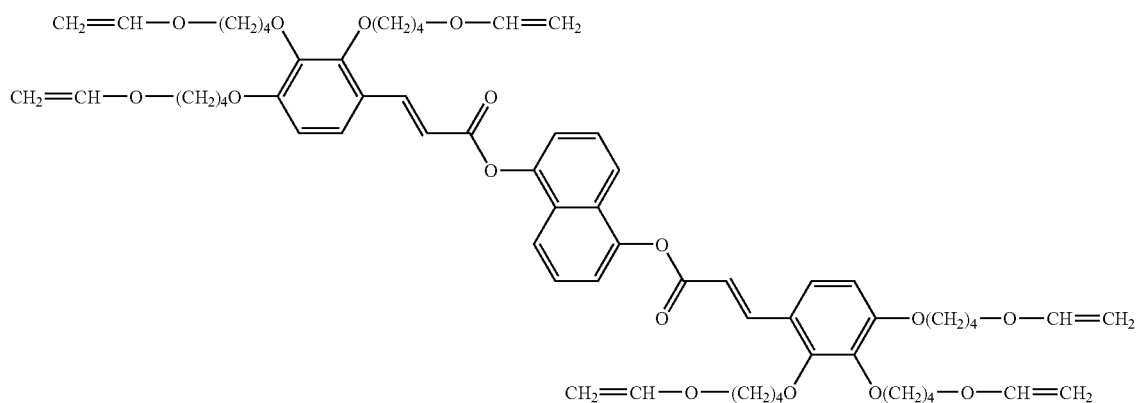
m-84
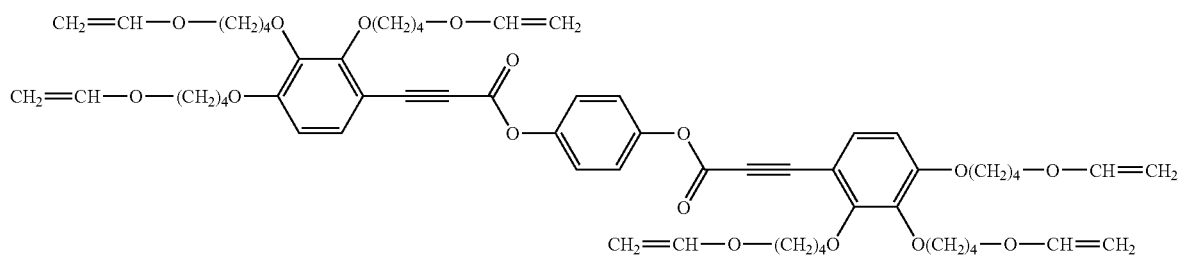
m-85
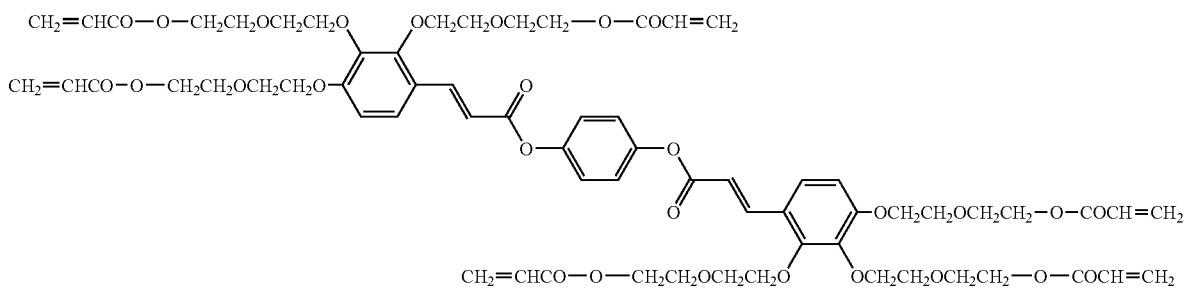
m-86
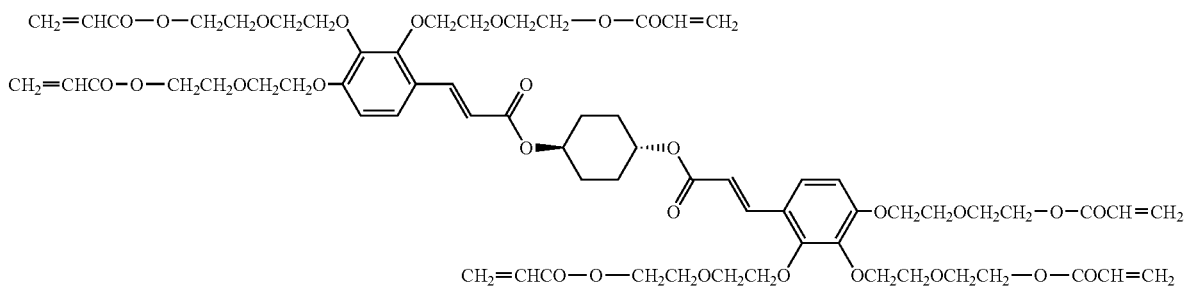
m-87

-continued
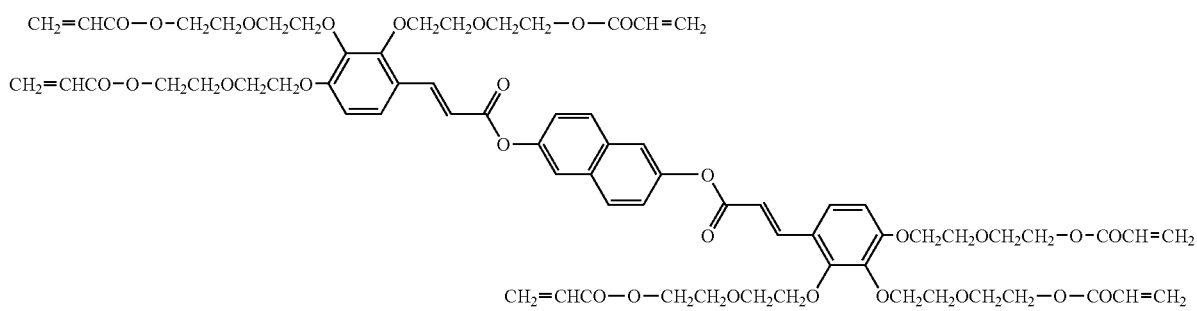
m-88
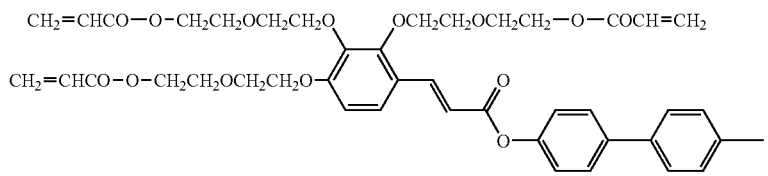
m-89
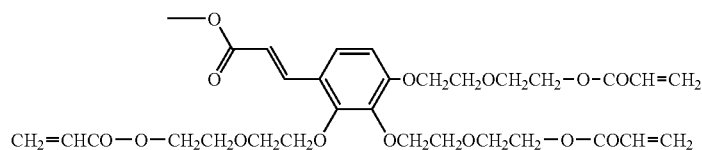
m-90
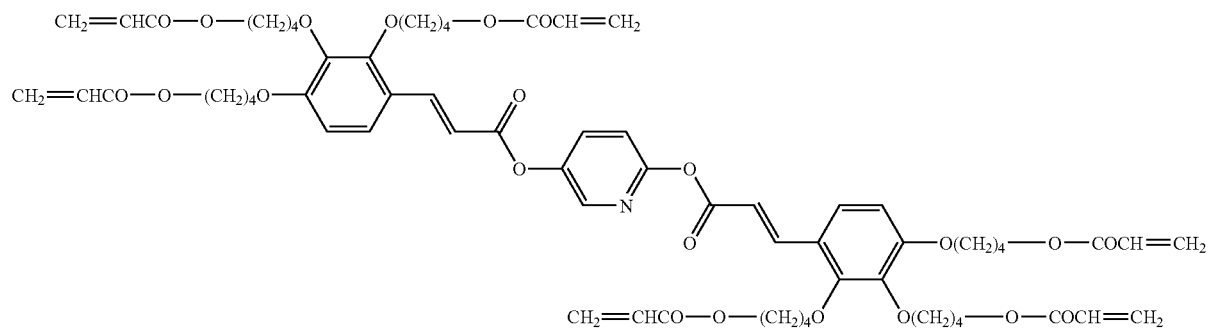
m-91
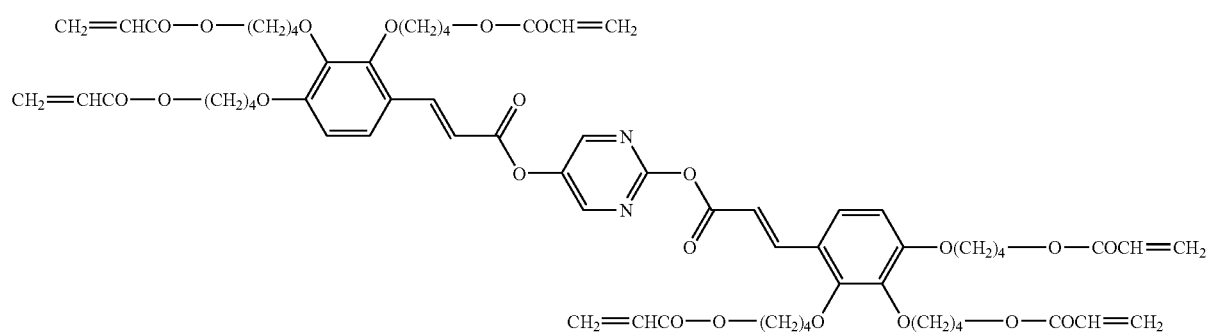

-continued
m-92
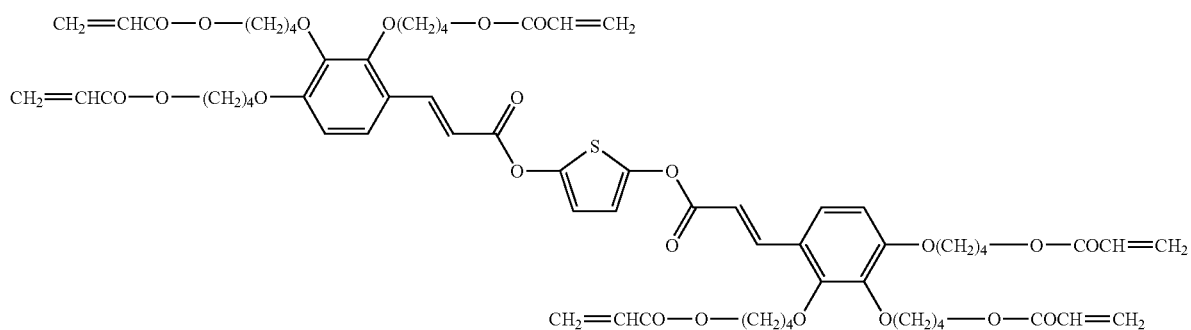
m-93
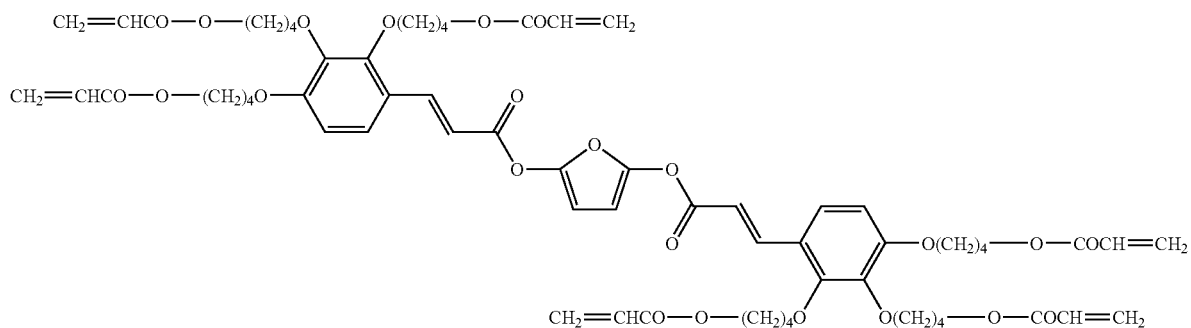
m-94
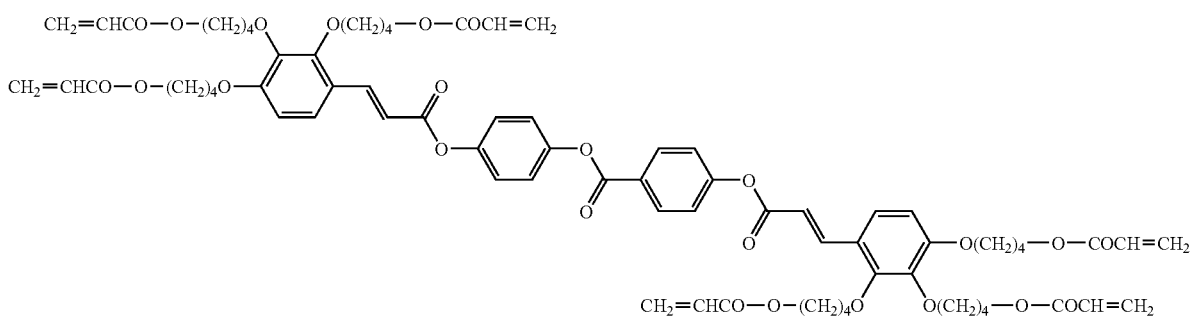
m-95
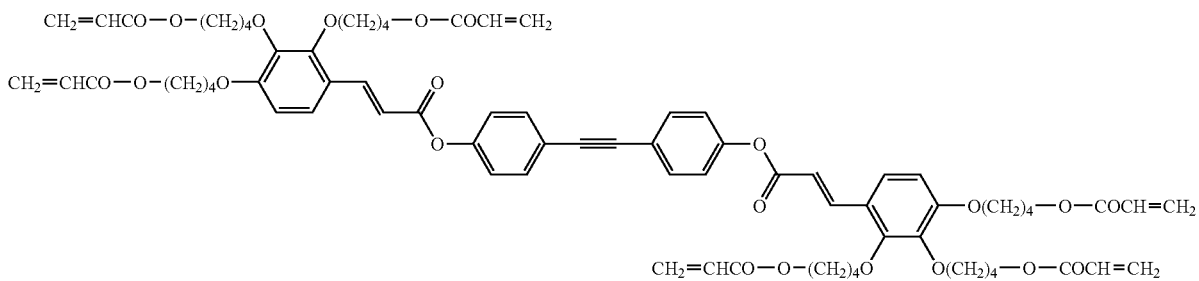

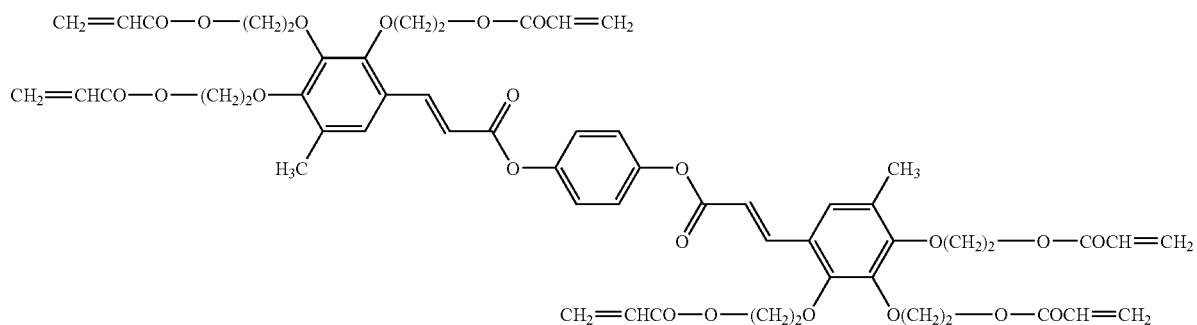
m-96
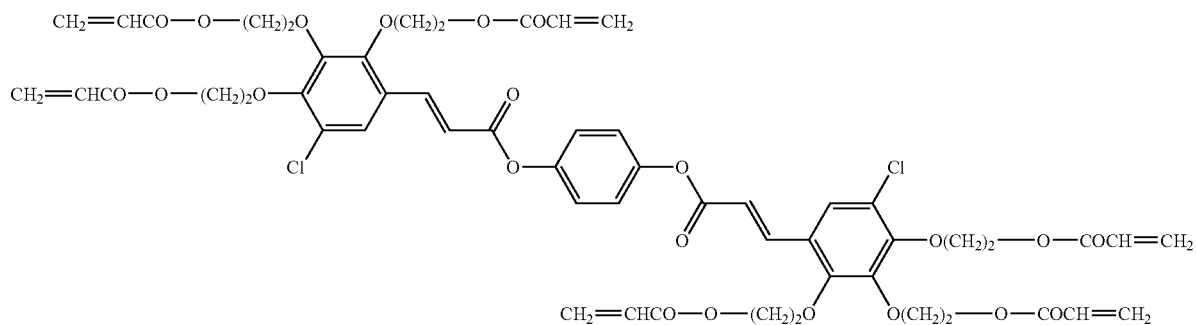
m-97
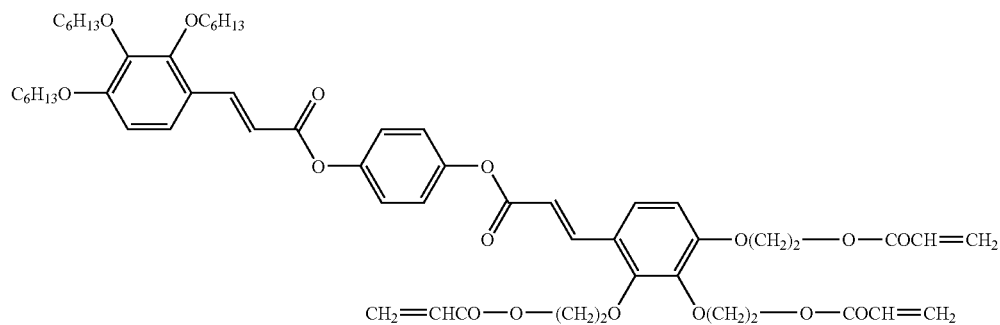
m-98
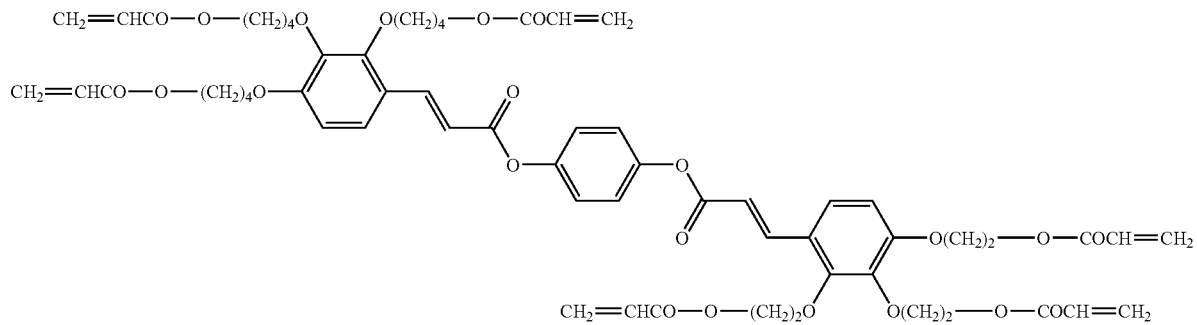
m-99

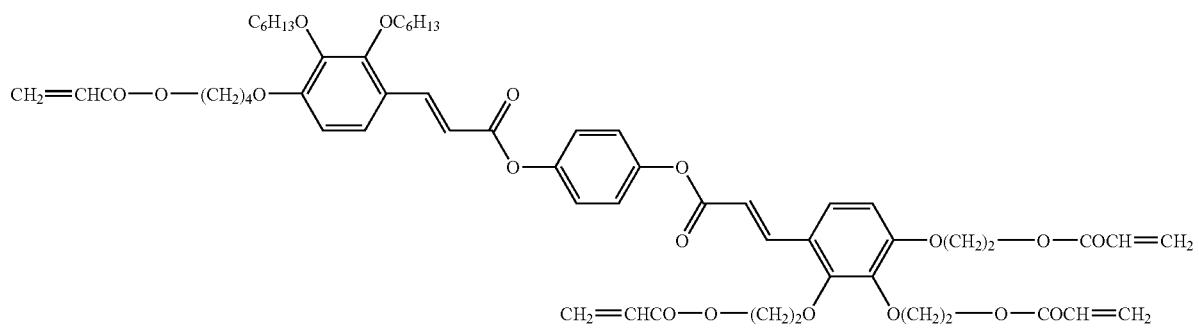
m-100
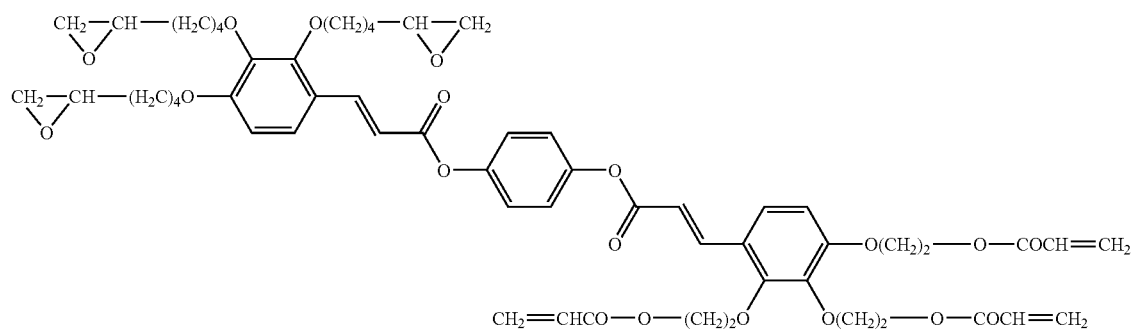
m-101
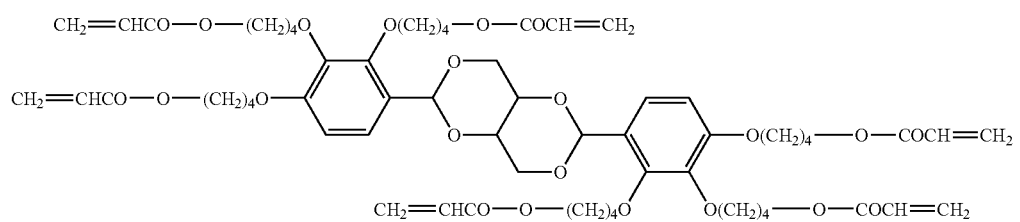
m-102

Specific examples of the polymer liquid crystal compound which can be used include the compounds described in H. F. Leube et al., *Optical investigations on a liquid-crystalline side-chain polymer with biaxial nematic and biaxial smectic A phase; Makromol. Chem.*, Vol. 192, pp. 1317–1328 (1992) and *New bilaterally linked mesogens in main-chain polymers with exhibition of biaxial fluctuation in nematic phase; Macromolecules*, Vol. 31, pp. 3537–3531 (1998).

Specific examples of the polymer liquid crystal compound other than those described above are set forth below, however, the present invention is not limited thereto.

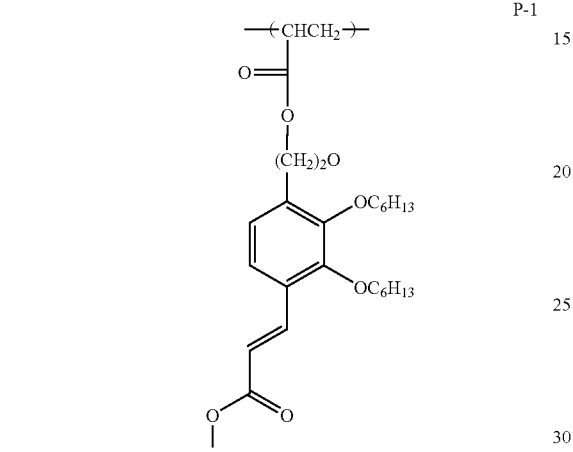

P-1

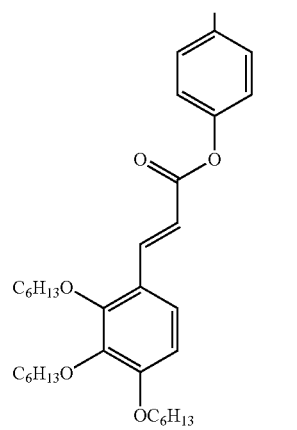

-continued

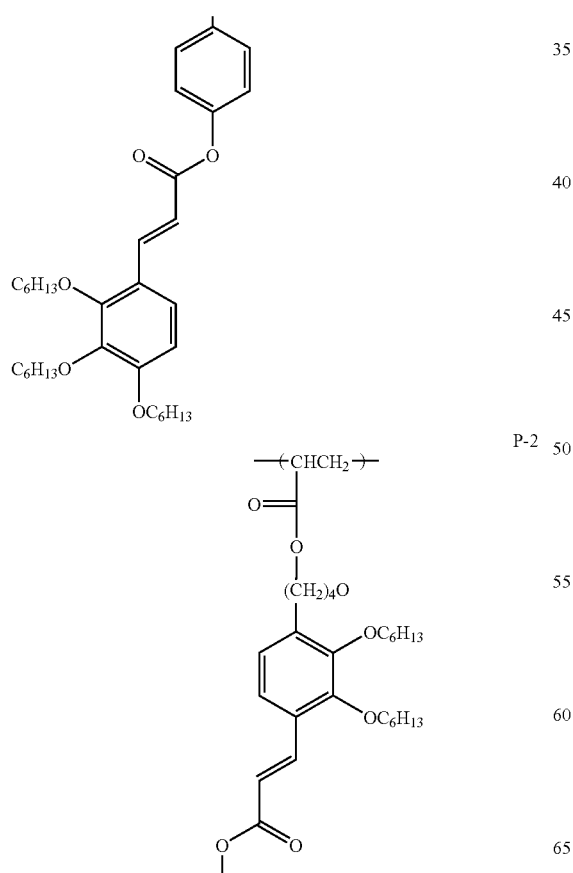

P-2

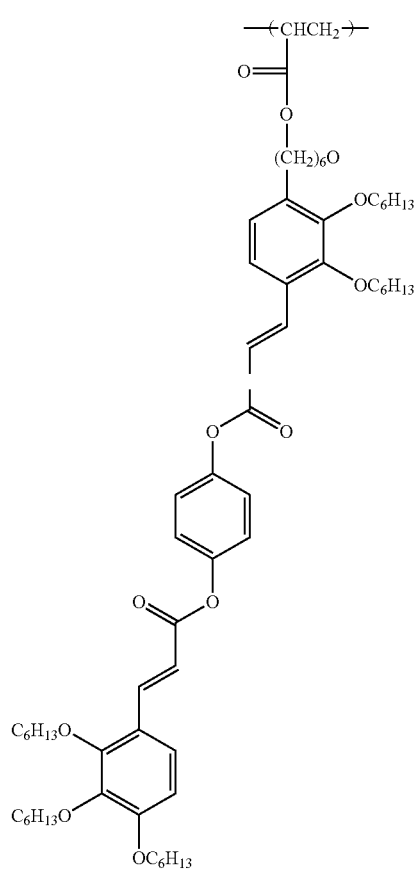

P-3

-continued
P-4
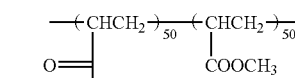
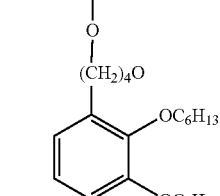
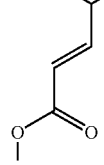
P-5
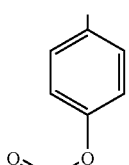
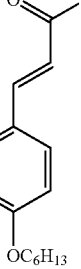
-continued
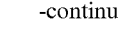
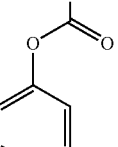
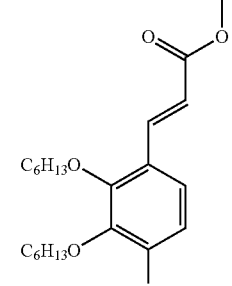
P-6
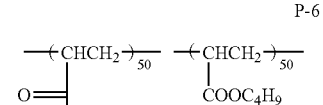
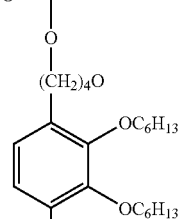
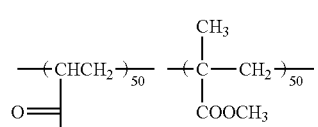
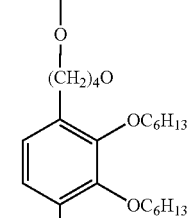
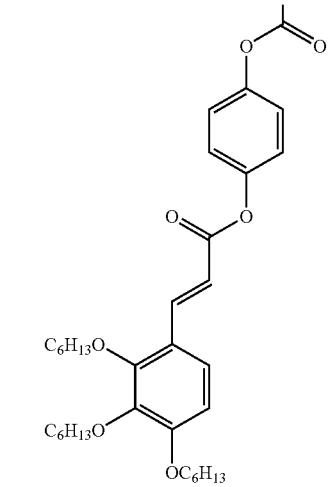

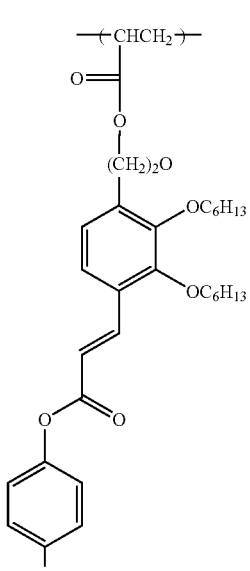
P-7
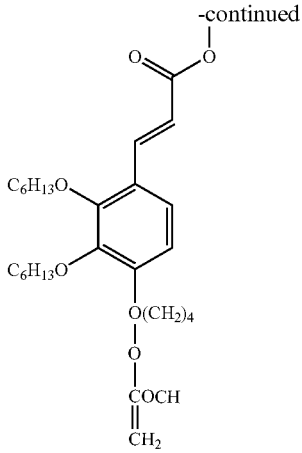
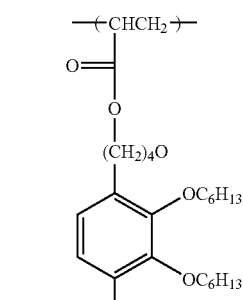
P-8
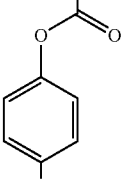
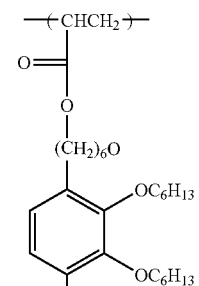
P-9

-continued
P-10
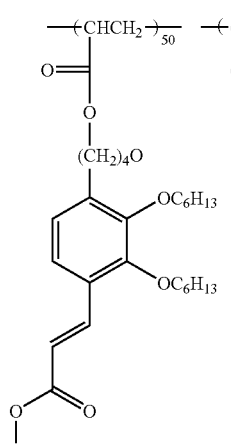
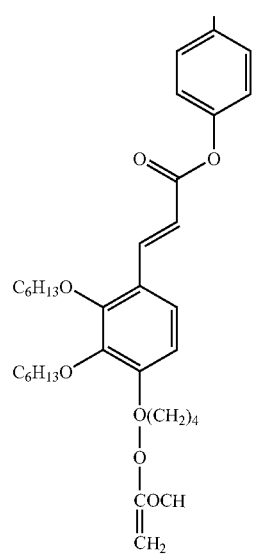
P-11
P-12
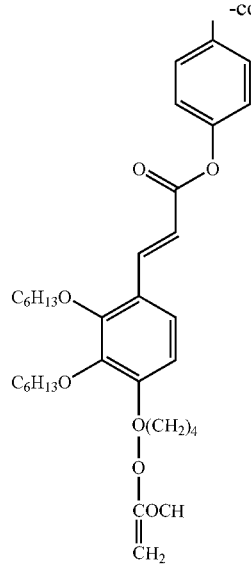
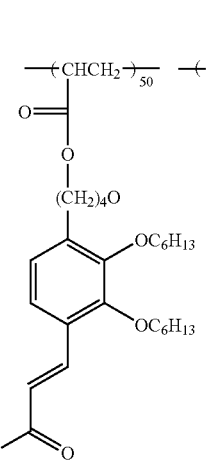
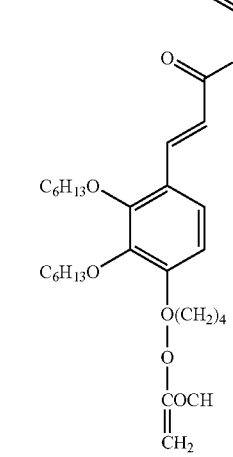

-continued
P-13
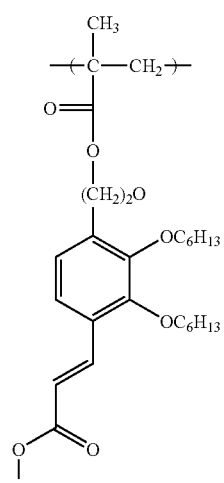
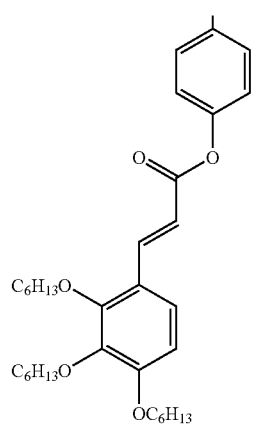
P-14
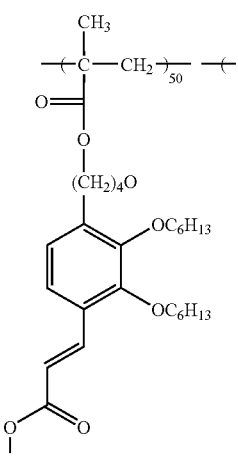
-continued
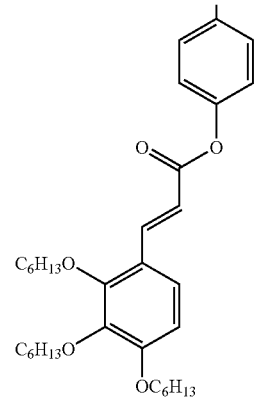
P-15
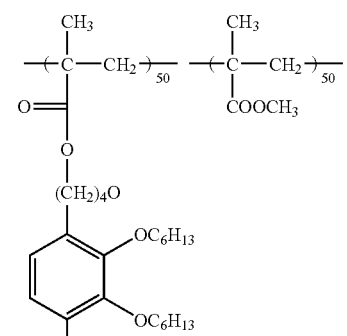

P-16
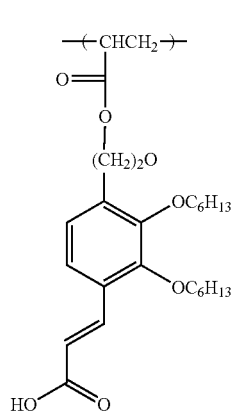
P-17
P-18
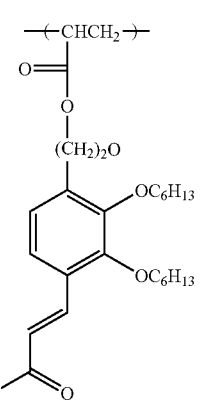
P-19

-continued
P-20
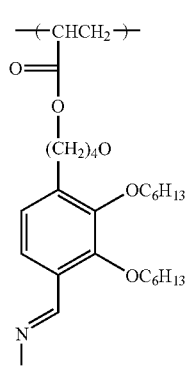
P-21
P-22
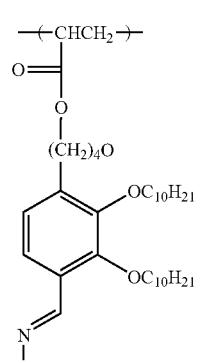
P-23

-continued

P-24

(chemical structure P-24: polymer with -(CHCH₂)- backbone, ester linkage to -(CH₂)₄O- spacer, connected through phenyl-benzoate-biphenyl-benzoate to a trisubstituted benzene bearing C₁₂H₂₅O, OC₁₂H₂₅, and OC₁₂H₂₅ groups)

As described above, in the case of a polymer liquid crystalline compound having a glass transition temperature of less than 30° C., a polymerizable group is preferably introduced. In this case, examples of the polymerizable group include specific examples (Q1 to Q17) of the polymerizable group represented by $Q_{11}$ to $Q_{16}$ of formula (B-1).

[Liquid Crystal Composition]

In the present invention, the optically anisotropic layer is formed of a liquid crystal composition containing at least one biaxial liquid crystal compound. In this liquid crystal composition, two or more biaxial liquid crystal compounds may be used in combination. Also, for example, the above-described polymerizable biaxial liquid crystal compound and a non-polymerizable biaxial liquid crystal compound may be used in combination. Furthermore, a polymerizable low molecular weight liquid crystal compound and a polymer liquid crystal compound may also be used in combination.

From the aspect of, for example, suitability for the production of a retardation plate, the liquid crystal temperature of the liquid crystal composition for use in the present invention is preferably from 10 to 200° C., more preferably from 10 to 150° C. If the liquid crystal temperature is less than 10° C., a cooling step or the like is sometimes required for lowering the temperature to the temperature range where the liquid crystal phase is provided, whereas if it exceeds 200° C., a high temperature higher than the temperature range where a liquid crystal phase is once provided is necessary for providing an isotropic liquid state and this is sometimes disadvantageous in view of waste of heat energy, deformation or deterioration of substrate, or the like.

[Optically Anisotropic Layer]

In the present invention, the optical anisotropy of the optically anisotropic layer is controlled by using a biaxial liquid crystal compound to provide optical biaxiality that main refractive indexes in three directions orthogonalized each other are different. Assuming that main refractive indexes in three directions of the optically anisotropic layer are nx, ny and nz (nx>ny>nz), respective values preferably satisfy the following formula (I), more preferably formula (II):

$nx-ny>0.005$ and $ny-nz>0.005$   Formula (I):

$nx-ny>0.01$ and $ny-nz>0.01$.   Formula (II):

In the present invention, a biaxial liquid crystal compound is oriented by using the following orientation film to form an optically anisotropic layer with optical biaxiality. Unlike the uniaxial compound, the biaxial liquid crystalline compound has different refractive indexes (nx>ny>nz) in three directions orthogonalized each other and therefore, the orientation direction in these three directions must be controlled.

In the retardation plate of the present invention, the direction having a minimum refractive index of the liquid crystal phase expressed by the biaxial liquid crystal compound almost coincides with the normal direction of the transparent support. Therefore, the orientation direction in three directions of the liquid crystal compound is preferably such that the nx refractive index direction (direction having a maximum refractive index) and the ny refractive index direction (refractive index direction having a medium refractive index) are oriented to almost orthogonalize the normal direction in the film plane of the retardation plate and the nz refractive index direction (direction having a minimum refractive index) is oriented almost in parallel to the normal direction in the film plane of the retardation plate. The nx refractive index direction may be parallel or orthogonal to the rubbing direction.

The liquid crystal composition of the present invention is coated on an orientation film. Therefore, the liquid crystalline compound is oriented at a pre-tilt angle of the orientation film at the interface with the orientation film and oriented at a pre-tilt angle of the air interface at the interface with air. In the case of a biaxial liquid crystal compound, the pre-tilt angle includes two kinds of pre-tilt angles, that is, a pre-tilt angle made by the nx refractive index direction and the interface and a pre-tilt angle made by the ny refractive index direction and the interface.

In the present invention, the term "the direction having a minimum refractive index of the biaxial liquid crystal phase is almost parallel to the normal direction of transparent support (normal direction in the film plane of retardation plate)" means that two kinds of pre-tilt angles in the side of interface with orientation film and two kinds of pre-tilt angles in the air interface side all are from 0 to 15°, preferably from 0 to 10°, namely, the angle made by the nz refractive index direction (direction having a minimum refractive index) and the normal direction of transparent support is from 0 to 15°, preferably 0 to 10°.

In the present invention, the direction having a minimum refractive index of the biaxial liquid crystal phase is preferably little changed in the thickness direction of optically anisotropic layer. The term "the direction having a minimum refractive index of the biaxial liquid crystal phase is little changed in the thickness direction of optically anisotropic layer" means that even in the region between the interface with orientation film and the air interface, the angle made by the nz refractive index direction (direction having a minimum refractive index) of liquid crystalline compound and the normal direction of transparent support almost coincides with the pre-tilt angles at the interfaces with orientation film and with air. Namely, in the present invention, the angle made by the nz refractive index direction (direction having a minimum refractive index) and the normal direction of transparent support is from 0 to 15°, preferably from 0 to 10°.

The orientation (angle formed) of liquid crystalline compound in each of these regions can be controlled by selecting the orientation film or rubbing direction thereof or by using an orientation controlling agent.

The optically anisotropic layer of the retardation plate of the present invention is formed by fixing the liquid crystalline compound without impairing the orientation form in the liquid crystal state. In the case of using a polymer compound as the liquid crystal compound, the polymer compound is once heated to a liquid crystal phase forming temperature and then cooled while maintaining the oriented state, whereby the optically anisotropic layer can be obtained. In the case of using a polymerizable compound as the liquid crystal compound, a liquid crystal composition having added thereto a polymerization initiator is heated to a liquid crystal phase forming temperature, then polymerized and cooled, whereby the optically anisotropic layer can be obtained.

The "fixed state" as used herein means most typically and most preferably a state where the orientation of a liquid crystal compound in the liquid crystal phase is maintained, however, this is not limited thereto and specifically means a state where the optically anisotropic layer does not exhibit fluidity at a temperature range usually from 0° C. to 50° C., in severer conditions, from −30° C. to 70° C. and also the fixed orientation form can be stably maintained without causing any change in the orientation form by external field or force.

When the optically anisotropic layer is finally formed, the biaxial liquid crystal compound may lose the liquid crystallinity as long as the biaxiality is maintained. For example, when a polymerizable compound is used as the liquid crystal compound, the polymerizable compound may result in having a high molecular weight and losing the liquid crystallinity as the polymerization or crosslinking reaction proceeds due to a reaction by heat, light or the like.

The optically anisotropic layer comprising a liquid crystal composition, in which the orientation of the liquid crystal compound is fixed, must have an appropriate hardness in view of suitability for the production of a retardation plate. The hardness of the optically anisotropic layer can be determined by measuring the scratch strength of the surface. The scratch strength of the surface is preferably 10 g or more, more preferably 20 g or more. The scratch strength as used herein means a load (g) when the surface of optically anisotropic layer is scratched by a sapphire needle having a conical apex angle of 90° and a tip diameter of 0.25 mm at a rate of 1 cm/sec and a scratch mark is observed with an eye.

The surface energy on the surface of optically anisotropic layer is preferably 45 mN/m or less, more preferably from 20 to 43 mN/m, so as to reduce the pre-tilt angle of the liquid crystal compound at the air interface and thereby prevent the liquid crystal phase from causing orientation disorder at the air interface and having an orientation deprived of biaxiality, such as hybrid alignment. The surface energy on the surface of optically anisotropic layer can be decreased by an air interface orientation controlling agent. The orientation controlling agent can be appropriately used according to the state of liquid crystal phase to adjust the surface energy.

The surface energy of a solid can be determined by a contact angle method, a wetting heat method or an adsorption method as described in *Nure no Kiso to Oyo* (*Elemental and Application of Wetting*), Realize (Dec. 10, 1989). In the case of optically anisotropic layer of the present invention, the contact angle method is preferred.

More specifically, a solution of water and diiodo-methane, which surface energy is known, is dropped on the optically anisotropic layer and by defining that out of angles made by the tangent of liquid droplet and the optically anisotropic layer surface at the intersection of the liquid droplet surface and the optically anisotropic layer surface, the angle including the liquid droplet is the contact angle, the surface energy of the optically anisotropic layer can be calculated by computation.

In the present invention, the thickness of the optically anisotropic layer formed of a liquid crystal composition is preferably from 0.1 to 20 μm, more preferably from 0.5 to 15 μm, and most preferably from 1 to 10 μm.

[Air Interface Orientation Controlling Agent]

At the air interface, the biaxial liquid crystal compound is oriented at a pre-tilt angle of the air interface. As described above, the pre-tilt angle includes two kinds of pre-tilt angles, that is, a pre-tilt angle made by the nx refractive index direction and the air interface and a pre-tilt angle made by the ny refractive index direction and the air interface. This pre-tilt angle can be controlled by using an external field such as electric field or magnetic field or by using an additive. From the standpoint of adjusting the orientation state, the pre-tilt angle is preferably controlled also in the present invention. In particular, the pre-tilt angle is preferably controlled by using an additive.

This additive is preferably a compound containing one or more, more preferably two or more, substituted or unsubstituted aliphatic group(s) having from 6 to 40 carbon atoms, or substituted or unsubstituted aliphatic substituted oligosiloxanoxy group(s) having from 6 to 40 carbon atoms.

In particular, a compound represented by the following formula (V) is preferred. This compound is, as described in JP-A-2002-174730, an additive capable of realizing a biaxial liquid crystal phase when used together even in the case where a liquid crystal compound prone to hybrid alignment or a liquid crystal compound of readily causing orientation disorder due to the high pre-tilt angle of molecule at the air interface is used as the low molecular weight liquid crystal compound.

Formula (V) is described in detail below.

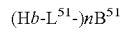 Formula (V):

wherein Hb represents an aliphatic group having from 6 to 40 carbon atoms or an aliphatic substituted oligosiloxanoxy group having from 6 to 40 carbon atoms.

Hb is preferably an aliphatic group having from 6 to 40 carbon atoms, more preferably a fluorine-substituted aliphatic group having from 6 to 40 carbon atoms or a branched aliphatic group having from 6 to 40 carbon atoms, and most preferably a fluorine-substituted alkyl group having from 6 to 40 carbon atoms or a branched alkyl group having from 6 to 40 carbon atoms.

The aliphatic group is preferably a chained aliphatic group rather than a cyclic aliphatic group. The chained aliphatic group may have a branch. The number of carbon atoms in the aliphatic group is preferably from 7 to 35, more preferably from 8 to 30, still more preferably from 9 to 25, and most preferably from 10 to 20.

Examples of the aliphatic group include an alkyl group, a substituted alkyl group, an alkenyl group, a substituted alkenyl group, an alkynyl group and a substituted alkynyl group. Among these, an alkyl group, a substituted alkyl group, an alkenyl group and a substituted alkenyl group are preferred, and an alkyl group and a substituted alkyl group are more preferred.

Examples of the substituent of the aliphatic group include a halogen atom, a hydroxyl group, a cyano group, a nitro group, an alkoxy group, a substituted alkoxy group (e.g., oligoalkoxy), an alkenyloxy group (e.g., vinyloxy), an acyl group (e.g., acryloyl, methacryloyl), an acyloxy group (e.g., acryloyloxy, benzoyloxy), a sulfamoyl group, an aliphatic substituted sulfamoyl group and an epoxyalkyl group (e.g., epoxyethyl). Among these, a halogen atom is preferred and a fluorine atom is more preferred. In the fluorine-substituted aliphatic group, the percentage of fluorine atom substituting the hydrogen atom of the aliphatic group is preferably from 50 to 100%, more preferably from 60 to 100%, still more preferably from 70 to 100%, particularly preferably from 80 to 100%, and most preferably from 85 to 100%.

The number of carbon atoms in the aliphatic substituted oligosiloxanoxy group is preferably from 7 to 35, more preferably from 8 to 30, still more preferably from 9 to 25, and most preferably from 10 to 20. The aliphatic substituted oligosiloxanoxy group is represented by the following formula:

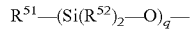

$$R^{51}-(Si(R^{52})_2-O)_q-$$

wherein $R^{51}$ represents a hydrogen atom, a hydroxyl group or an aliphatic group, $R^{52}$ represents a hydrogen atom, an aliphatic group or an alkoxy group, and q represents any one integer of 1 to 12.

The aliphatic group represented by each of $R^{51}$ and $R^{52}$ is preferably a chained aliphatic group rather than a cyclic aliphatic group. The chained aliphatic group may have a branch. The number of carbon atoms in the aliphatic group is preferably from 1 to 12, more preferably from 1 to 8, still more preferably from 1 to 6, particularly preferably from 1 to 4.

Examples of the aliphatic group represented by each of $R^{51}$ and $R^{52}$ include an alkyl group, a substituted alkyl group, an alkenyl group, a substituted alkenyl group, an alkynyl group and a substituted alkynyl group. Among these, an alkyl group, a substituted alkyl group, an alkenyl group and a substituted alkenyl group are preferred, and an alkyl group and a substituted alkyl group are more preferred.

The aliphatic group represented by each of $R^{51}$ and $R^{52}$ may have a substituent and examples of the substituent include a halogen atom, a hydroxyl group, a cyano group, a nitro group, an alkoxy group, a substituted alkoxy group (e.g., oligoalkoxy), an alkenyloxy group (e.g., vinyloxy), an acyl group (e.g., acryloyl, methacryloyl), an acyloxy group (e.g., acryloyloxy, benzoyloxy), a sulfamoyl group, an aliphatic substituted sulfamoyl group and an epoxyalkyl group (e.g., epoxyethyl).

The alkoxy group represented by $R^{52}$ may have a cyclic structure or a branch. The number of carbon atoms in the alkoxy group is preferably from 1 to 12, more preferably from 1 to 8, still more preferably from 1 to 6, particularly preferably from 1 to 4.

Examples of Hb are set forth below.
Hb1: n-$C_{16}H_{33}$—
Hb2: n-$C_{20}H_{41}$—
Hb3: n-$C_6H_{13}$—CH(n-$C_4H_9$)—$CH_2$—$CH_2$—
Hb4: n-$C_{12}H_{25}$—
Hb5: n-$C_{18}H_{37}$—
Hb6: n-$C_{14}H_{29}$—
Hb7: n-$C_{15}H_{31}$—
Hb8: n-$C_{10}H_{21}$—
Hb9: n-$C_{10}H_{21}$—CH(n-$C_4H_9$)—$CH_2$—$CH_2$—
Hb10: n-$C_8H_{17}$—
Hb11: n-$C_8H_{17}$—
Hb12: $CH(CH_3)_2$—$\{C_3H_6$—$CH(CH_3)\}_3$—$C_2H_4$—
Hb13: $CH(CH_3)_2$—$\{C_3H_6$—$CH(CH_3)\}_2$—$C_3H_6$—C($CH_3$)=CH—$CH_2$—
Hb14: n-$C_8H_{17}$—CH(n-$C_6H_{13}$)—$CH_2$—$CH_2$—
Hb15: n-$C_6H_{13}$—CH($C_2H_5$)—$CH_2$—$CH_2$—
Hb16: n-$C_8H_{17}$—CH(n-$C_4F_9$)—$CH_2$—
Hb17: n-$C_8F_{17}$—CF(n-$C_6F_{13}$)—$CF_2$—$CF_2$—
Hb18: n-$C_3F_7$—CF($CF_3$)—$CF_2$—
Hb19: $Si(CH_3)_2$—$\{Si(CH_2)_2$—O$\}_6$—O—
Hb20: $Si(OC_3H_7)(C_{16}F_{33})(C_2H_4$—$SO_2$—NH—$C_8F_{17}$)—O—

In formula (V), $L^{51}$ represents a single bond or a divalent linking group.

The divalent linking group is preferably a group selected from the group consisting of an alkylene group, a fluorine-substituted alkylene group, —O—, —S—, —CO—, —NR—, —$SO_2$— and a combination thereof. Here, R is a hydrogen atom or an alkyl group having from 1 to 20 carbon atoms, preferably a hydrogen atom or an alkyl group having from 1 to 15 carbon atoms, more preferably a hydrogen atom or an alkyl group having from 1 to 12 carbon atoms.

The number of carbon atoms in the alkylene group or fluorine-substituted alkylene group is preferably from 1 to 40, more preferably from 1 to 30, still more preferably from 1 to 20, particularly preferably from 1 to 15, and most preferably from 1 to 12.

Examples of $L^{51}$ are set forth below. The left side is bonded to Hb and the right side is bonded to $B^{51}$.
$L^{51}$10: single bond
$L^{51}$11: —O—
$L^{51}$12: —O—CO—
$L^{51}$13: CO—$C_4H_8$—O—
$L^{51}$14: —O—$C_2H_4$—O—$C_2H_4$—O—
$L^{51}$15: —S—
$L^{51}$16: —N(n-$C_{12}H_{25}$)—
$L^{51}$17: —$SO_2$—N—(n-$C_3H_7$)—$CH_2CH_2$—O—
$L^{51}$18: —O—$\{CF(CF_3)$—$CF_2$—O$\}_3$—$CF(CF_3)$—

In formula (V), n represents any one integer of 2 to 12. n is preferably any one integer of 2 to 9, more preferably any one integer of 2 to 6, still more preferably 2, 3 or 4, and most preferably 3 or 4.

In formula (V), $B^{51}$ is an n-valent linking group containing at least one cyclic structure. $B^{51}$ is preferably an n-valent group containing at least three cyclic structures, more preferably an n-valent group represented by the following formula (V-a):

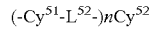

$$(-Cy^{51}-L^{52}-)_n Cy^{52} \quad \text{Formula (V-a):}$$

In formula (V-a), $Cy^{51}$ represents a divalent cyclic group. $Cy^{51}$ is preferably a divalent aromatic hydrocarbon group or a divalent heterocyclic group, more preferably a divalent aromatic hydrocarbon group.

The divalent aromatic hydrocarbon group means an arylene group or a substituted arylene group.

Examples of the arylene group include a phenylene group, an indenylene group, a naphthylene group, a fluorenylene group, a phenanthrenylene group, an anthrenylene group and a pyrenylene group. Among these, a phenylene group and a naphthylene group are preferred.

Examples of the substituent of the substituted arylene group include an aliphatic group, an aromatic hydrocarbon group, a heterocyclic group, a halogen atom, an alkoxy group (e.g., methoxy, ethoxy, methoxyethoxy), an aryloxy group (e.g., phenoxy), an arylazo group (e.g., phenylazo), an alkylthio group (e.g., methylthio, ethylthio, propylthio), an alkylamino group (e.g., methylamino, propylamino), an acyl group (e.g., acetyl, propanoyl, octanoyl, benzoyl), an acyloxy group (e.g., acetoxy, pivaloyloxy, benzoyloxy), a hydroxyl group, a mercapto group, an amino group, a carboxyl group, a sulfo group, a carbamoyl group, a sulfamoyl group and a ureido group.

Also, the substituent may be a group corresponding to Hb-$L^{51}$-.

The divalent heterocyclic group represented by $Cy^{51}$ preferably contains a 5-, 6- or 7-membered heterocyclic ring, more preferably a 5- or 6-membered ring, and most preferably a 6-membered ring. The heteroatom constituting the heterocyclic ring is preferably a nitrogen atom, an oxygen atom or a sulfur atom. The heterocyclic ring is preferably an aromatic heterocyclic ring. The aromatic heterocyclic ring is generally an unsaturated heterocyclic ring. An unsaturated heterocyclic ring having a largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyrane ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring.

The heterocyclic ring may be condensed with another heterocyclic ring, an aliphatic ring or an aromatic hydrocarbon ring. Examples of the condensed heterocyclic ring include a benzofuran ring, an isobenzofuran ring, a benzothiophene ring, an indole ring, an indoline ring, an isoindole ring, a benzoxazole ring, a benzothiazole ring, an indazole ring, a benzimidazole ring, a chromene ring, a chroman ring, an isochroman ring, a quinoline ring, an isoquinoline ring, a cinnoline ring, a phthalazine ring, a quinazoline ring, a quinoxaline ring, a dibenzofuran ring, a carbazole ring, a xanthene ring, an acridine ring, a phenanthridine ring, a phenanthroline ring, a phenazine ring, a phenoxazine ring, a thianthrene ring, an indolizine ring, a quinolidine ring, a quinuclidine ring, a naphthylidine ring, a purine ring and a pteridine ring.

The divalent heterocyclic group may have a substituent. Examples of the substituent are the same as examples of the substituent of the substituted arylene group.

The divalent heterocyclic group may be bonded to $L^{52}$ or (in the case where $L^{52}$ is a single bond) the cyclic group ($Cy^{52}$) at the molecular center through a heteroatom (for example, a nitrogen atom of a piperidine ring). Also, the heteroatom bonded may form an onium salt (e.g., oxonium salt, sulfonium salt, ammonium salt).

The cyclic structures represented by $Cy^{51}$ and $Cy^{52}$ which is described later may form a plane structure as the whole.

Specific examples of $Cy^{51}$-$L^{52}$- are set forth below in the form linked with $L^{51}$. In these examples, when a plurality of groups corresponding to Hb-$L^{51}$- are bonded to a divalent aromatic hydrocarbon group or a divalent heterocyclic group, any one group is Hb-$L^{51}$- defined in formula (V) and others are a substituent of the divalent aromatic hydrocarbon group or divalent heterocyclic group.

Cy101:

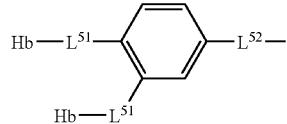

Cy102:

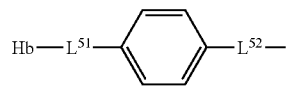

Cy103:

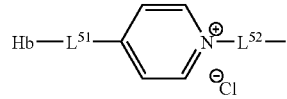

Cy104:

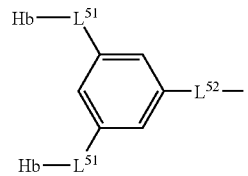

Cy105:

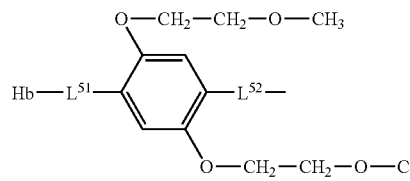

Cy106:

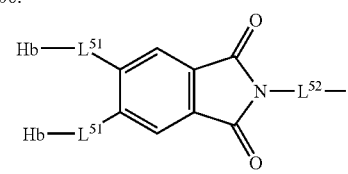

Cy107:

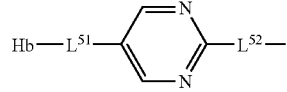

Cy108:

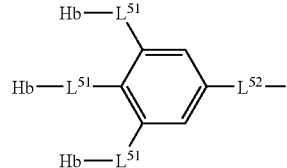

Cy109:

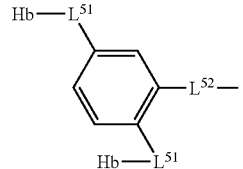

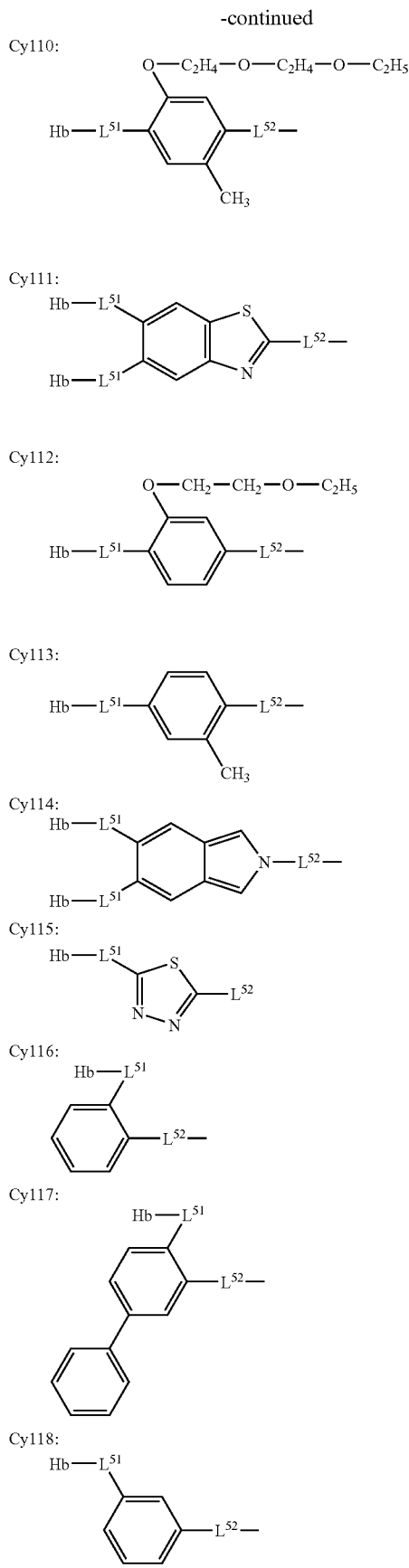

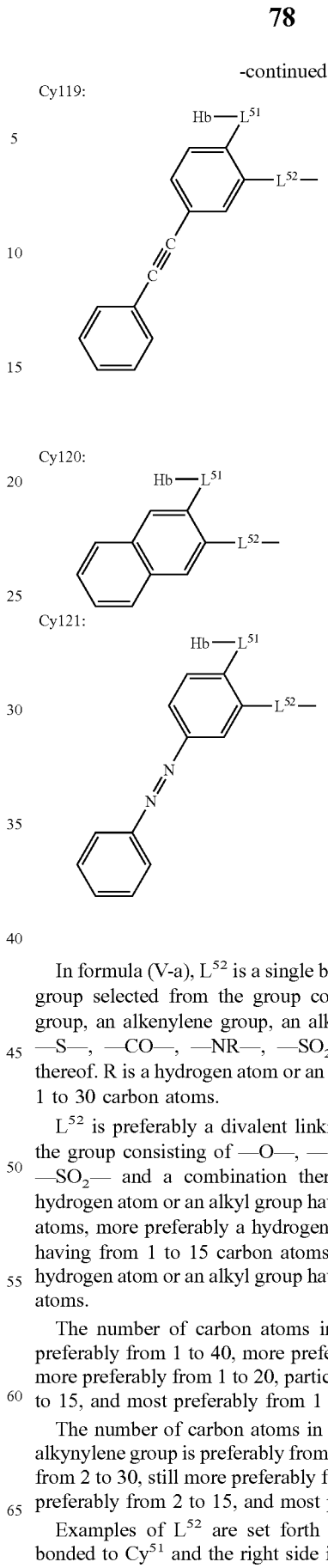

In formula (V-a), $L^{52}$ is a single bond or a divalent linking group selected from the group consisting of an alkylene group, an alkenylene group, an alkynylene group, —O—, —S—, —CO—, —NR—, —SO$_2$— and a combination thereof. R is a hydrogen atom or an alkyl group having from 1 to 30 carbon atoms.

$L^{52}$ is preferably a divalent linking group selected from the group consisting of —O—, —S—, —CO—, —NR—, —SO$_2$— and a combination thereof. R is preferably a hydrogen atom or an alkyl group having from 1 to 20 carbon atoms, more preferably a hydrogen atom or an alkyl group having from 1 to 15 carbon atoms, and most preferably a hydrogen atom or an alkyl group having from 1 to 12 carbon atoms.

The number of carbon atoms in the alkylene group is preferably from 1 to 40, more preferably from 1 to 30, still more preferably from 1 to 20, particularly preferably from 1 to 15, and most preferably from 1 to 12.

The number of carbon atoms in the alkenylene group or alkynylene group is preferably from 2 to 40, more preferably from 2 to 30, still more preferably from 2 to 20, particularly preferably from 2 to 15, and most preferably from 2 to 12.

Examples of $L^{52}$ are set forth below. The left side is bonded to $Cy^{51}$ and the right side is bonded to $Cy^{52}$.

L20: single bond
L21: —S—
L22: —NH—
L23: —NH—SO$_2$—NH—
L24: NH—CO—NH—
L25: —SO$_2$—
L26: —O—NH—
L27: —C≡C—
L28: —CH=CH—S—
L29: —CH$_2$—O—
L30: —N(CH$_3$)—
L31: —CO—O—

In formula (V-a), n represents any one integer of 2 to 12. n is preferably any one integer of 2 to 9, more preferably any one integer of 2 to 6, still more preferably 2, 3 or 4, and most preferably 3 or 4.

In formula (V-a), Cy$^{52}$ is an n-valent cyclic group. Cy$^{52}$ is preferably an n-valent aromatic hydrocarbon group or an n-valent heterocyclic group.

Examples of the aromatic hydrocarbon ring in the aromatic hydrocarbon group represented by Cy$^{52}$ include a benzene ring, an indene ring, a naphthalene ring, a fluorene ring, a phenanthrene ring, an anthracene ring and a pyrene ring. Among these, a benzene ring and a naphthalene ring are preferred and a benzene ring is more preferred.

The aromatic hydrocarbon group represented by Cy$^{52}$ may have a substituent. Examples of the substituent include an aliphatic group, an aromatic hydrocarbon group, a heterocyclic group, a halogen atom, an alkoxy group (e.g., methoxy, ethoxy, methoxyethoxy), an aryloxy group (e.g., phenoxy), an arylazo group (e.g., phenylazo), an alkylthio group (e.g., methylthio, ethylthio, propylthio), an alkylamino group (e.g., methylamino, propylamino), an arylamino group (e.g., phenylamino), an acyl group (e.g., acetyl, propanoyl, octanoyl, benzoyl), an acyloxy group (e.g., acetoxy, pivaloyloxy, benzoyloxy), a hydroxyl group, a mercapto group, an amino group, a carboxyl group, a sulfo group, a carbamoyl group, a sulfamoyl group and a ureido group.

The heterocyclic group represented by Cy$^{52}$ preferably contains a 5-, 6- or 7-membered heterocyclic ring, more preferably a 5- or 6-membered heterocyclic ring, and most preferably a 6-membered heterocyclic ring. The heteroatom constituting the heterocyclic ring is preferably a nitrogen atom, an oxygen atom or a sulfur atom. The heterocyclic ring is preferably an aromatic heterocyclic ring. The aromatic heterocyclic ring is generally an unsaturated heterocyclic ring. An unsaturated heterocyclic ring having a largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyrane ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring. Among these, a triazine ring is preferred and a 1,3,5-triazine ring is more preferred.

The heterocyclic ring may be condensed with another heterocyclic ring, an aliphatic ring or an aromatic hydrocarbon ring. However, a monocyclic heterocyclic ring is preferred.

Specific examples of Cy$^{52}$ are set forth below in the form linked with L$^{52}$.

Cy201 (n = 4):

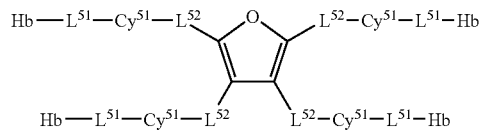

Cy202 (n = 4):

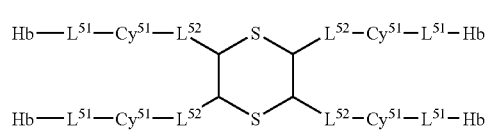

Cy203 (n = 4):

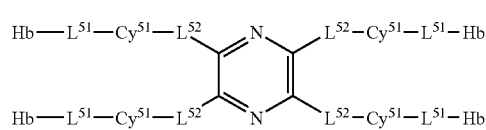

Cy204 (n = 3):

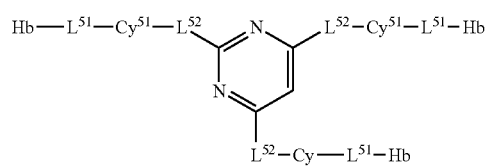

Cy205 (n = 3):

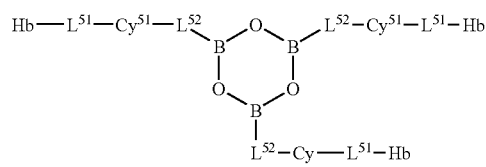

Cy206 (n = 3):

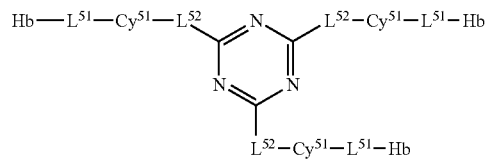

Cy207 (n = 3):

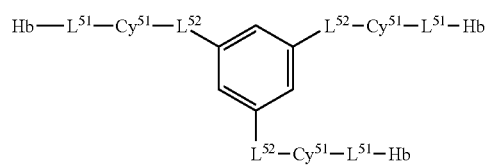

Cy208 (n = 2):

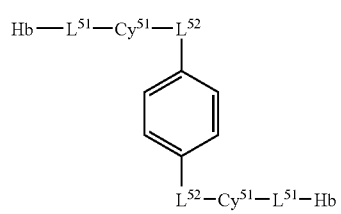

Cy209(n = 2):
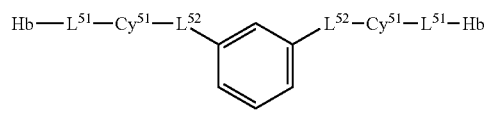
Cy210(n = 2):
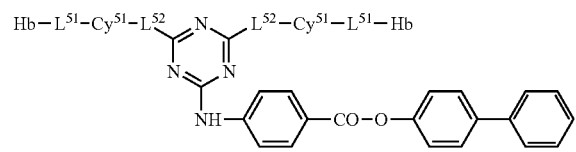
Cy211(n = 2):
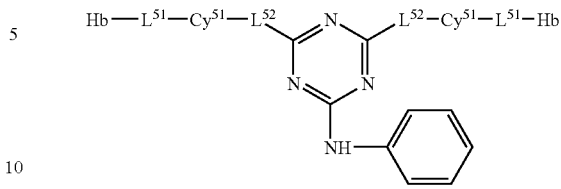
Specific examples of the additive for controlling the orientation in the air interface side, represented by formula (V), are set forth below.
V-(1)
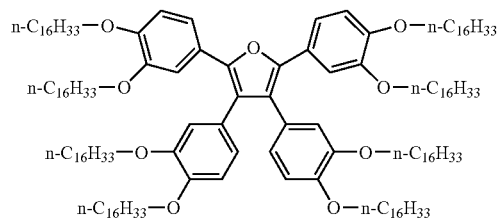
V-(2)
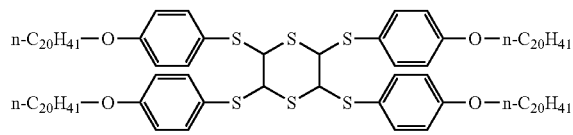
V-(3)
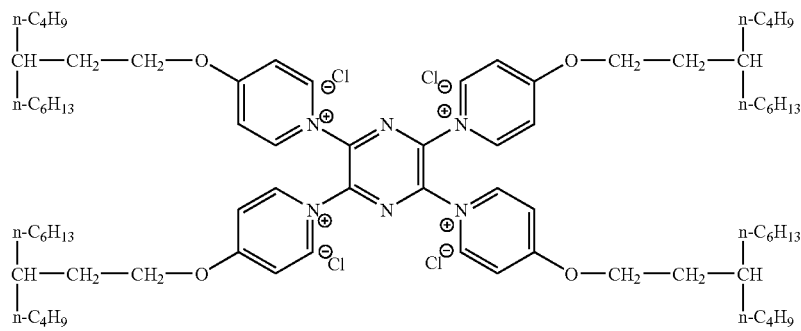
V-(4)
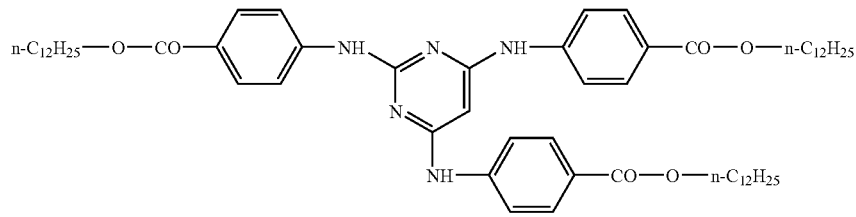

-continued
V-(5)
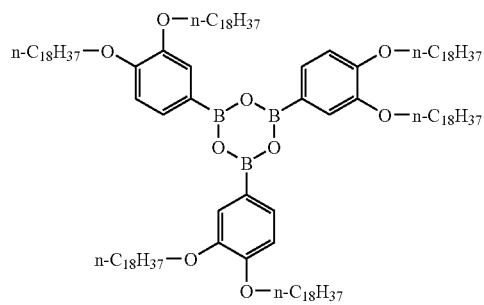
V-(6)
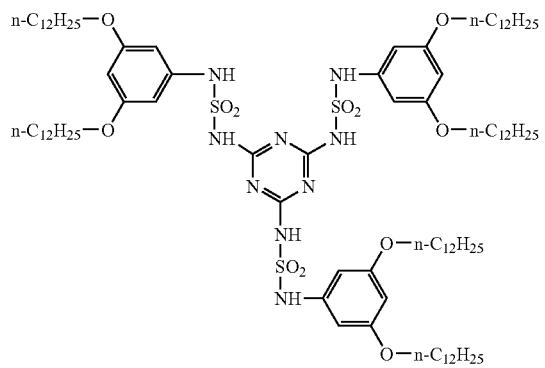
V-(7)
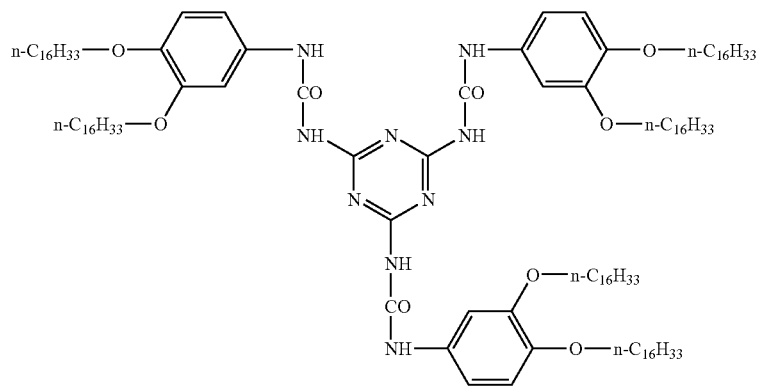
V-(8)
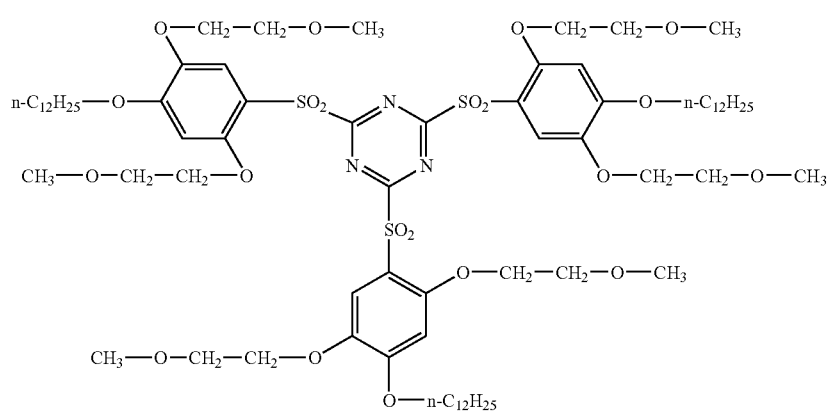

-continued
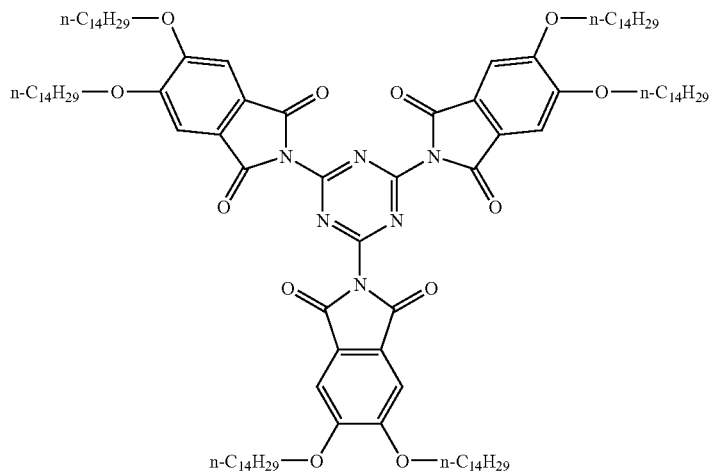
V-(9)
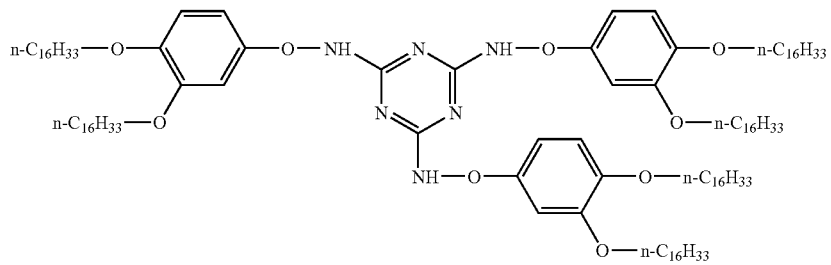
V-(10)
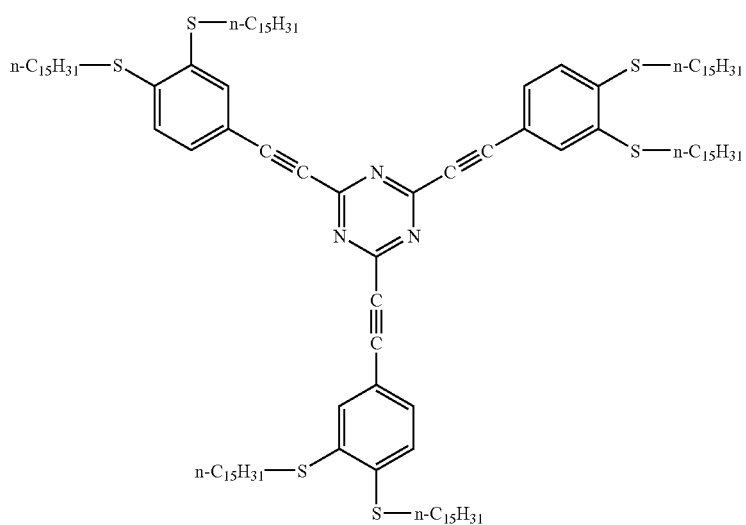
V-(11)

-continued
V-(12)
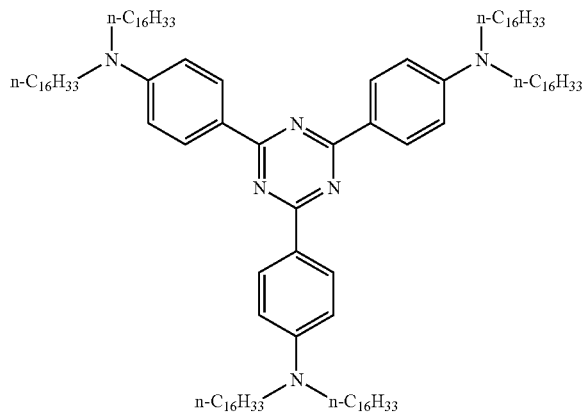
V-(13)
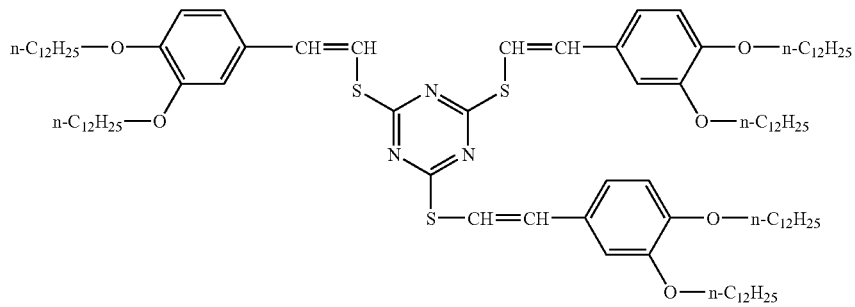
V-(14)
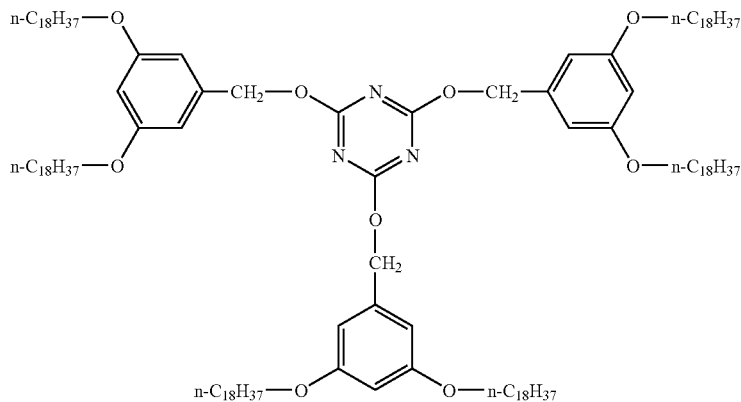
V-(15)
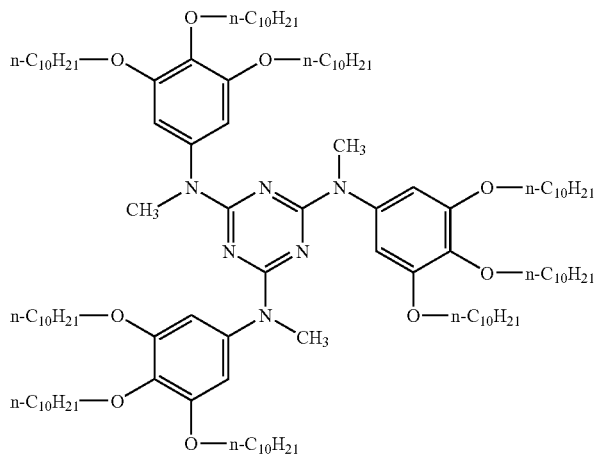

-continued
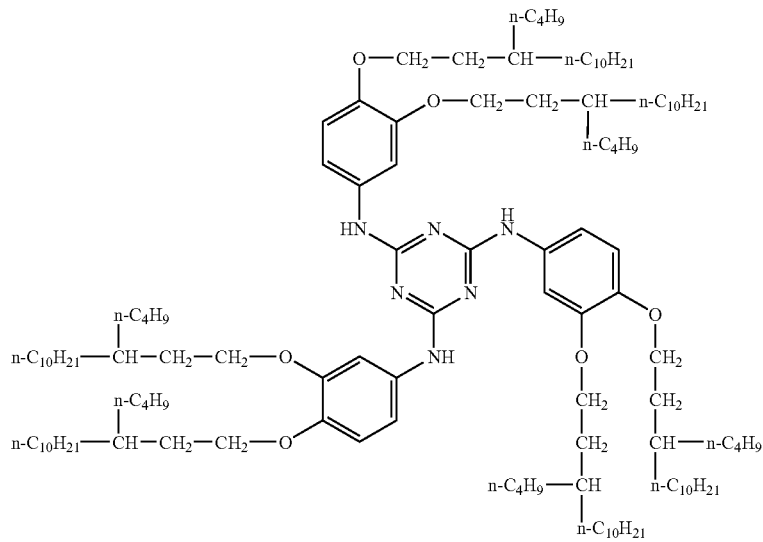
V-(16)
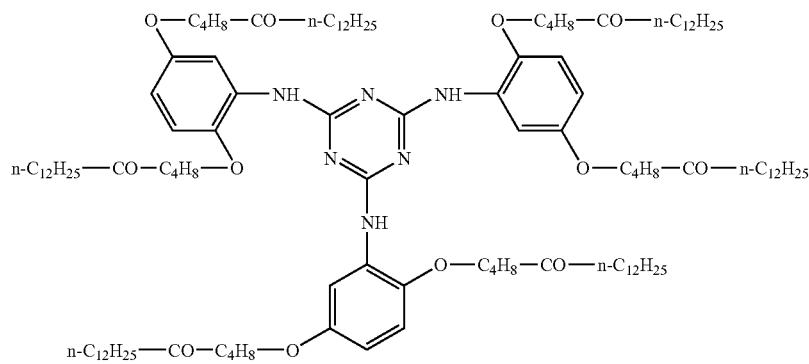
V-(17)
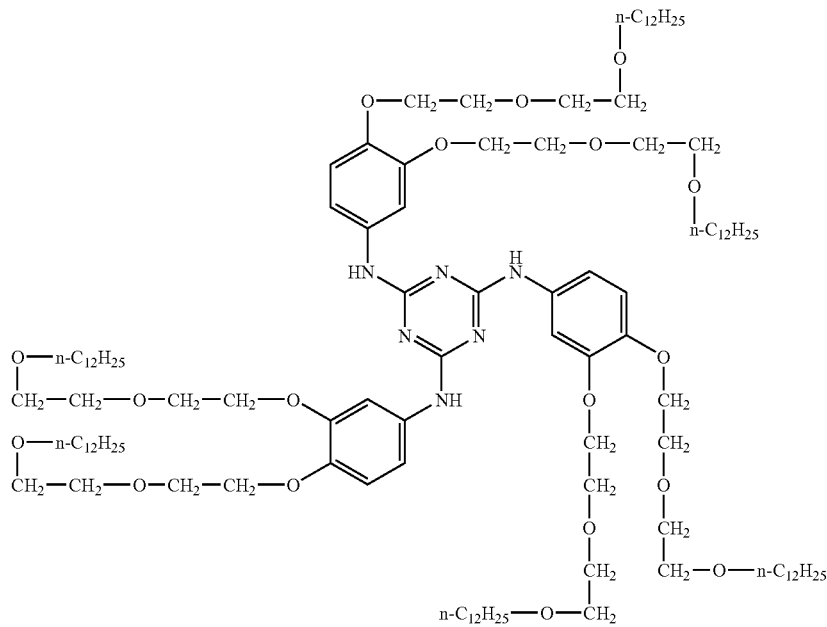
V-(18)

-continued
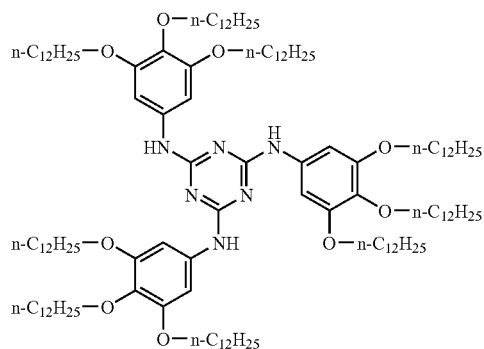
V-(19)
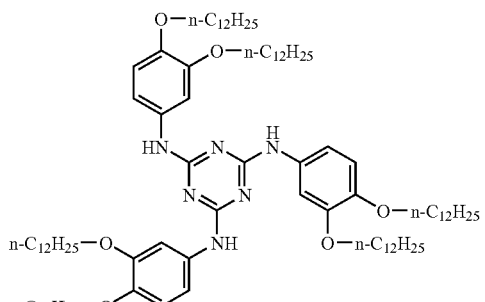
V-(20)
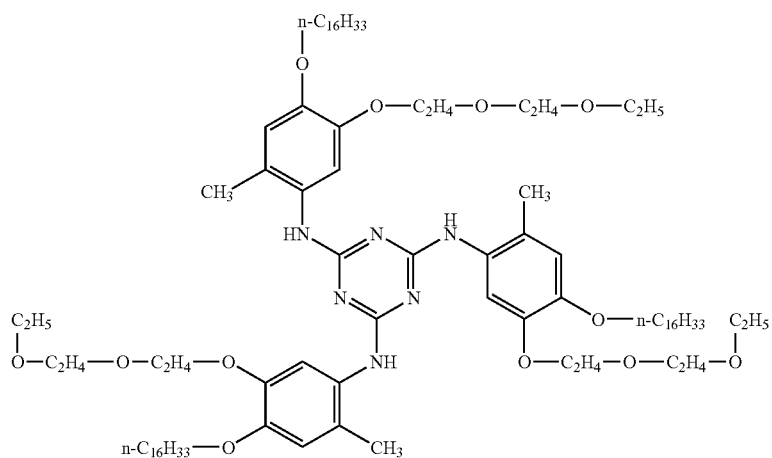
V-(21)
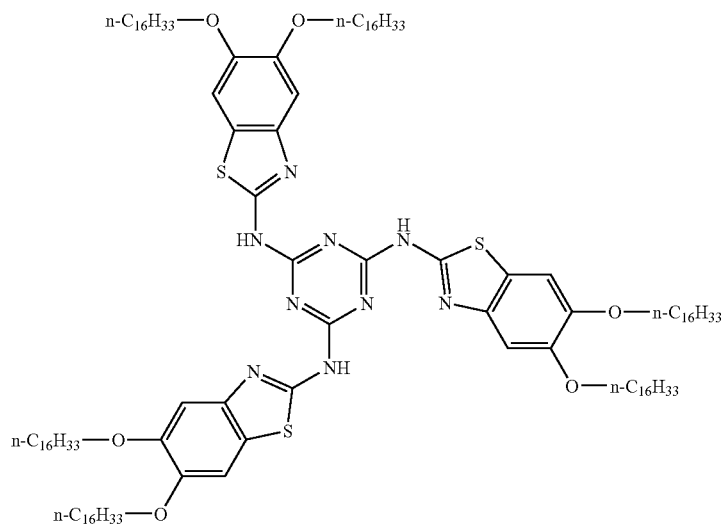
V-(22)

-continued
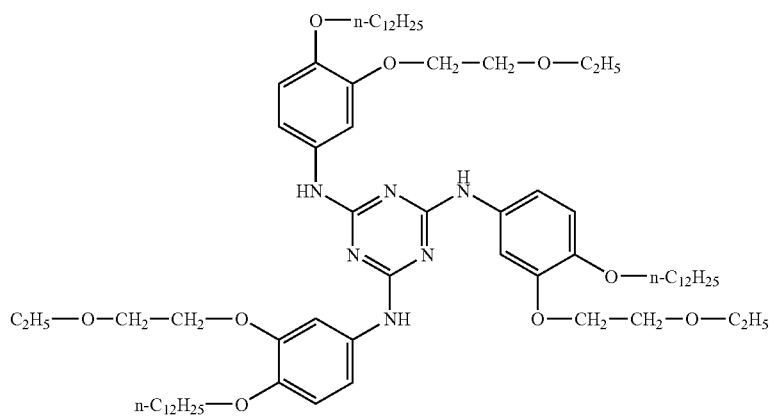
V-(23)
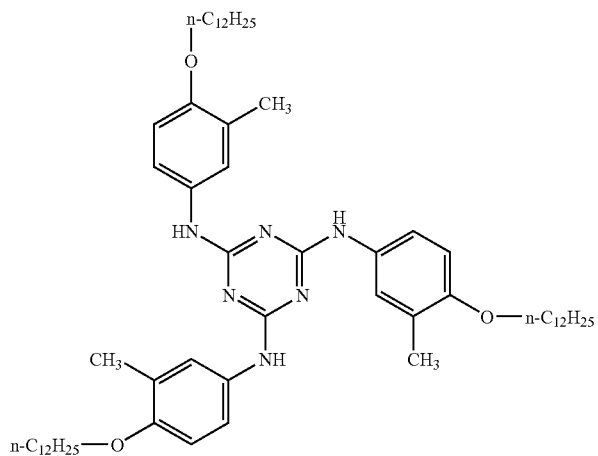
V-(24)
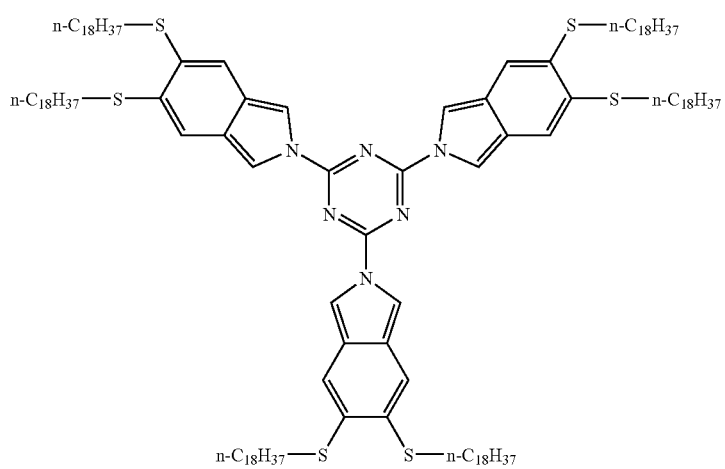
V-(25)

-continued
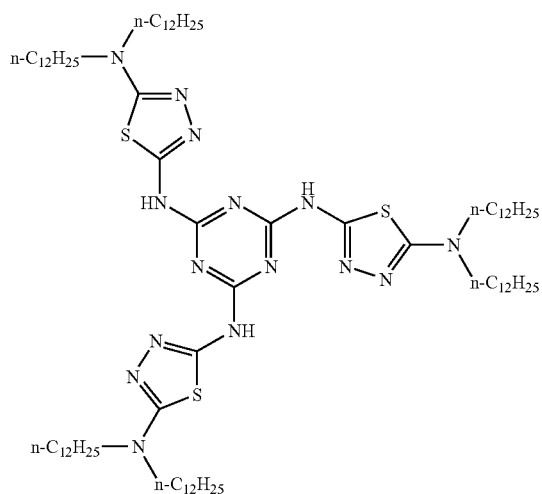
V-(26)
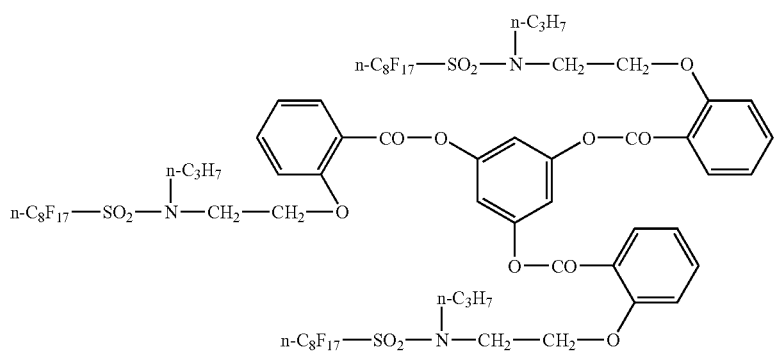
V-(27)
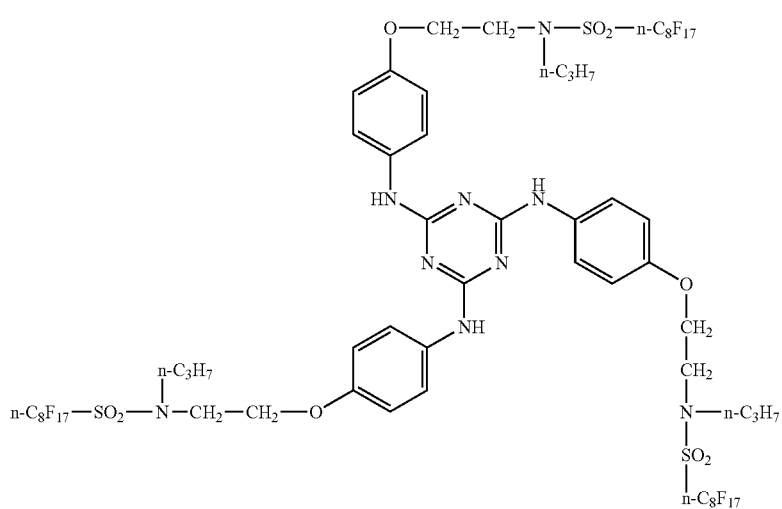
V-(28)

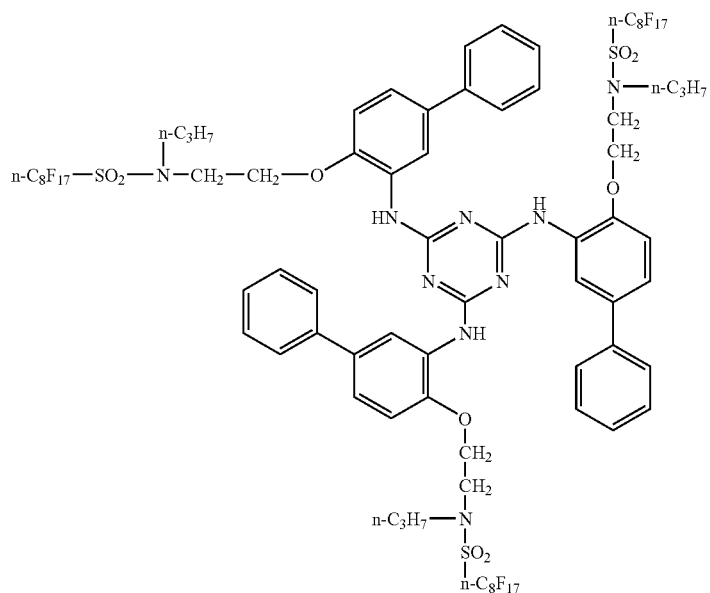
V-(29)
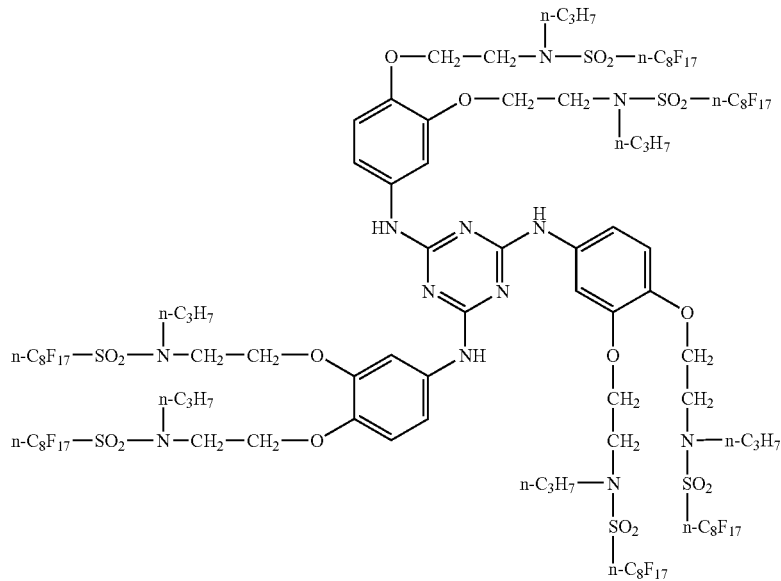
V-(30)

-continued
V-(31)
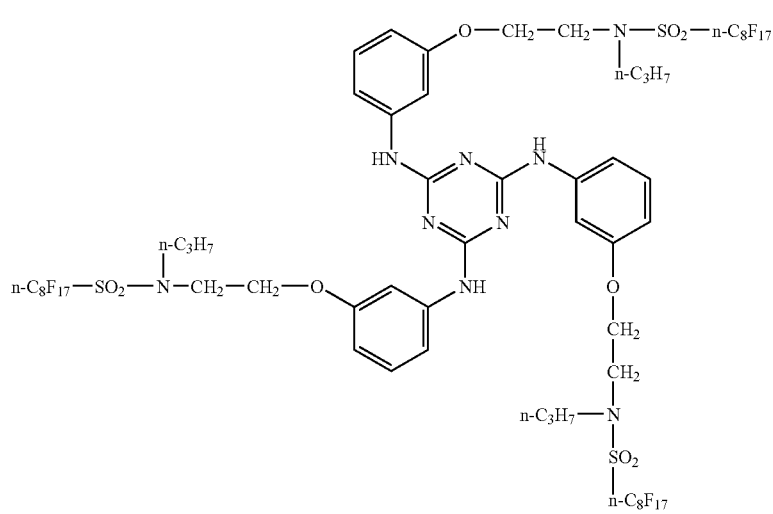
V-(32)
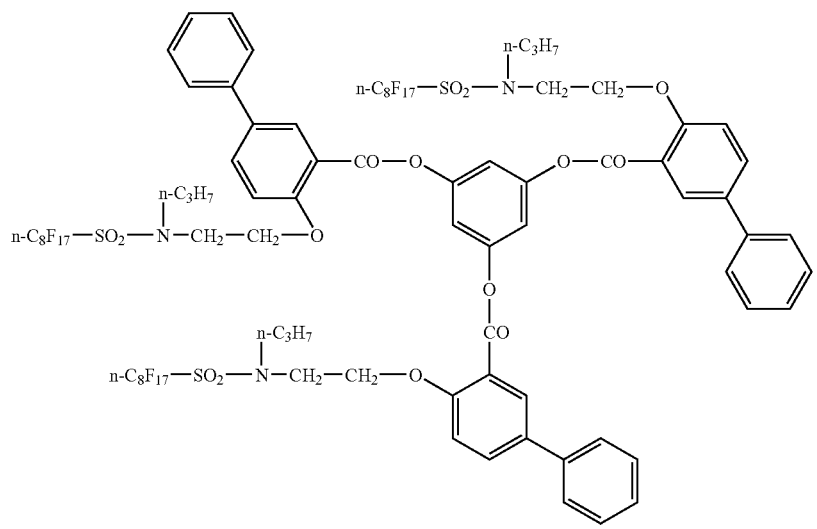
V-(33)
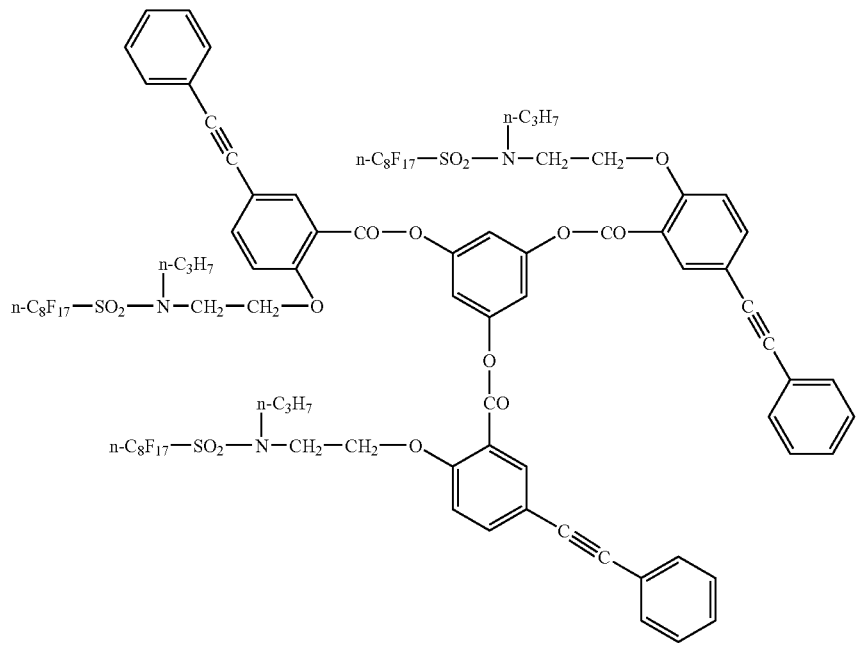

-continued
V-(34)
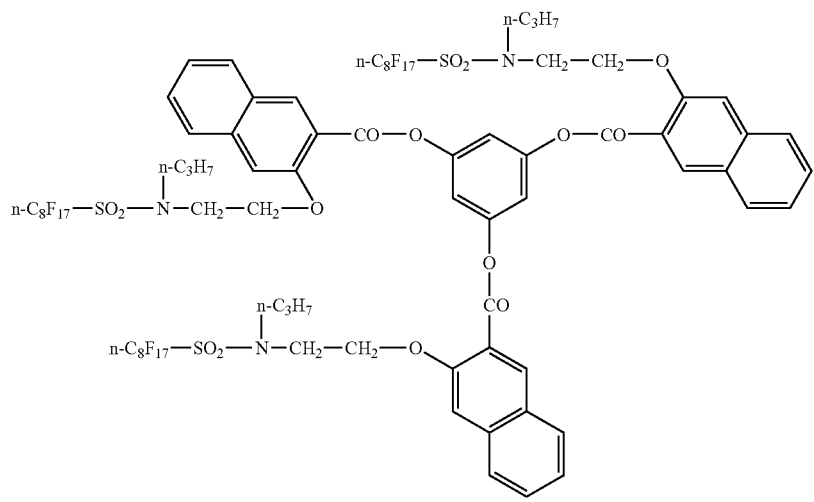
V-(35)
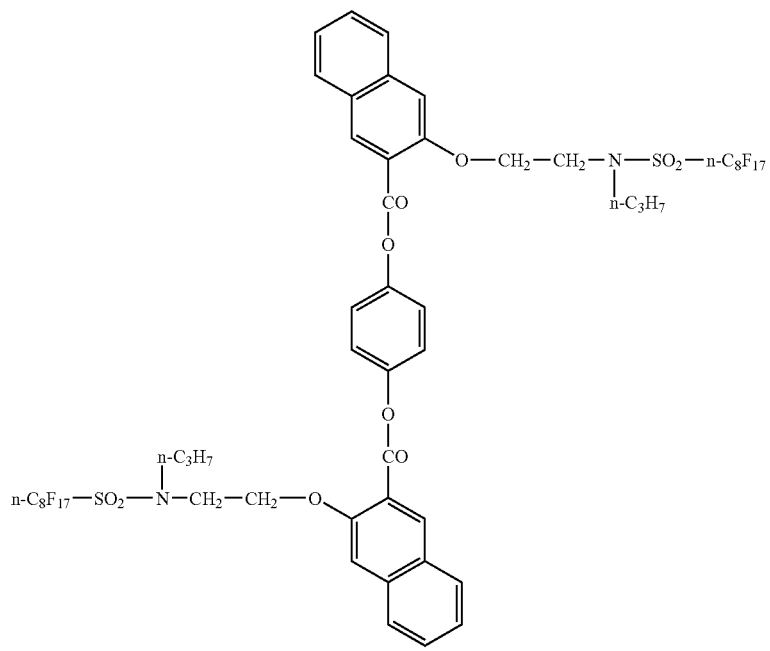
V-(36)
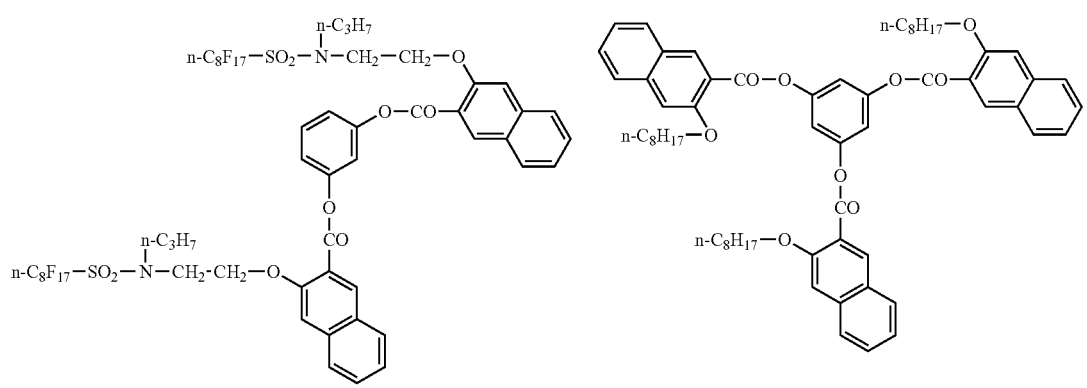

-continued
V-(38)
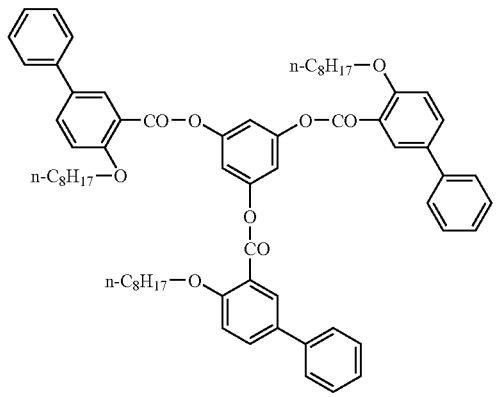
V-(39)
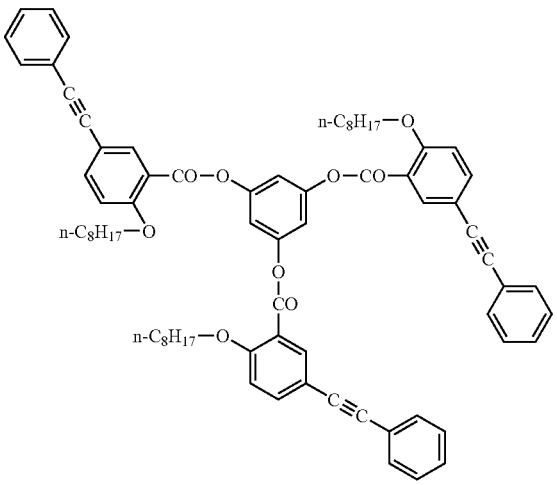
V-(40)
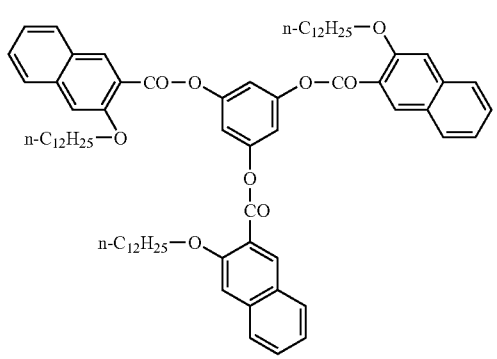
V-(41)
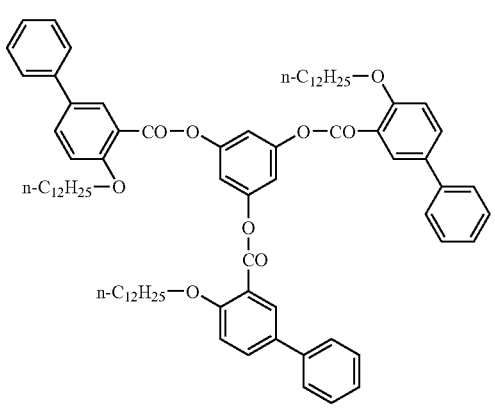
V-(42)
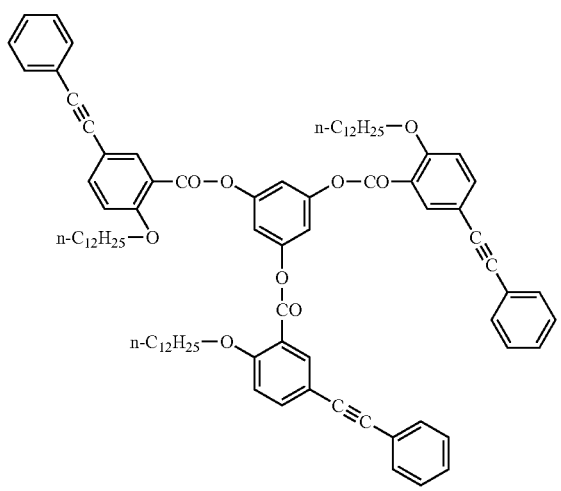
V-(43)
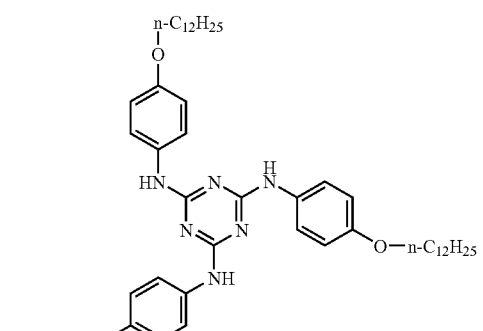

-continued
V- (44)
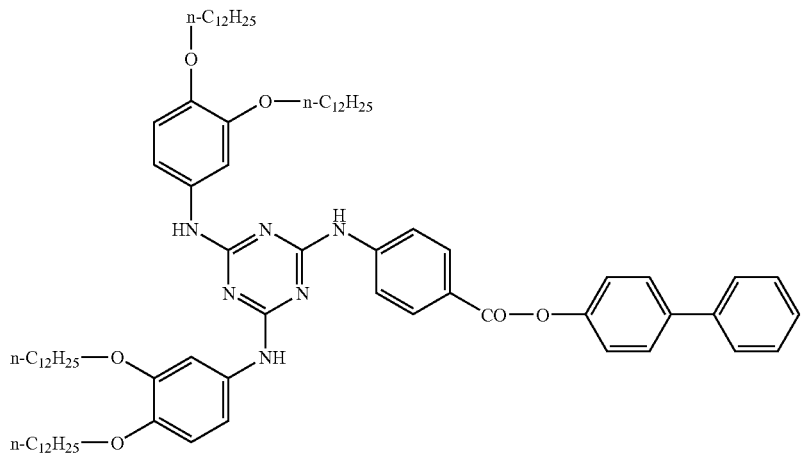
V- (45)
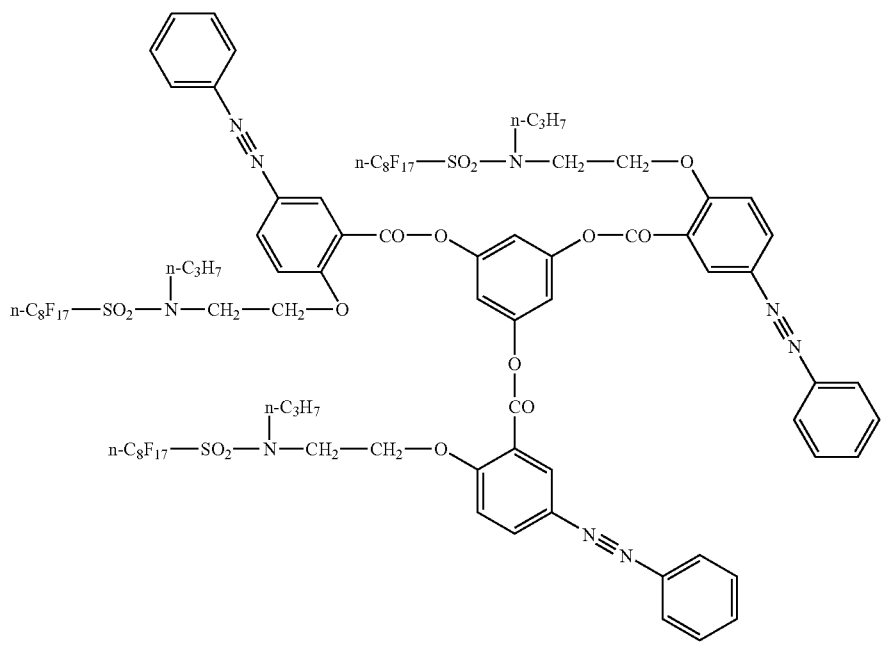
V- (46)
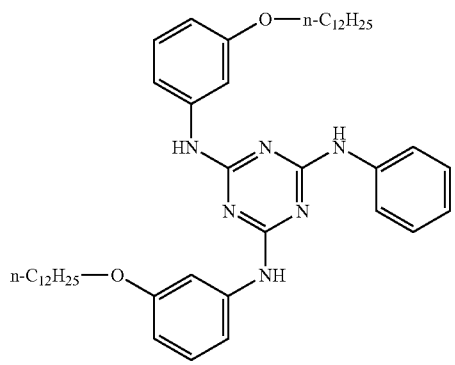
V- (47)
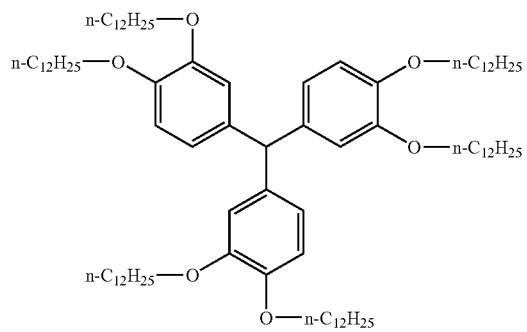

The amount added of the additive for controlling the orientation in the air interface side is preferably from 0.001 to 20 wt % (% by weight), more preferably from 0.01 to 10 wt %, and most preferably from 0.1 to 5 wt %, based on the biaxial liquid crystal compound.

[Additive of Optically Anisotropic Layer]

In the optically anisotropic layer of the present invention, the above-described air interface orientation controlling agent and arbitrary additives may be used in addition to the biaxial liquid crystal compound. Examples of the additive other than the additive for controlling the air interface orientation include a shedding-preventing agent, a polymerization initiator and a polymerizable monomer. Each of these additives may be arbitrarily added to the liquid crystal composition for forming the optical anisotropic layer, if necessary.

[Shedding-Preventing Agent]

In general, as the material used together with the biaxial liquid crystal compound to prevent the shedding at the coating of the liquid crystal composition (Shedding-Preventing Agent), a polymer can be suitably used.

The polymer used is not particularly limited insofar as it does not extremely change the tilt angle or inhibit the orientation of biaxial liquid crystal compound.

Examples of the polymer include those described in JP-8-95030 and specific examples of particularly preferred polymers include cellulose esters. Examples of the cellulose ester include cellulose acetate, cellulose acetate propionate, hydroxypropylcellulose and cellulose acetate butyrate. From the standpoint of not inhibiting the orientation of discotic liquid crystalline compound, the amount added of the polymer used for preventing the shedding is generally from 0.1 to 10 wt %, preferably from 0.1 to 8 wt %, more preferably from 0.1 to 5 wt %.

[Polymerization Initiator]

In the present invention, the liquid crystal compound is preferably fixed in monodomain alignment, namely, in the substantially uniformly oriented state. For this purpose, in the case of using a polymerizable liquid crystal compound, the liquid crystal compound is preferably fixed by polymerization reaction.

The polymerization reaction includes a thermal polymerization reaction using a thermal polymerization initiator, a photopolymerization reaction using a photopolymerization initiator, and a polymerization by the irradiation of an electron beam. In the present invention, a photopolymerization reaction and a polymerization reaction by the irradiation of an electron beam are preferred so as to prevent the support or the like from deformation or deterioration due to heat.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The amount of the photopolymerization initiator used is preferably from 0.01 to 20 wt %, more preferably from 0.5 to 5 wt %, based on the solid content of the coating solution (a liquid crystal composition).

The light irradiation for the polymerization of biaxial liquid crystal compound is preferably performed by using an ultraviolet ray. The irradiation energy is preferably from 10 mJ/m$^2$ to 50 J/cm$^2$, more preferably from 50 to 800 mJ/cm$^2$. In order to accelerate the photo-polymerization reaction, the light irradiation may be performed under heating. The oxygen concentration in the atmosphere contributes to the polymerization degree and therefore, when a predetermined polymerization is not achieved in air, the oxygen concentration is preferably decreased by nitrogen purging or the like. The oxygen concentration is preferably 10% or less, more preferably 7% or less, and most preferably 3% or less.

[Polymerizable Monomer]

In the liquid crystal composition, a polymerizable monomer may be added.

The polymerizable monomer used is not particularly limited insofar as it has compatibility with the liquid crystal compound and does not extremely change the tilt angle or inhibit the orientation of liquid crystal compound. Among these polymerizable monomers, compounds having a polymerization-active ethylenic unsaturated group such as vinyl group, vinyloxy group, acryloyl group and methacryloyl group are preferred. The amount of the polymerizable monomer added is generally from 0.5 to 50 wt %, preferably from 1 to 30 wt %, based on the liquid crystal compound. When a monomer having two or more reactive functional groups is used, an effect of enhancing the adhesion between the orientation film and the optically anisotropic layer may be provided and therefore, this is particularly preferred.

[Coating Solvent]

The solvent used for the preparation of the liquid crystal composition is preferably an organic solvent. Examples of the organic solvent include amides (e.g., N,N-dimethylformamide), a sulfoxide (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Among these, alkyl halides and ketones are preferred. Two or more organic solvents may be used in combination.

[Coating Method]

The optically anisotropic layer is formed by preparing a coating solution of liquid crystal composition by using the above-described solvent, then coating the solution on an orientation film and orienting the biaxial liquid crystal compound. The coating solution can be coated by a known method (e.g., wire bar coating, extrusion coating, direct gravure coating, reverse gravure coating, die coating).

[Orientation Film]

The orientation film can be provided by a method such as rubbing treatment of an organic compound (preferably a polymer), oblique vapor deposition of an inorganic compound, formation of a layer having microgrooves, or accumulation of an organic compound (e.g., ω-tricosanoic acid, methyl stearate) according to a Langmuir-Blodgett (LB film) method. Furthermore, an orientation film where the aligning function is generated upon application of an electric or magnetic field or irradiation with light is known.

The orientation film may be any layer as long as the biaxial liquid crystal compound of the optically anisotropic layer provided on the orientation film can be oriented in desired alignment, however, in the present invention, the orientation film is preferably formed by rubbing treatment or irradiation with light. In particular, an orientation film formed by rubbing a polymer is preferred. The rubbing treatment can be generally performed by rubbing the surface of a polymer layer with paper or cloth several times along a certain direction, however, in the present invention, this treatment is preferably performed by the method described in *Ekisho Binran* (*Handbook of Liquid Crystal*), Maruzen. The thickness of the orientation film is preferably from 0.01 to 10 µm, more preferably from 0.05 to 3 µm.

The polymer for use in the orientation film is described in many publications and a large number of commercial products are available. For the orientation film used in the retardation plate of the present invention, a polyvinyl alcohol or a derivative thereof is preferably used and a modified polyvinyl alcohol bonded with a hydrophobic group is more preferably used. The orientation film for discotic liquid crystal can be used as the orientation film for biaxial liquid crystal and such an orientation film is described in WO01/88574A1, page 43, line 24 to page 49, line 8.

(Rubbing Density of Orientation Film)

The rubbing density of orientation film and the pre-tilt angle of liquid crystal compound at the interface with the orientation film have a relationship such that as the rubbing density is increased, the pre-tilt angle becomes small, whereas as the rubbing density is decreased, the pre-tilt angle becomes large. Therefore, the pre-tilt angle can be adjusted by varying the rubbing density of orientation film.

The rubbing density of orientation film can be varied by the method described in *Ekisho Binran* (*Handbook of Liquid Crystal*), Maruzen. The rubbing density (L) is quantified by formula (A):

$$L = Nl(1 + 2\pi rn/60v) \quad \text{Formula (A):}$$

wherein N is a number of rubbings, l is a contact length of rubbing roller, r is a radius of roller, n is a rotation number (rpm) of roller and v is a stage moving speed (per second).

The rubbing density may be elevated by increasing the number of rubbings, the contact length of rubbing roller, the radius of roller or the rotation number of roller or decreasing the stage moving speed. On the other hand, the rubbing density may be lowered by reversing the increase or decrease of these factors.

[Transparent Support]

With respect to the transparent support for use in the retardation plate of the present invention, the material therefor is not particularly limited as long as it mainly exhibits optical isotropy and ensures a light transmittance of 80% or more, however, a polymer film is preferably used.

Specific examples of the polymer include cellulose esters (e.g., cellulose diacetate, cellulose triacetate), norbornene-base polymers, and poly(meth)acrylate esters. Many commercially available polymers can be suitably used. Among these, in view of optical performance, cellulose esters are preferred and lower fatty acid esters of cellulose are more preferred. The lower fatty acid means a fatty acid having 6 or less carbon atoms and the number of carbon atoms is preferably 2 (cellulose acetate), 3 (cellulose propionate) or 4 (cellulose butyrate). Of these, cellulose triacetate is more preferred. A mixed fatty acid ester such as cellulose acetate propionate and cellulose acetate butyrate may also be used. Furthermore, even in the case of conventionally known polymers of readily expressing birefringence, such as polycarbonate and polysulfone, those reduced in the expression by the modification of molecule described in WO00/26705 can be used.

The cellulose ester (particularly cellulose acetate), which is preferably used as the transparent support, is described in detail below.

The cellulose ester preferably has an acetylation degree of 55.0 to 62.5%, more preferably from 57.0 to 62.0%. The acetylation degree means an amount of acetic acid bonded per unit mass of cellulose. The acetylation degree is determined according to the measurement and calculation of acetylation degree described in ASTM D-817-91 (test method of cellulose acetate, etc.).

The viscosity average polymerization degree (DP) of cellulose ester is preferably 250 or more, more preferably 290 or more. The cellulose ester for use in the present invention preferably has a narrow molecular weight distribution Mw/Mn (Mw is a mass average molecular weight and Mn is a number average molecular weight) as measured by gel permeation chromatography. Specifically, the Mw/Mn value is preferably from 1.0 to 1.7, more preferably from 1.3 to 1.65, and most preferably from 1.4 to 1.6.

In the cellulose ester, the hydroxyl groups at the 2-position, 3-position and 6-position of cellulose are not evenly distributed in ⅓ portions of the entire substitution degree but the substitution degree of hydroxyl group at the 6-position is liable to become small. The substitution degree of hydroxyl group at the 6-position of cellulose is preferably larger than those at the 2-position and 3-position. The hydroxyl group at the 6-position is preferably substituted by an acyl group to account for 30 to 40%, preferably 31% or more, more preferably 32% or more, of the entire substitution degree. The substitution degree at the 6-position is preferably 0.88 or more. The hydroxyl group at the 6-position may be substituted by an acyl group having 3 or more carbon atoms (e.g., propionyl, butyryl, valeroyl, benzoyl, acryloyl) other than an acetyl group. The substitution degree at each position can be determined by NMR. Cellulose esters having a high substitution degree of hydroxyl group at the 6-position can be synthesized by referring to the methods described in JP-A-11-5851, that is, Synthesis Example 1 (paragraph Nos. 0043 to 0044), Synthesis Example 2 (paragraph Nos. 0048 to 0049) and Synthesis Example 3 (paragraph Nos. 0051 to 0052).

In the polymer film, particularly cellulose acetate film used as the transparent support, an aromatic group having at least two aromatic rings may be used as a retardation increasing agent so as to adjust the retardation. In the case of using such a retardation increasing agent, the retardation increasing agent is used in an amount of 0.01 to 20 parts by weight, preferably from 0.05 to 15 parts by weight, more preferably from 0.1 to 10 parts by weight, per 100 parts by weight of cellulose acetate. Two or more aromatic compounds may be used in combination.

The aromatic ring of the aromatic compound includes an aromatic hydrocarbon ring and an aromatic heterocyclic ring.

The aromatic hydrocarbon ring is preferably a 6-membered ring (namely, benzene ring).

The aromatic heterocyclic ring is generally an unsaturated heterocyclic ring. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a tetrazole ring, a pyrane ring, a pyridine ring, a pyridazine ring, a pyrimidine ring, a pyrazine ring and a 1,3,5-triazine ring.

The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring or a 1,3,5-triazine ring, more preferably a benzene ring or a 1,3,5-triazine ring. The aromatic compound preferably contains at least one 1,3,5-triazine ring.

The number of aromatic rings in the aromatic compound is preferably from 2 to 20, more preferably from 2 to 12, still more preferably from 2 to 8, and most preferably from 2 to 6.

The bonding relationship of two aromatic rings can be classified into (a) a case where two aromatic rings are bonded to form a condensed ring, (b) a case where two aromatic rings are directly bonded by a single bond and (c) a case where two aromatic rings are bonded through a linking group (a spiro bond cannot be formed because the rings are an aromatic ring). The bonding relationship may be any one of (a) to (c). Such a retardation increasing agent is described in WO01/88574A1, WO00/2619A1, JP-A-2000-111914, JP-A-2000-275434 and JP-A-2002-363343.

The cellulose acetate film is preferably produced by preparing a cellulose acetate solution (dope) and forming a film from the solution according to a solvent casting method. In the dope, the above-described retardation increasing agent may be added.

The dope is cast on a drum or a band and the solvent is evaporated to form a film. The concentration of the dope before casting is preferably adjusted to give a solid content of 18 to 35%. The surface of the drum or band is preferably finished to provide a mirror state. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430 and JP-A-62-115035.

The dope is preferably cast on a drum or band having a surface temperature of 10° C. or less. After the casting, the dope is preferably dried with air for 2 seconds or more. The obtained film is peeled off from the drum or band and the film may be further dried with hot air by sequentially varying the temperature from 100° C. to 160° C. to remove the residual solvent. This method is described in JP-B-5-17844. According to this method, the time from casting until peeling can be shortened. For practicing this method, it is necessary that the dope is gelled at the surface temperature of the drum or band on casting.

Using the prepared cellulose acetate solution (dope), dopes of two or more layers can also be cast to form a film. The dope is cast on a drum or a band and the solvent is evaporated to form a film. The concentration of the dope before casting is preferably adjusted to give a solid content of 10 to 40%. The surface of the drum or band is preferably finished to provide a mirror state.

In the case of casting a plurality of cellulose acetate solutions, a film may be produced by casting respective cellulose acetate-containing solutions from a plurality of casting ports provided with spacing in the traveling direction of support and thereby stacking the layers. For example, the methods described in JP-A-61-158414, JP-A-1-122419 and JP-A-11-198285 can be used. Furthermore, a film may be produced by casting cellulose acetate solutions from two casting ports and for example, the methods described in JP-B-60-27562, JP-A-61-94724, JP-A-61-947245, JP-A-61-104813, JP-A-61-158413 and JP-A-56-134933 can be used. In addition, a method for casting cellulose acetate film described in JP-A-56-162617 may also be used, where a flow of high-viscosity cellulose acetate solution is wrapped with a low-viscosity cellulose acetate solution and the high-viscosity and low-viscosity cellulose acetate solutions are simultaneously extruded.

The cellulose acetate film may be further subjected to a stretching treatment to adjust the retardation. The stretching magnification is preferably from 0 to 100%. In the case of stretching the cellulose acetate film for use in the present invention, tenter stretching is preferably used and in order to highly precisely control the slow axis, the difference, for example, in the speed of right and left tenter clips or in the timing of disengagement is preferably reduced as small as possible.

In the cellulose ester film, a plasticizer may be added so as to improve the mechanical properties or increase the drying speed. As the plasticizer, a phosphoric acid ester or a carboxylic acid ester is used. Examples of the phosphoric acid ester include triphenyl phosphate (TPP) and tricresyl phosphate (TCP). The carboxylic acid ester is represented by a phthalic acid ester and a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and di-2-ethylhexyl phthalate (DEHP). Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate and various trimellitic acid esters. Among these, phthalic ester-base plasticizers (DMP, DEP, DBP, DOP, DPP, DEHP) are preferred, and DEP and DPP are more preferred. The amount of the plasticizer added is preferably from 0.1 to 25 wt %, more preferably from 1 to 20 wt %, and most preferably 3 to 15 wt %, based on the amount of cellulose ester.

In the cellulose ester film, a deterioration inhibitor (e.g., antioxidant, peroxide decomposer, radical inhibitor, metal inactivating agent, oxygen scavenger, amine) or an ultraviolet inhibitor may be added. The deterioration inhibitor is described in JP-A-3-199201, JP-A-5-1907073, JP-A-5-194789, JP-A-5-271471 and JP-A-6-107854. The amount of the deterioration inhibitor added is preferably from 0.01 to 1 wt %, more preferably from 0.01 to 0.2 wt %, based on the solution (dope) prepared. If the amount added is less than 0.01 wt %, the effect of deterioration inhibitor can be hardly obtained, whereas if it exceeds 1 wt %, the deterioration inhibitor sometimes bleeds out onto the film surface.

Examples of particularly preferred deterioration inhibitors include butyrated hydroxytoluene (BHT). The ultraviolet inhibitor is described in JP-A-7-11056.

The cellulose acetate film is preferably subjected to a surface treatment. Specific examples of the surface treatment include a corona discharge treatment, a glow discharge treatment, a flame treatment, an acid treatment, an alkali treatment and an ultraviolet irradiation treatment. It is also preferred to provide an undercoat layer as described in JP-A-7-333433.

In these treatments, from the standpoint of keeping the planarity of film, the temperature of cellulose acetate film is preferably set to Tg (glass transition temperature) or less, specifically, 150° C. or less.

In view of adhesion to the orientation film or the like, the surface treatment of cellulose acetate film is preferably an acid treatment or an alkali treatment, namely, a saponification treatment to the cellulose acetate film.

The surface treatment is described in detail below by referring to the alkali saponification treatment as an example.

The alkali saponification treatment is preferably performed by a cycle such that the film surface is dipped in an alkali solution, neutralized with an acidic solution, washed with water and dried.

Examples of the alkali solution include a potassium hydroxide solution and a sodium hydroxide solution. The normality of hydroxide ion is preferably from 0.1 to 3.0 mol/L, more preferably from 0.5 to 2.0 mol/L. The temperature of alkali solution is preferably from room temperature to 90° C., more preferably from 40 to 70° C.

The surface energy of cellulose acetate film is preferably 55 mN/m or more, more preferably from 60 to 75 mN/M.

The surface energy can be determined by the same method as the above-described method for calculating the surface energy of optically anisotropic layer.

The thickness of the cellulose acetate film is usually from 5 to 500 μm, preferably from 20 to 250 μm, more preferably from 30 to 180 μm, still more preferably from 30 to 110 μm.

[Retardation Plate]

The retardation plate of the present invention can be used as an elliptically polarizing plate by combining it with a polarizing film. Furthermore, when applied in combination with a polarizing plate to a transmission liquid crystal display device, the retardation plate contributes to the enlargement of view angle.

The elliptically polarizing plate and liquid crystal display device using the retardation plate of the present invention are described below.

[Elliptically Polarizing Plate]

An elliptically polarizing plate can be produced by stacking the polarizing plate of the present invention and a polarizing film. By the use of the retardation plate of the present invention, an elliptically polarizing plate capable of enlarging the view angle of a liquid crystal display device can be provided.

The polarizing film includes an iodine-type polarizing film, a dye-type polarizing film using a dichroic dye, and a polyene-type polarizing plate. The iodine-type polarizing plate and dye-type polarizing plate are generally produced using a polyvinyl alcohol-base film. The polarization axis of polarizing film corresponds to the direction perpendicular to the stretching direction of film.

The polarizing film is stacked on the optically anisotropic layer side of the retardation plate. On the surface of the polarizing film opposite the side where the optical compensatory sheet is stacked, a transparent protective film is preferably formed. The transparent protective film prefer ably has a light transmittance of 80% or more. The transparent protective film is generally a cellulose ester film, preferably a triacetyl cellulose film. The cellulose ester film is preferably formed by a solvent casting method. The thickness of the transparent protective film is preferably from 20 to 500 μm, more preferably from 50 to 200 μm.

[Liquid Crystal Display Device]

By the use of the retardation plate of the present invention, a liquid crystal display device enlarged in the view angle can be provided. The retardation plate (optical compensatory sheet) for TN-mode liquid crystal cells is described in JP-A-6-214116, U.S. Pat. Nos. 5,583,679 and 5,646,703 and German Patent Publication No. 3911620A1. The optical compensatory sheet for IPS-mode or FLC-mode liquid crystal cells is described in JP-A-10-54982, the optical compensatory sheet for OCB-mode or HAN-mode liquid crystal cells is described in U.S. Pat. No. 5,805,253 and International Patent Publication No. WO96/37804, the optical compensatory sheet for STN-mode liquid crystal cells is described in JP-A-9-26572, and the optical compensatory sheet for VA-mode liquid crystal cells is described in Japanese Patent 2,866,372.

In the present invention, the retardation plate (optical compensatory sheet) for liquid crystal cell in various modes can be produced by referring to those patent publications. The retardation plate of the present invention can be used for liquid crystal display devices in various modes such as TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode.

In the retardation plate of the present invention, the direction having a minimum refractive index of the liquid crystal phase is substantially parallel to the normal line of transparent support and therefore, the retardation plate is particularly effective when used for a VA-mode liquid crystal display device.

The liquid crystal display device comprises a liquid crystal cell, a polarizing element and a retardation plate (optical compensatory sheet). The polarizing element generally comprises a polarizing film and a protective film. As for the polarizing film and protective film, those described above regarding the elliptically polarizing plate can also apply.

EXAMPLES

The present invention is described below by referring to Examples, however, the present invention is not limited thereto.

Example 1

Synthesis of 4,4'-di(2,3,4-tri(4-acryloyloxybutyloxy)-cinnamoyloxy)biphenyl (m-40)

This compound can be synthesized according to the following scheme.

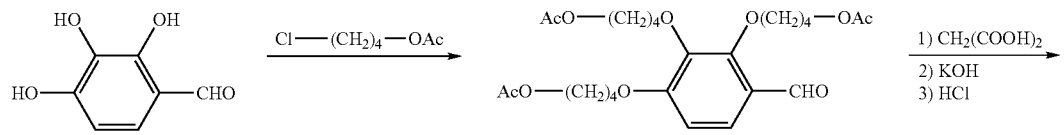

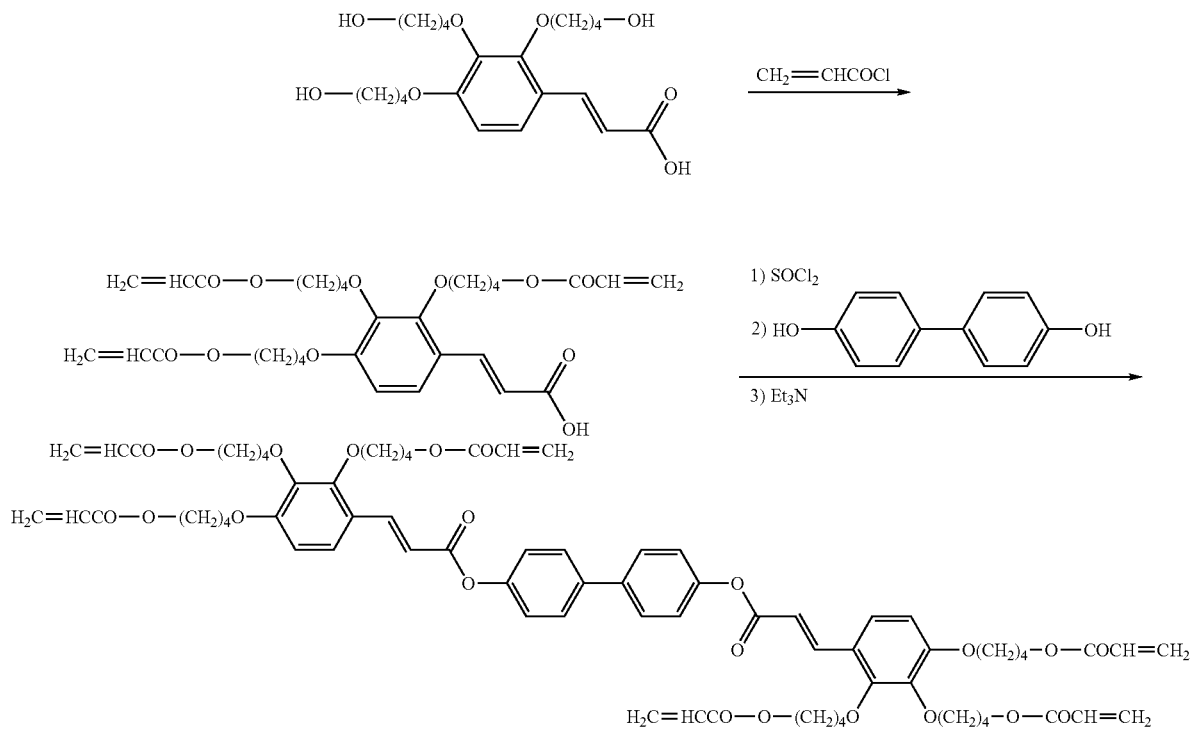

(1) Synthesis of intermediate 2,3,4-tri(4-acetyloxybutyl-oxy)benzaldehyde

Into a three-neck flask, 2,3,4-trihyroxybenzaldehyde (14.5 g), potassium carbonate (51.3 g), 4-chlorobutyl acetate (46.8 g) and 200 mL of dimethylformamide (DMF) were charged and stirred at 120° C. for 5 hours. After cooling, the reaction solution was extracted with ethyl acetate and washed with water. The extract was concentrated and then purified by column chromatography to obtain the titled compound (43.7 g). Yield: 91%.

(2) Synthesis of intermediate 2,3,4-tri(4-hydroxybutyl-oxy)cinnamic acid

Into a three-neck flask, 2,3,4-tri(4-acetyloxy-butyloxy) benzaldehyde (40.0 g), malonic acid (10.6 g), piperidine (1 ml) and 100 mL of pyridine were added and stirred at 110° C. for 5 hours. After cooling, water (500 ml) and potassium hydroxide (26.0 g) were added and stirred at 60° C. for 2 hours. After cooling, concentrated hydrochloric acid was added until the reaction solution became acidic, and the resulting reaction solution was extracted with ethyl acetate and washed with water. The extract was concentrated and then purified by column chromatography to obtain the titled compound (30.1 g). Yield: 90%.

(3) Synthesis of intermediate 2,3,4-tri(4-acryloyloxybutyloxy)cinnamic acid

Into a three-neck flask, 2,3,4-tri(4-acryloyloxy-butyloxy) cinnamic acid (30.1 g), acrylic acid chloride (7.6 g), N,N-dimethylaniline (11.1 g) and 500 mL of tetrahydrofuran were added and stirred at 60° C. for 5 hours. After cooling, the reaction solution was extracted with ethyl and washed with water. The extract was concentrated and then purified by column chromatography to obtain the titled compound (39.3 g). Yield: 95%.

(4) Synthesis of 4,4'-di(2,3,4-tri(4-acryloyloxybutyloxy)-cinnamoyloxy)biphenyl (m-40)

Into a three-neck flask, 2,3,4-tri(4-acryloyloxy-butyloxy) cinnamic acid (10.0 g), thionyl chloride (6.1 g), dimethylformamide (0.01 g) and 30 mL of toluene were added and stirred at 40° C. for 30 minutes. After cooling, toluene and excess thionyl chloride were removed by distillation and then 100 ml of tetrahydrofuran was added. To this reaction solution, 4,4'-dihydroxybiphenyl (1.6 g) was added and after cooling to 5° C., triethylamine (2.8 mL) was added dropwise. Subsequently, 4-dimethylaminopyridine (0.1 g) was added and after heating to 25° C., the solution was stirred for 5 hours. The resulting reaction solution was added to water (500 mL) and crystals precipitated were collected by filtration. The obtained crystals were dissolved in dimethylacetamide (20 mL), triethylamine (2.8 mL) was added thereto and the resulting solution was stirred at 60° C. for 1 hour. After cooling, the reaction solution was extracted with ethyl and washed with water. The extract was concentrated and then purified by column chromatography to obtain the titled compound (9.5 g). Yield: 85%. The NMR spectrum of m-40 obtained is shown below.

$^1$H-NMR (solvent: CDCl$_3$, standard: tetramethylsilane) δ (ppm): 1.80–2.00 (24H, m) 4.00–4.15 (12H, m) 4.15–4.30 (12H, m) 5.70–5.90 (6H, m) 6.05–6.20 (6H, m) 6.35–6.45 (6H, m) 6.60 (2H, d) 6.71 (2H, d) 7.24 (4H, d) 7.35 (2H, d) 7.60 (4H, d) 8.10 (2H, d).

(5) Confirmation of Liquid Crystallinity of m-40

The 4,4'-di(2,3,4-tri(4-acryloyloxybutyloxy)-cinnamoyloxy)biphenyl (m-40) synthesized above was observed on the change in the liquid crystal phase by DSC (differential scanning calorimeter) and a polarizing microscope. As a result, the expression of nematic phase was found to occur in the range from 68 to 74° C. The texture of the expressed nematic phase reveals that this nematic phase is a biaxial nematic phase (Nb phase).

Example 2

Synthesis of 2,6-di(2,3,4-tri(4-acryloyloxybutyloxy)-naphthalene (m-32):

This compound can be synthesized according to the following scheme.

Confirmation of Liquid Crystallinity of m-32

The 2,6-di(2,3,4-tri(4-acryloyloxybutyloxy)-naphthalene (m-32) synthesized above was observed on the change in the liquid crystal phase by DSC (differential scanning calorimeter) and a polarizing microscope. As a result, transfer from crystal to isotropic liquid occurred at 40° C. during the

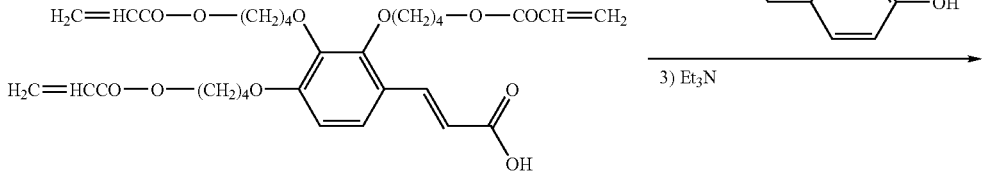

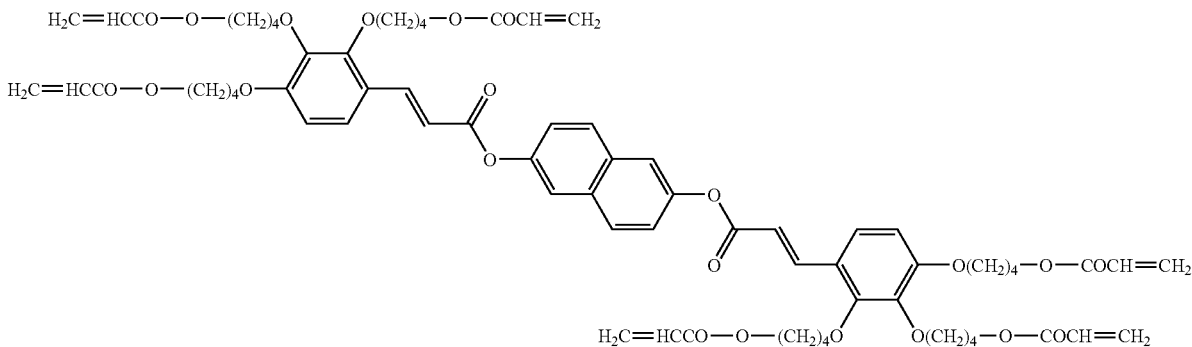

From 2,3,4-tri(4-acryloyloxybutyloxy)cinnamic acid prepared in Example 1 and 2,6-dihydroxynaphthalene, the titled compound (m-32) was synthesized in the same manner as in Example 1. The NMR spectrum of m-32 obtained is shown below.

$^1$H-NMR (solvent: CDCl$_3$, standard: tetramethylsilane) δ (ppm): 1.80–2.00 (24H, m) 4.00–4.15 (12H, m) 4.15–4.30 (12H, m) 5.70–5.90 (6H, m) 6.05–6.20 (6H, m) 6.35–6.45 (6H, m) 6.64 (2H, d) 6.73 (2H, d) 7.33 (2H, dd) 7.36 (2H, d) 7.65 (2H, d) 7.85 (2H, d) 8.13 (2H, d). elevation of temperature and liquid crystallinity was not confirmed, but a nematic phase was expressed at 25° C. or less during the dropping of temperature. The texture of the expressed nematic phase reveals that this nematic phase is a biaxial nematic phase (Nb phase).

Example 3

Synthesis of 2,6-di(2,3,4-tri(4-acryloyloxyethyloxy)-naphthalene (m-31)

This compound can be synthesized according to the following scheme.

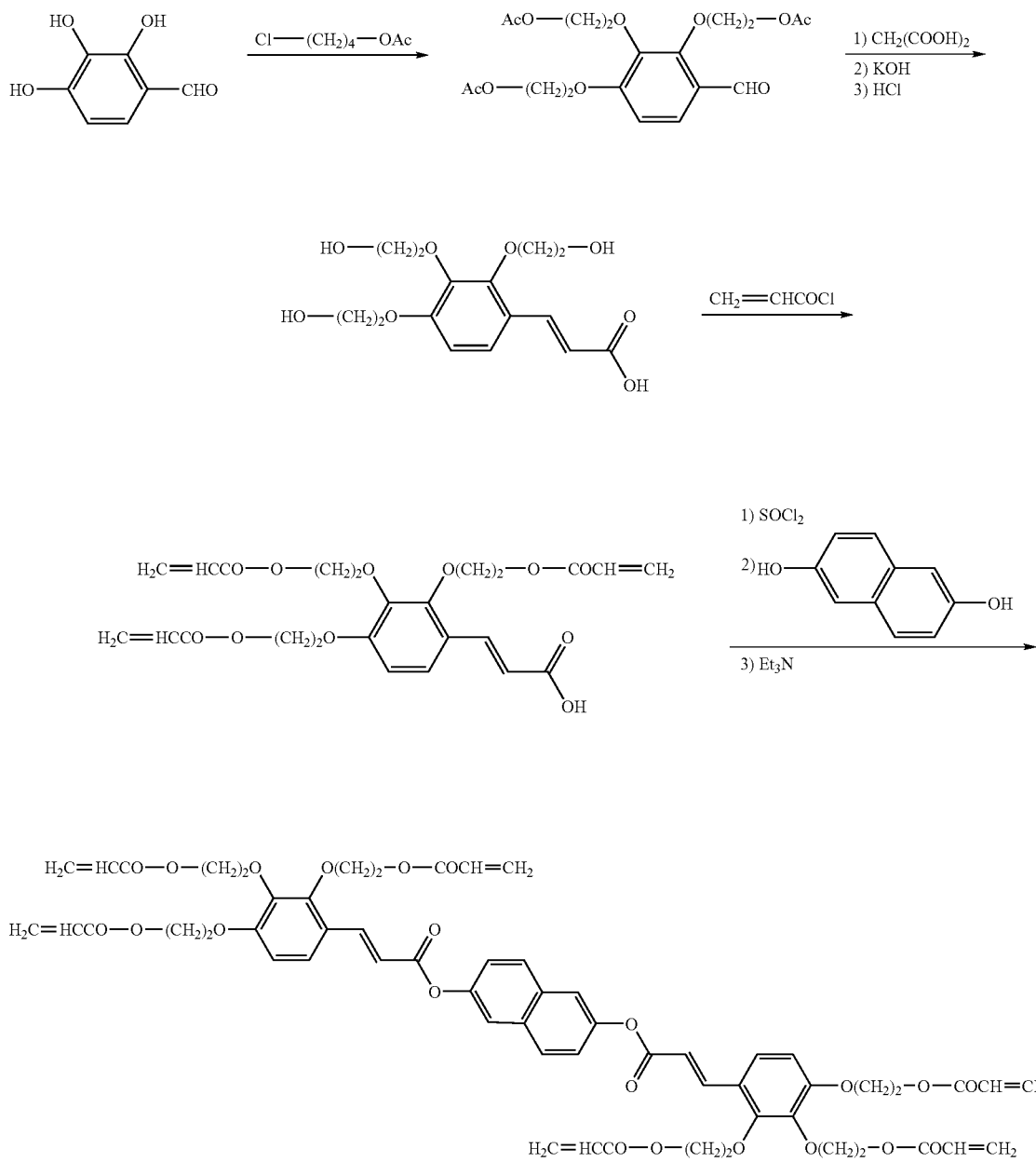

From 2,3,4-trihydroxybenzaldehyde and 2-chloroethyl acetate, 2,3,4-tri(4-acryloyloxyethyloxy)cinnamic acid was synthesized in the same manner as in Example 1. Thereafter, from the 2,3,4-tri(4-acryloyloxyethyloxy)cinnamic acid and 2,6-dihydroxynaphthalene, the titled compound (m-31) was synthesized in the same manner as in Example 1. The NMR spectrum of m-31 obtained is shown below.

$^1$H-NMR (solvent: CDCl$_3$, standard: tetramethylsilane) δ (ppm): 4.25–4.35 (8H, m) 4.40–4.50 (12H, m) 4.57 (4H, t) 5.65–5.90 (6H, m) 6.15–6.25 (6H, m) 6.45–6.50 (6H, m) 6.68 (2H, d) 6.76 (2H, d) 7.33 (2H, dd) 7.37 (2H, d) 7.65 (2H, d) 7.85 (2H, d) 8.16 (2H, d).

Confirmation of Liquid Crystallinity of m-31

The 2,6-di(2,3,4-tri(4-acryloyloxyethyloxy)-naphthalene (m-31) synthesized above was observed on the change in the liquid crystal phase by DSC (differential scanning calorimeter) and a polarizing microscope. As a result, transfer from crystal to isotropic liquid occurred at 130° C. during the elevation of temperature and liquid crystallinity was not confirmed, but a nematic phase was expressed at 40° C. or less during the dropping of temperature. The texture of the expressed nematic phase reveals that this nematic phase is a biaxial nematic phase (Nb phase).

Example 4

Synthesis of 4,4'-di(2,3-dihexyloxy-4-(4-acryloyloxybutyl-oxy)cinnamoyloxy)biphenyl (m-43)

This compound can be synthesized according to the following scheme.

(1) Synthesis of intermediate 2,3-dihexyloxy-4-(4-acetyl-oxybutyloxy)benzaldehyde Into a three-neck flask, 2,3,4-trihyroxybenzaldehyde (8.5 g), potassium carbonate (36 g), 4-chlorobutyl acetate (8.2 g) and 100 mL of dimethylformamide (DMF) were charged and stirred at 120° C. for 5 hours. Thereafter, 1-hexylbromide (18.9 g) was added and the solution was further stirred at 120° C. for 5 hours. After cooling, the reaction solution was extracted with ethyl acetate and washed with water. The extract was concentrated and then purified by column chromatography to obtain the titled compound (6.3 g). Yield: 28%.

(2) Synthesis of intermediate 2,3-dihexyloxy-4-(4-acetyl-oxybutyloxy)cinnamic acid Into a three-neck flask, 2,3,4-tri(4-acetyloxy-butyloxy) benzaldehyde (6.3 g), malonic acid (2.25 g), piperidine (0.5 ml) and 20 mL of pyridine were added and stirred at 115° C. for 4 hours. After cooling, water (200 ml) and potassium hydroxide (4.0 g) were added and stirred at 60° C. for 2 hours. After cooling, concentrated hydrochloric acid was added until the reaction solution became acidic, and the resulting reaction solution was extracted with ethyl acetate and washed with water. The extract was concentrated and then purified by column chromatography to obtain the titled compound (6.2 g). Yield: 98%.

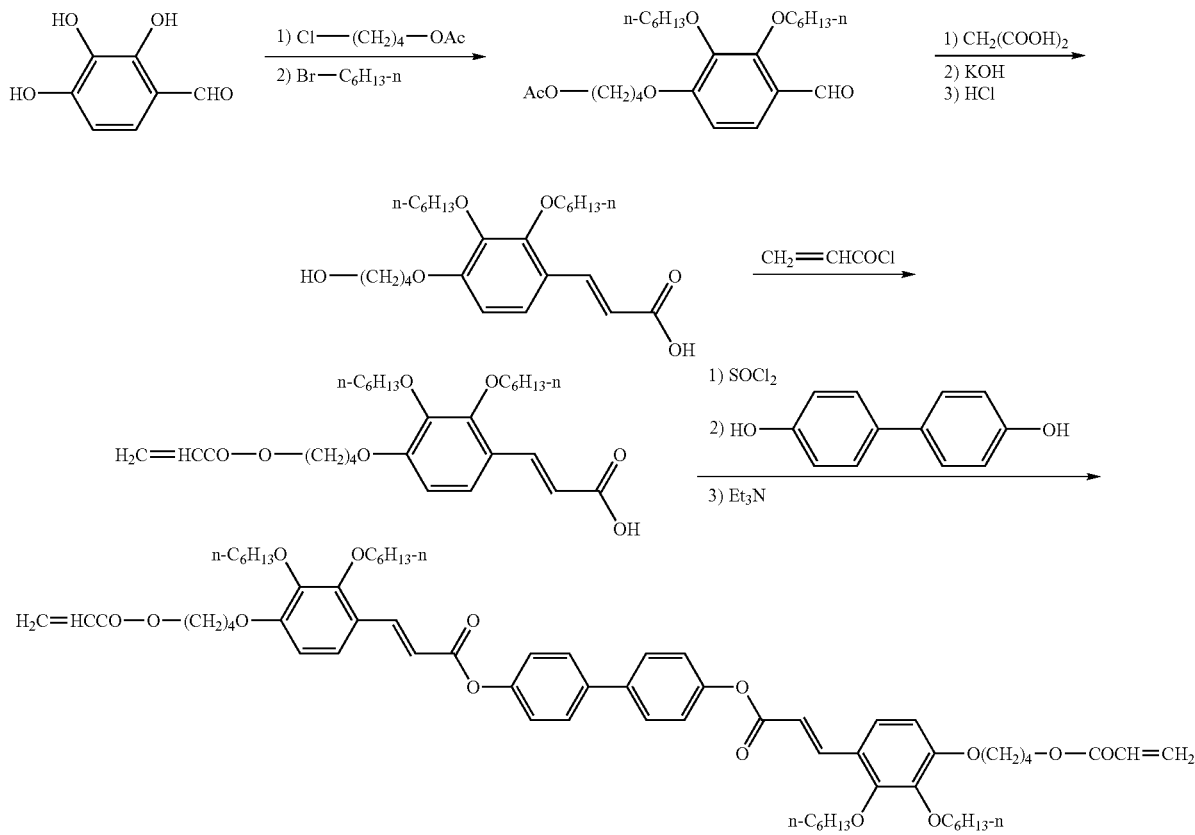

(3) Synthesis of intermediate 2,3-dihexyloxy-4-(4-acryloyloxybutyloxy)cinnamic acid Into a three-neck flask, 2,3,4-tri(4-hydroxy-butyloxy)cinnamic acid (6.2 g), acrylic acid chloride (1.3 ml), N,N-dimethylaniline (2.1 g) and 100 mL of tetrahydrofuran were added and stirred at 60° C. for 5 hours. After cooling, the reaction solution was extracted with ethyl and washed with water. The extract was concentrated and then purified by column chromatography to obtain the titled compound (6.0 g). Yield: 86%.

(4) Synthesis of 4,4'-di(2,3-dihexyloxy-4-(4-acryloyloxy-butyloxy)cinnamoyloxy)biphenyl (m-43)

Into a three-neck flask, 2,3,4-tri(4-acryloyloxy-butyloxy) cinnamic acid (2.5 g), thionyl chloride (1.5 g), dimethylformamide (0.01 g) and 30 mL of toluene were added and stirred at 40° C. for 30 minutes. After cooling, toluene and excess thionyl chloride were removed by distillation and then 20 ml of tetrahydrofuran was added. To this reaction solution, 4,4'-dihydroxybiphenyl (0.34 g) was added and after cooling to 5° C., triethylamine (0.6 mL) was added dropwise. Subsequently, 4-dimethylaminopyridine (0.01 g) was added and after heating to 25° C., the solution was stirred for 5 hours. The resulting reaction solution was added to water (200 mL) and crystals precipitated were collected by filtration. The obtained crystals were dissolved in dimethylacetamide (20 mL), triethylamine (0.6 mL) was added thereto and the resulting solution was stirred at 60° C. for 1 hour. After cooling, the reaction solution was extracted with ethyl and washed with water. The extract was concentrated and then purified by column chromatography to obtain the titled compound (2.0 g). Yield: 85%. The NMR spectrum of m-43 obtained is shown below.

¹H-NMR (solvent: CDCl₃, standard: tetramethylsilane) δ (ppm): 0.80–1.00 (12H, m) 1.20–1.40 (16H, m) 1.50–1.60 (8H, m) 1.75–1.85 (8H, m) 1.85–2.00 (8H, m) 3.98 (4H, t) 4.00–4.15 (8H, m) 4.26 (4H, t) 5.70–5.90 (6H, m) 6.05–6.20 (6H, m) 6.35–6.45 (6H, m) 6.60 (2H, d) 6.70 (2H, d) 7.23 (4H, d) 7.33 (2H, d) 7.59 (4H, d) 8.13 (2H, d).

(5) Confirmation of Liquid Crystallinity of m-43

The 4,4'-di(2,3-dihexyloxy-4-(4-acryloyloxybutyloxy)-cinnamoyloxy)biphenyl (m-43) synthesized above was observed on the change in the liquid crystal phase by DSC (differential scanning calorimeter) and a polarizing microscope. As a result, the expression of nematic phase was found to occur in the range from 93 to 107° C. The texture of the expressed nematic phase reveals that this nematic phase is a biaxial nematic phase (Nb phase).

Example 5

Synthesis of 2,6-di(2,3-dihexyloxy-4-(4-acryloyloxybutyl-oxy)naphthalene (m-35)

This compound can be synthesized according to the following scheme.

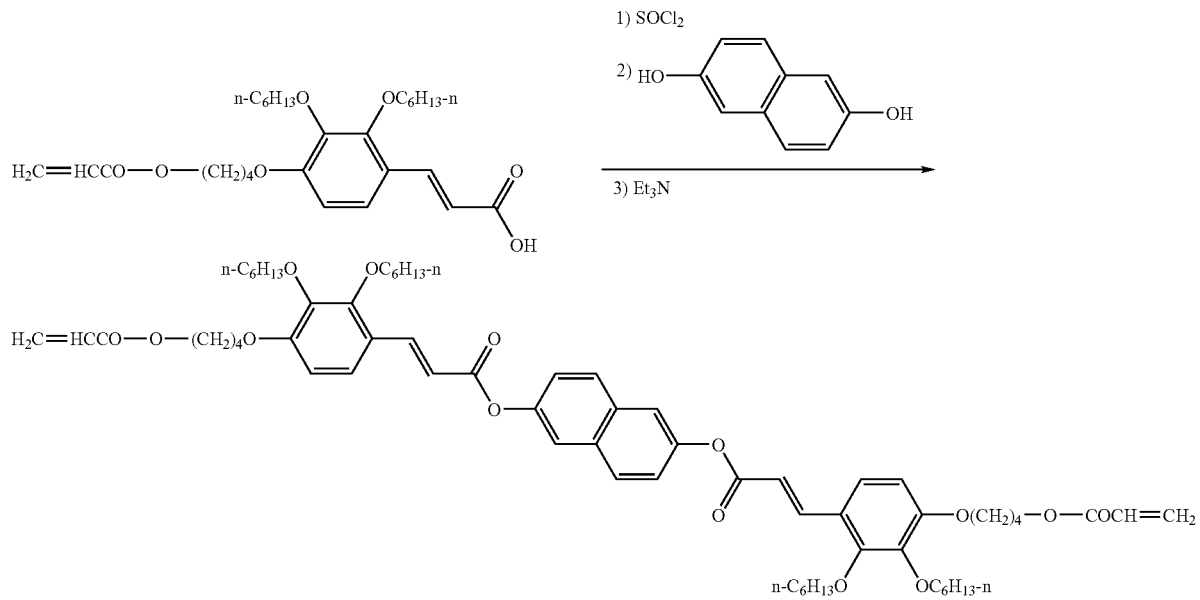

From 2,3-dihexyloxy-4-(4-acryloyloxybutyloxy)cinnamic acid prepared in Example 4 and 2,6-dihydroxynaphthalene, the titled compound (m-35) was synthesized in the same manner as in Example 4. The NMR spectrum of m-35 obtained is shown below.

¹H-NMR (solvent: CDCl₃, standard: tetramethylsilane) δ (ppm): 0.80–1.00 (12H, m) 1.20–1.40 (16H, m) 1.50–1.60 (8H, m) 1.75–1.85 (8H, m) 1.85–2.00 (8H, m) 3.97 (4H, t) 4.00–4.15 (8H, m) 4.26 (4H, t) 5.70–5.90 (6H, m) 6.05–6.20 (6H, m) 6.35–6.45 (6H, m) 6.63 (2H, d) 6.73 (2H, d) 7.32 (2H, dd) 7.36 (2H, d) 7.64 (2H, d) 7.84 (2H, d) 8.12 (2H, d).

Confirmation of Liquid Crystallinity of m-35

The 2,6-di(2,3-dihexyloxy-4-(4-acryloyloxybutyloxy)-naphthalene (m-35) synthesized above was observed on the change in the liquid crystal phase by DSC (differential scanning calorimeter) and a polarizing microscope. As a result, transfer from crystal to isotropic liquid occurred at 98° C. during the elevation of temperature and liquid crystallinity was not confirmed, but a nematic phase was expressed at 73° C. or less during the dropping of temperature. The texture of the expressed nematic phase reveals that this nematic phase is a biaxial nematic phase (Nb phase).

Example 6

Production of Retardation Plate (Production of Transparent Support)

The following components are charged into a mixing tank and stir under heating to prepare a cellulose acetate solution (dope).

| (Composition of Cellulose Acetate Solution) | |
|---|---|
| Cellulose acetate having an acetylation degree of 60.9% | 100 parts by weight |
| Triphenyl phosphate | 6.5 parts by weight |
| Biphenyl diphenyl phosphate | 5.2 parts by weight |
| Retardation Increasing Agent (1) shown below | 0.1 part by weight |
| Retardation Increasing Agent (2) shown below | 0.2 part by weight |
| Methylene chloride | 310.25 parts by weight |
| Methanol | 54.75 parts by weight |
| 1-Butanol | 10.95 parts by weight |

Retardation Increasing Agent (1):

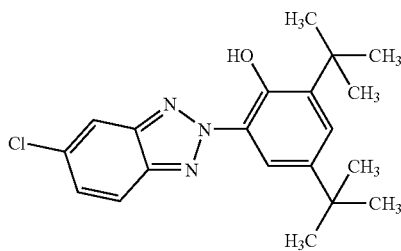

Retardation Increasing Agent (2):

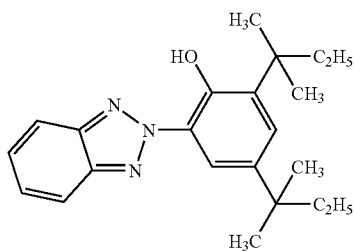

The dope prepared above is cast from a casting port on a drum cooled to 0° C. The film formed is peeled off in the state having a solvent content of 70 wt %. Both edges in the cross direction of the film are fixed by a pin tenter and the film is dried while keeping the distance of giving a stretching percentage of 3% in the cross direction (direction perpendicular to the longitudinal direction) within the region where the solvent content is from 3 to 5 wt %. Thereafter, the film is further dried by transporting it between rollers of a heat-treatment device and adjusts such that in the region exceeding 120° C., the stretching percentage become substantially 0% and the ratio of the stretching percentage in the cross direction to the stretching percentage in the longitudinal direction become 0.75 (by taking account of stretching of 4% in the longitudinal direction at the peeling). In this way, a cellulose acetate film having a thickness of 100 μm is produced. The retardation of the produced film is measured at a wavelength of 632.8 nm, as a result, the retardation in the thickness direction is 40 nm and the in-plane retardation is 4 nm. The produced cellulose acetate film is used as the transparent support.

(Formation of First Undercoat Layer)

On the transparent support, a coating solution having the following composition is coated in an amount of 28 ml/m$^2$ and dried to form a first undercoat layer.

| (Composition of Coating Solution for First Undercoat Layer) | |
|---|---|
| Gelatin | 5.42 parts by weight |
| Formaldehyde | 1.36 parts by weight |
| Salicylic acid | 1.60 parts by weight |
| Acetone | 391 parts by weight |
| Methanol | 158 parts by weight |
| Methylene chloride | 406 parts by weight |
| Water | 12 parts by weight |

(Formation of Second Undercoat Layer)

On the first undercoat layer, a coating solution having the following composition is coated in an amount of 7 ml/m$^2$ and dried to form a second undercoat layer.

| (Composition of Coating Solution for Second Undercoat Layer) | |
|---|---|
| Anionic polymer shown below | 0.79 parts by weight |
| Monoethyl citrate | 10.1 parts by weight |
| Acetone | 200 parts by weight |
| Methanol | 877 parts by weight |
| Water | 40.5 parts by weight |

Anionic Polymer:

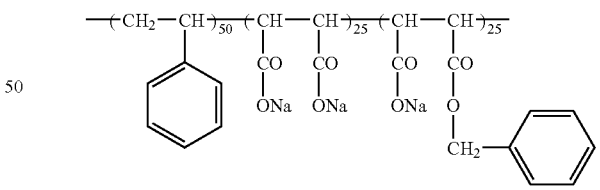

(Formation of Back Layer)

On the opposite surface of the transparent support, a coating solution having the following composition is coated in an amount of 25 ml/m$^2$ and dried to form a back layer.

| (Composition of Coating Solution for Back Layer) | |
|---|---|
| Cellulose diacetate having an acetylation degree of 55% | 6.56 parts by weight |

-continued

| (Composition of Coating Solution for Back Layer) | |
|---|---|
| Silica-base matting agent (average particle size: 1 μm) | 0.65 parts by weight |
| Acetone | 679 parts by weight |
| Methanol | 104 parts by weight |

(Formation of Orientation Film)

A modified polyvinyl alcohol shown below and glutaraldehyde (5 wt % of the modified polyvinyl alcohol) are dissolved in a methanol/water mixed solvent (volume ratio=20/80) to prepare a 5 wt % solution.

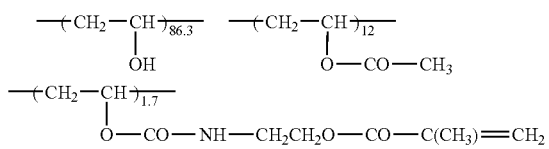

The solution prepared above is coated on the second undercoat layer, dried with hot air of 100° C. for 120 seconds and then rubbed to form an orientation film. The thickness of the obtained orientation film is 0.5 μm. The rubbing direction of the orientation film is parallel to the casting direction of the transparent support.

(Formation of Optically Anisotropic Layer)

On the orientation film obtained by rubbing, a coating solution for optically anisotropic layer having the following composition is coated using a #4 wire bar.

| (Coating Solution for Optically Anisotropic Layer) | |
|---|---|
| Air Interface Orientation Controlling Agent v-(20) | 0.2 parts by weight |
| Biaxial Liquid Crystalline Compound m-40 | 100 parts by weight |
| Photopolymerization Initiator HJ-1 shown below | 2.0 parts by weight |
| Lucirin TPO-L (produced by BASF) | 2.0 parts by weight |
| Methyl ethyl ketone | 300 parts by weight |

Photopolymerization Initiator HJ-1:

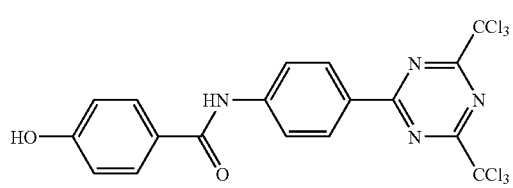

After the coating solution for optically anisotropic layer is coated, the film is placed in a thermostatic chamber at 70° C., heated to 60° C. over about 20 seconds, held as it is for 30 seconds and then placed in a thermostatic chamber at 50° C. having an oxygen concentration of 2%. After 30 seconds, an ultraviolet ray of 600 mJ is irradiated to fix the orientation state of the optically anisotropic layer and then the film is allowed to cool to room temperature to form an optically anisotropic layer, thereby producing a retardation plate. The thickness of the optically anisotropic layer is 1.82 μm.

The biaxiality and tilt angle in the optically anisotropic layer of the obtained retardation plate are judged by using a polarizing microscope with a free plate. As a result, it is confirmed that biaxiality is exhibited and the direction having a minimum refractive index almost agrees with the normal direction of the transparent support and scarcely changes in the thickness direction of the transparent support.

Example 7

A retardation plate is produced in the same manner as in Example 6 except for changing the air interface orientation controlling agent to V-(18). The biaxiality and tilt angle are judged in the same manner as in Example 6, as a result, it is confirmed that biaxiality is exhibited and the direction having a minimum refractive index almost agrees with the normal direction of the transparent support and scarcely changes in the thickness direction of the transparent support.

Example 8

On the orientation film after rubbing produced in Example 6, a coating solution for optically anisotropic layer having the following composition is coated using a #4 wire bar.

| (Coating Solution for Optically Anisotropic Layer) | |
|---|---|
| Air Interface Orientation Controlling Agent v-(20) | 0.1 part by weight |
| Biaxial Liquid Crystalline Compound NI-1 shown below | 100 parts by weight |
| Ethylene oxide-modified trimethylpropane triacrylate (V#360, produced by Osaka Organic Chemical Industry Ltd.) | 5.0 parts by weight |
| Photopolymerization Initiator HJ-1 shown above | 2.0 parts by weight |
| Lucirin TPO-L (produced by BASF) | 2.0 parts by weight |
| Methyl ethyl ketone | 300 parts by weight |

Biaxial Liquid Crystal Compound NI-1

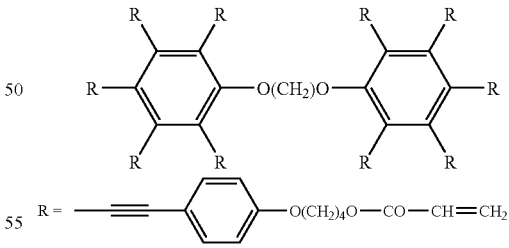

After the coating solution for optically anisotropic layer is coated, the film is placed in a thermostatic chamber at 140° C., heated to 130° C. over about 30 seconds, held at it is for 30 seconds and then placed in a thermostatic chamber at 80° C. having an oxygen concentration of 2%. After 30 seconds, an ultraviolet ray of 600 mJ is irradiated to fix the orientation state of the optically anisotropic layer and then the film is allowed to cool to room temperature to form an optically anisotropic layer, thereby producing a retardation plate. The thickness of the optically anisotropic layer is 1.90 μm. The biaxiality and tilt angle are judged in the same manner as in Example 6. As a result, it is confirmed that biaxiality is exhibited and the direction having a minimum refractive index almost agrees with the normal direction of the transparent support and scarcely changes in the thickness direction of the transparent support.

Example 9

On the orientation film after rubbing produced in Example 6, a coating solution for optically anisotropic layer having the following composition is coated using a #4 wire bar.

| (Coating Solution for Optically Anisotropic Layer) | |
| --- | --- |
| Biaxial Liquid Crystalline Compound m-43 | 100 parts by weight |
| Photopolymerization Initiator HJ-1 shown above | 2.0 parts by weight |
| Lucirin TPO-L (produced by BASF) | 2.0 parts by weight |
| Methyl ethyl ketone | 300 parts by weight |

After the coating solution for optically anisotropic layer is coated, the film is placed in a thermostatic chamber at 95° C., heated to 90° C. over about 30 seconds, held at it is for 30 seconds and then placed in a thermostatic chamber at 80° C. having an oxygen concentration of 2%. After 30 seconds, an ultraviolet ray of 600 mJ is irradiated to fix the orientation state of the optically anisotropic layer and then the film is allowed to cool to room temperature to form an optically anisotropic layer, thereby producing a retardation plate. The thickness of the optically anisotropic layer is 1.90 μm. The biaxiality and tilt angle are judged in the same manner as in Example 6. As a result, it is confirmed that biaxiality is exhibited and the direction having a minimum refractive index almost agrees with the normal direction of the transparent support and scarcely changes in the thickness direction of the transparent support.

Example 10

On the orientation film after rubbing produced in Example 6, a coating solution for optically anisotropic layer having the following composition is coated using a #4 wire bar.

| (Coating Solution for Optically Anisotropic Layer) | |
| --- | --- |
| Biaxial Liquid Crystalline Compound P-3 | 100 parts by weight |
| Methyl ethyl ketone | 300 parts by weight |

After the coating solution for optically anisotropic layer is coated, the film is placed in a thermostatic chamber at 60° C., heated to 50° C. over about 30 seconds, held at it is for 60 seconds and then contacted with a metal roller at 20° C. to provide a glass state, whereby the orientation state is fixed, an optically anisotropic layer is formed and a retardation plate is produced. The thickness of the optically anisotropic layer is 1.90 μm. The biaxiality and tilt angle are judged in the same manner as in Example 6. As a result, it is confirmed that biaxiality is exhibited and the direction having a minimum refractive index almost agrees with the normal direction of the transparent support and scarcely changes in the thickness direction of the transparent support.

Example 11

A retardation plate is produced in the same manner as in Example 6 except for not adding the air interface orientation controlling agent V-(20). The biaxiality and tilt angle are judged in the same manner as in Example 6. As a result, it is confirmed that the direction having a minimum refractive index is tilted with respect to the normal direction of the transparent support.

Example 12

A retardation plate is produced in the same manner as in Example 6 except for changing the oxygen concentration at the irradiation of an ultraviolet ray to 18%. It is comfirmed that the film strength of the retardation plate surface obtained become lower, compared with the case of the oxygen concentration at the irradiation of an ultraviolet ray of 2%.

The evaluation of the film strength in Examples 6 to 12 and Comparative Example 1 is performed by actually touching the retardation plate surface at the side of the optical anisotropic layer to evaluate whether the film strength is high or low.

Comparative Example 1 (Com. Ex. 1)

A retardation plate is produced in the same manner as in Example 8 except for not adding the air interface orientation controlling agent V-(20). The biaxiality and tilt angle are judged in the same manner as in Example 6, as a result, it is confirmed that the direction having a minimum refractive index is tilted with respect to the normal direction of the transparent support.

The optically anisotropic layers of retardation plates of Examples 6 to 12 and Comparative Example 1 are summarized in Table 1 below.

TABLE 1

| Example No. | Liquid Crystal Compound | Air Interface Orientation Controlling Agent | Orientation State | Direction Having Minimum Refractive Index | Oxygen Conc.*1 | Film Strength |
| --- | --- | --- | --- | --- | --- | --- |
| 6 | m-40 | V-(20) | uniform orientation | almost parallel to normal direction of support | 2% | High |

TABLE 1-continued

| Example No. | Liquid Crystal Compound | Air Interface Orientation Controlling Agent | Orientation State | Direction Having Minimum Refractive Index | Oxygen Conc.*1 | Film Strength |
|---|---|---|---|---|---|---|
| 7 | m-40 | V-(18) | uniform orientation | almost parallel to normal direction of support | 2% | High |
| 8 | NI-1 | V-(20) | uniform orientation | almost parallel to normal direction of support | 2% | High |
| 9 | m-43 | None | uniform orientation | almost parallel to normal direction of support | 2% | High |
| 10 | P-3 | None | uniform orientation | almost parallel to normal direction of support | 2% | High |
| 11 | m-40 | None | uniform orientation | tilted with respect to normal direction of support | 2% | High |
| 12 | m-40 | V-(20) | uniform orientation | almost parallel to normal direction of support | 18% | Low |
| Com. Ex. 1 | NI-1 | None | uniform orientation | tilted with respect to normal direction of support | 2% | High |

It is seen from the results in Table 1 that in all of Examples 6 to 8 where the optically anisotropic layer of retardation plate contains a low molecular weight biaxial liquid crystal compound and an air interface controlling agent, the direction having a minimum refractive index of the thin film almost coincides with the normal direction of the film plane and the object of the present invention can be achieved.

Also, in Example 9 using the compound of the present invention and Example 10 using a polymer biaxial liquid crystal compound, the direction having a minimum refractive index of the thin film almost coincides with the normal direction of the film plane and the object of the present invention can be achieved.

On the other hand, in Comparative Example 1, the direction having a minimum refractive index is tilted from the normal direction of the film plane and the object of the present invention cannot be achieved.

Examples 6, 7 and 11, in which the oxygen concentration at the irradiation of ultraviolet ray is lower, each showed higher film strength, compared with Example 12, in which the oxygen concentration at the irradiation of ultraviolet ray was higher.

According to the present invention, a retardation plate having biaxial optical property and high film strength, where the direction having a minimum refractive index of the optically anisotropic layer almost coincides with the normal direction of the film plane, is provided by using a polymerizable biaxial liquid crystal compound or polymer biaxial liquid crystal compound of which orientation can be fixed.

This application is based on Japanese patent applications JP 2003-004981, filed on Jan. 10, 2003 and JP 2003-424230, filed on Dec. 22, 2003, the entire content of which is hereby incorporated by reference, the same as if set forth at length.

What is claimed is:

1. A compound represented by the following formula (B-1):

Formula (B-1):

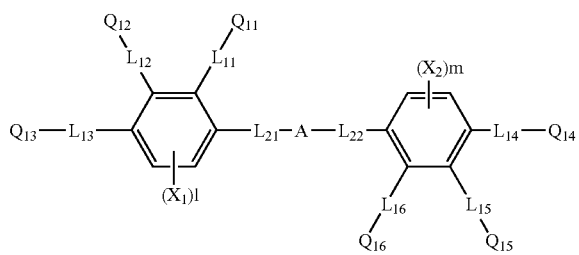

wherein A represents a divalent cyclic group, $L_{21}$ and $L_{22}$ each independently represents a divalent linking group containing at least one of —CH═CH—, —N═CH— and —C≡C—, $X_1$ and $X_2$ each independently represents an atom or a group selected from the group consisting of a halogen atom, an alkyl group having from 1 to 12 carbon atoms, an alkoxy group having from 1 to 12 carbon atoms, an acyl group having from 2 to 13 carbon atoms, an alkylamino group having from 2 to 12 carbon atoms and an acyloxy group having from 2 to 13 carbon atoms, l and m each independently represents an integer of 0 to 2, $L_{11}$, $L_{12}$, $L_{13}$, $L_{14}$, $L_{15}$ and $L_{16}$ each independently represents a divalent linking group selected from the group consisting of —O—, —CO—, —NH—, —N═CH—, —S—, an alkylene group, an alkenylene group, an alkynylene group, an arylene group and a combination thereof, and $Q_{11}$, $Q_{12}$, $Q_{13}$, $Q_{14}$, $Q_{15}$ and $Q_{16}$ each independently represents a polymerizable group or a hydrogen atom and at least one of $Q_{11}$, $Q_{12}$, $Q_{13}$, $Q_{14}$, $Q_{15}$ and $Q_{16}$ represents a polymerizable group.

2. The compound as described in claim 1, wherein at least one of $Q_{11}$, $Q_{12}$, $Q_{13}$, $Q_{14}$, $Q_{15}$ and $Q_{16}$ represents an unsaturated polymerizable group.

3. A retardation plate comprising a transparent support and at least one optically anisotropic layer containing a liquid crystal compound, wherein the liquid crystal compound is a compound represented by the following formula (B-1):

Formula (B-1):

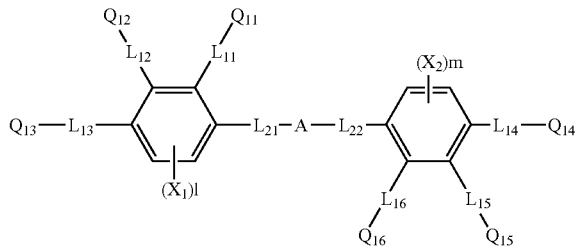

wherein A represents a divalent cyclic group, $L_{21}$ and $L_{22}$ each independently represents a divalent linking group containing at least one of —CH=CH—, —N=CH— and —C≡C—, $X_1$ and $X_2$ each independently represents an atom or a group selected from the group consisting of a halogen atom, an alkyl group having from 1 to 12 carbon atoms, an alkoxy group having from 1 to 12 carbon atoms, an acyl group having from 2 to 13 carbon atoms, an alkylamino group having from 2 to 12 carbon atoms and an acyloxy group having from 2 to 13 carbon atoms, l and m each independently represents an integer of 0 to 2, $L_{11}$, $L_{12}$, $L_{13}$, $L_{14}$, $L_{15}$ and $L_{16}$ each independently represents a divalent linking group selected from the group consisting of —O—, —CO—, —NH—, —N=CH—, —S—, an alkylene group, an alkenylene group, an alkynylene group, an arylene group and a combination thereof, and $Q_{11}$, $Q_{12}$, $Q_{13}$, $Q_{14}$, $Q_{15}$ and $Q_{16}$ each independently represents a polymerizable group or a hydrogen atom and at least one of $Q_{11}$, $Q_{12}$, $Q_{13}$, $Q_{14}$, $Q_{15}$ and $Q_{16}$ represents a polymerizable group.

4. The retardation plate as described in claim 3, wherein at least one of $Q_{11}$, $Q_{12}$, $Q_{13}$, $Q_{14}$, $Q_{15}$ and $Q_{16}$ represents an unsaturated polymerizable group.

5. The retardation plate as described in claim 3, wherein the optically anisotropic layer contains a compound represented by the following formula (V):

Formula (V): 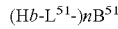

wherein Hb represents an aliphatic group having from 6 to 40 carbon atoms or an aliphatic substituted oligosiloxanoxy group having from 6 to 40 carbon atoms, $L^{51}$ represents a single bond or a divalent linking group, n represents any one integer of 2 to 12, and $B^{51}$ represents a n-valent linking group containing at least one cyclic structure.

6. A method for forming an optically anisotropic layer, which comprises:

coating a liquid crystal composition containing a polymerizable compound capable of expressing a biaxial liquid crystal phase and a photopolymerization initiator on an orientation film;

orienting the polymerizable compound in monodomain alignment; and irradiating an ultraviolet ray in an atmosphere having an oxygen concentration of 7% or less to polymerize the polymerizable compound and thereby fix the orientation thereof, wherein the polymerizable compound is a compound represented by the following formula (B-1):

Formula (B-1):

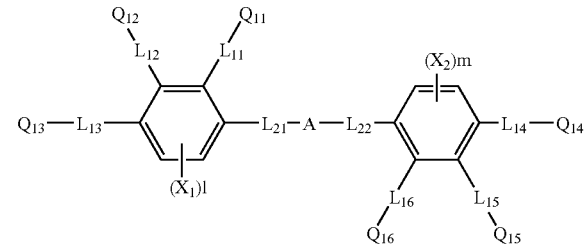

wherein A represents a divalent cyclic group, $L_{21}$ and $L_{22}$ each independently represents a divalent linking group containing at least one of —CH=CH—, —N=CH— and —C≡C—, $X_1$ and $X_2$ each independently represents an atom or a group selected from the group consisting of a halogen atom, an alkyl group having from 1 to 12 carbon atoms, an alkoxy group having from 1 to 12 carbon atoms, an acyl group having from 2 to 13 carbon atoms, an alkylamino group having from 2 to 12 carbon atoms and an acyloxy group having from 2 to 13 carbon atoms, l and m each independently represents an integer of 0 to 2, $L_{11}$, $L_{12}$, $L_{13}$, $L_{14}$, $L_{15}$ and $L_{16}$ each independently represents a divalent linking group selected from the group consisting of —O—, —CO—, —NH—, —N=CH—, —S—, an alkylene group, an alkenylene group, an alkynylene group, an arylene group and a combination thereof, and $Q_{11}$, $Q_{12}$, $Q_{13}$, $Q_{14}$, $Q_{15}$ and $Q_{16}$ each independently represents a polymerizable group or a hydrogen atom and at least one of $Q_{11}$, $Q_{12}$, $Q_{13}$, $Q_{14}$, $Q_{15}$ and $Q_{16}$ represents a polymerizable group.

* * * * *